United States Patent
Kamil Amin et al.

(10) Patent No.: US 11,327,192 B2
(45) Date of Patent: May 10, 2022

(54) COMPRESSIVE SENSING IMAGING

(71) Applicant: WesternGeco LLC, Houston, TX (US)

(72) Inventors: Yousif Izzeldin Kamil Amin, Gatwick (GB); Ali Ozbek, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 185 days.

(21) Appl. No.: 16/497,010

(22) PCT Filed: Mar. 28, 2018

(86) PCT No.: PCT/US2018/024714
§ 371 (c)(1),
(2) Date: Sep. 24, 2019

(87) PCT Pub. No.: WO2018/183415
PCT Pub. Date: Oct. 4, 2018

(65) Prior Publication Data
US 2020/0025958 A1 Jan. 23, 2020

Related U.S. Application Data

(60) Provisional application No. 62/478,586, filed on Mar. 29, 2017.

(51) Int. Cl.
*G01V 1/30* (2006.01)
*G01V 1/36* (2006.01)

(52) U.S. Cl.
CPC .............. *G01V 1/301* (2013.01); *G01V 1/362* (2013.01)

(58) Field of Classification Search
CPC ................................ G01V 1/301; G01V 1/362
See application file for complete search history.

(56) References Cited

U.S. PATENT DOCUMENTS

| | | | | |
|---|---|---|---|---|
| 2010/0211320 A1* | 8/2010 | Vassallo | ................. | G01V 1/364 702/14 |
| 2012/0089337 A1* | 4/2012 | Vassallo | .................. | G01V 1/00 702/17 |
| 2016/0084977 A1* | 3/2016 | Rickett | .................. | G01V 1/364 702/17 |

(Continued)

FOREIGN PATENT DOCUMENTS

| | | |
|---|---|---|
| CN | 102116868 A | 7/2011 |
| CN | 102047146 B | 5/2013 |

(Continued)

OTHER PUBLICATIONS

Wang, Yangua, Multichannel Matching Pursuit for Seismic Trace Decomposition, Geohpyiscs, vol. 75, No. 4 (Jul.-Aug. 2010). p. V61-V66 (Year: 2010).*

(Continued)

*Primary Examiner* — Raymond L Nimox
(74) *Attorney, Agent, or Firm* — Christopher M. Mooney

(57) ABSTRACT

A method can include receiving data acquired via survey equipment disposed in an environment; analyzing at least a portion of the data via an iterative adaptive approach that implements matching pursuit to generate analysis results; and identifying at least one feature in the environment based at least in part on a portion of the analysis results.

19 Claims, 57 Drawing Sheets

(56) References Cited

U.S. PATENT DOCUMENTS

| | | | | |
|---|---|---|---|---|
| 2016/0139283 | A1* | 5/2016 | Kamil | G01V 1/364 |
| | | | | 702/17 |
| 2017/0139065 | A1* | 5/2017 | Gentilhomme | G01V 1/282 |
| 2018/0059277 | A1* | 3/2018 | Bloor | G01V 1/364 |
| 2018/0120464 | A1* | 5/2018 | Sun | G01V 1/48 |
| 2018/0306937 | A1* | 10/2018 | Bagaini | G01V 1/284 |

FOREIGN PATENT DOCUMENTS

| | | | | |
|---|---|---|---|---|
| CN | 103714534 | A | 4/2014 | |
| CN | 103728660 | A | 4/2014 | |
| CN | 104391323 | A | 3/2015 | |
| CN | 104570107 | A | 4/2015 | |
| CN | 105277973 | A | 1/2016 | |
| CN | 106461804 | B | 7/2020 | |
| EP | 2784551 | A2 | 10/2014 | |
| WO | 2015168130 | A1 | 11/2015 | |
| WO | WO-2015168130 | A1 * | 11/2015 | G01V 1/325 |
| WO | 2016179206 | A1 | 11/2016 | |

OTHER PUBLICATIONS

A. Papoulis, "Generalized sampling expansion," IEEE Trans. Circ. Syst., vol. 24, pp. 652-654, Nov. 1977.

J. Li and P. Stoica, "An adaptive filtering approach to spectral estimation and SAR imaging," IEEE Transactions on Signal Processing, vol. 44, pp. 1469-1484, Jun. 1996.

T. Yardibi, J. Li, P. Stoica, M. Xue and A. B. Baggeroer, "Source localization and sensing: a nonparametric iterative adaptive approach based on weighted least squares," IEEE Transactions on Aerospace and Electronic Systems, vol. 46, pp. 425-443, Jan. 2010.

Candès E.J., J.K. Romberg, and T. Tao, 2006, Stable signal recovery from incomplete and inaccurate measurements, Communications on Pure and Applied Mathematics, 59, 1207-1223.

Chen, S., and D. Donoho, 1994, Basis pursuit, Conference Record of the Twenty-Eighth Asilomar Conference on Signals, Systems and Computers, IEEE, 41-44.

Donoho, D.L., 2006, Compressed sensing, IEEE Transactions on Information Theory, 52, vol. 4, Apr. 2006, 1289-1306.

Mallat, S.G., and Z. Zhang, 1993, Matching pursuits with time-frequency dictionaries, IEEE Transactions on Signal Processing, 41, vol. 12, Dec. 1993, 3397-3415.

Öbek. A., M. Vassallo, K. Özdemir, D.-J. van Manen, and K. Eggenberger, 2010, Crossline wavefield reconstruction from multicomponent streamer data: Part 2—Joint interpolation and 3D up/down separation by generalized matching pursuit: Geophysics, 75, vol. 6, Nov.-Dec. 2010, WB69-WB85.

Özbek, A., M. Vassallo, K. Özdemir, D.-J. van Manen, K. Eggenberger, and J.O.A. Robertsson, 2011, Parametric Matching Pursuit Methods to Reconstruct Seismic Data Acquired with Multichannel Sampling: 73rd EAGE Conference and Exhibition, Extended Abstracts, A042, Vienna, Austria, May 23-26, 2011 (5 pages).

Vassallo, M., A. Özbek, K. Özdemir, and K. Eggenberger, K., 2010, Crossline wavefield reconstruction from multicomponent streamer data: Part 1—Interpolation by matching pursuit using pressure and its crossline gradient: Geophysics, 75, No. 6, Nov.-Dec. 2010, WB53-WB67.

Blumensath, and T., Davies, M., 2007, On the difference between orthogonal matching pursuit and orthogonal least squares. Mar. 29, 2007, pp. 1-3.

Capon, J., 1969, High resolution frequency-wavenumber spectrum analysis, Proceedings of the IEEE, 57, No. 8, Aug. 1969, 1408-1418.

Chen, S. S., Donoho, D. L. and Saunders, M. A., 1998, Atomic decomposition by basis pursuit, SIAM Journal of Scientific Computing, 20, No. 1, pp. 33-61.

Chen, Y., Ma J., and Fomel, S., 2016, Double-sparsity dictionary for seismic noise attenuation: Geophysics, 81, No. 2, V103-V116.

DeVore R.A., and Temlyakov V.N., 1996, Some remarks on greedy algorithms, Advances in Computational Mathematics, 173-187.

Herrmann, P., Mojesky, T., Magesan, M., and Hugonnet, P., 2000, De-aliased, high-resolution Radon transforms: 70th Annual International Meeting, SEG, Expanded Abstracts, 1953-1956.

Hogbom J., 1974, Aperture synthesis with a non-regular distribution of interferometer baselines, Astrophysical Journal Supplement Series, 417-426.

Kamil, Y.I., Loganathan, P. Vassallo, M., Cowman, M., and Raskopin, A., 2015, Optimizing the Use of Gradient Measurements in Wavefield Reconstruction: a Bayesian Noise Tracking Approach, 77th EAGE Conference and Exhibition 2015, Madrid, Spain, Jun. 1-4, 2015 (5 pages).

Krstulovic S, and Gribonval R., 2006, MPTK: Matching Pursuit made Tractable, Proceedings of the International Conference on Acoustics, Speech and Signal Processing, 3, 496-499.

Li, J., and Stoica, P., 1996, An adaptive filtering approach to spectral estimation and SAR imaging, IEEE Trans. Signal Processing, 44, No. 6, Jun. 1996, 1469-1484.

Mallat, S.G., and Z. Zhang, 1993, Matching pursuits with time-frequency dictionaries: IEEE Transactions on Signal Processing, 41, 3397-3415.

Murray J. F., and Kreutz-Delgado, K., 2001, An improved FOCUSS-based learning algorithm for solving sparse linear inverse problems, in Conf. Record of the Thirty-Fifth Asilomar Conf. on Signals, Systems and Computers, 347-351.

Öbek. A., Özdemir, K. and Vassallo, M., 2009, Interpolation by matching pursuit, SEG Technical Program Expanded Abstracts, 3254-3257.

Pati,Y., 1993, Orthogonal matching pursuit: Recursive function approximation with applications to wavelet decomposition. Signals, Systems and Computer, 40-44.

Rao, B. D., and Kreutz-Delgado, K., 1999, An affine scaling methodology for best basis selection, IEEE Trans. Sig-nal Processing, 47, 187-200.

Rebollo-Neira, L., and Lowe, D. ,2002, Optimized orthogonal matching pursuit approach, IEEE Signal Processing Letters, 9, 137-140.

Schmidt, R. O., 1986, Multiple emitter location and signal parameter estimation, IEEE Transactions on Antennas and Propagation, 3, 276-280.

Schonewille, M., A. Klaedtke, A. Vigner, J. Brittan, and T. Martin, 2009, Seismic data regularization with the anti-alias anti-leakage Fourier transform, First Break, 27, 85-93.1.

Stanton, A., and M. D. Sacchi, 2013, All roads lead to Rome: Predictability, sparsity, rank and pre-stack seismic data reconstruction: CSEG Recorder, 38, Dec. 2012 (6 pages).

Stoica, P., Zachariah, D., and Li, J., 2014, Weighted SPICE: A unifying approach for hyperparameter-free sparse estimation, Digital Signal Processing: A Review Journal, 33, 1-12.

Vassallo, M., Eggenberger, K., Özbek, A., and Curtis, T., 2011, Mitigation of streamer noise impact in multicomponent streamer wavefield reconstruction, SEG Annual International Meeting, 1273-1277.

Wang, Y., 2010, Multichannel matching pursuit for seismic trace decomposition: Geophysics, 75, No. 4, V61-V66.

International Search Report and Written Opinion issued in the related PCT Application PCT/US2018/024714, dated Jul. 16, 2018 (17 pages).

International Preliminary Report on Patentability issued in the related PCT Application PCT/US2018/024714, dated Oct. 10, 2019 (12 pages).

Yan, Z. et al., "Algorithm of Compressed Sensing Reconstruction of Seismic Data Based on Curvelet Transform", Journal of Jilin University (Information Science Edition), vol. 33, No. 5, Sep. 2015, pp. 570-577. English Abstract included.

First Chinese Office Action issued in Chinese patent Application No. 201880035895.9 dated Apr. 30, 2021, 25 pages with English translation.

(56) References Cited

OTHER PUBLICATIONS

Second Chinese Office Action issued in Chinese patent Application No. 201880035895.9 dated Jan. 20, 2022, 15 pages with English translation.

* cited by examiner

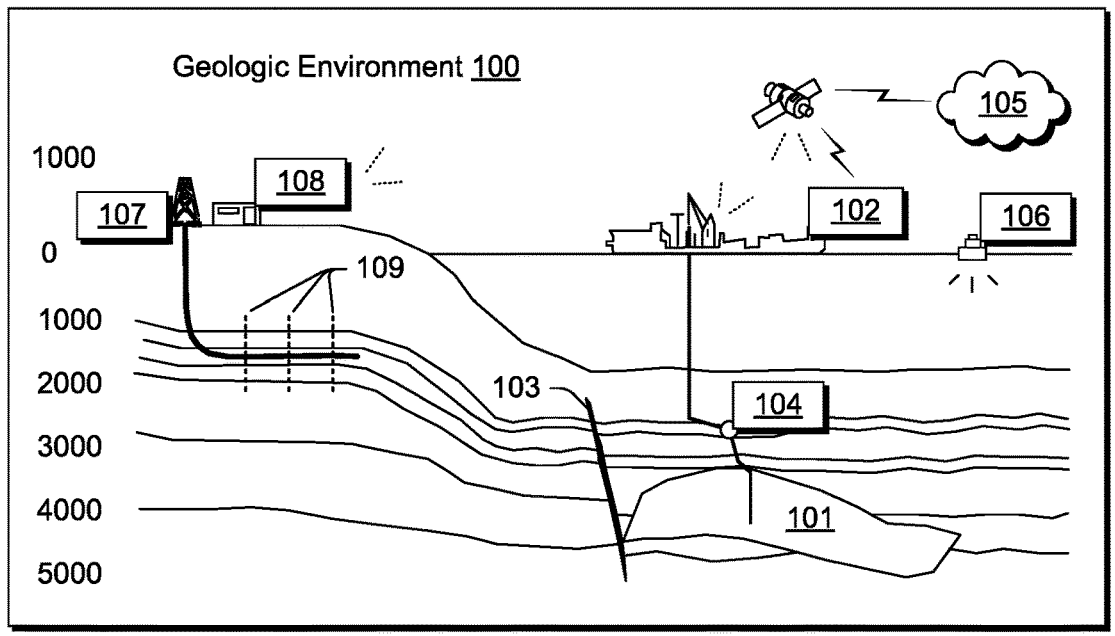
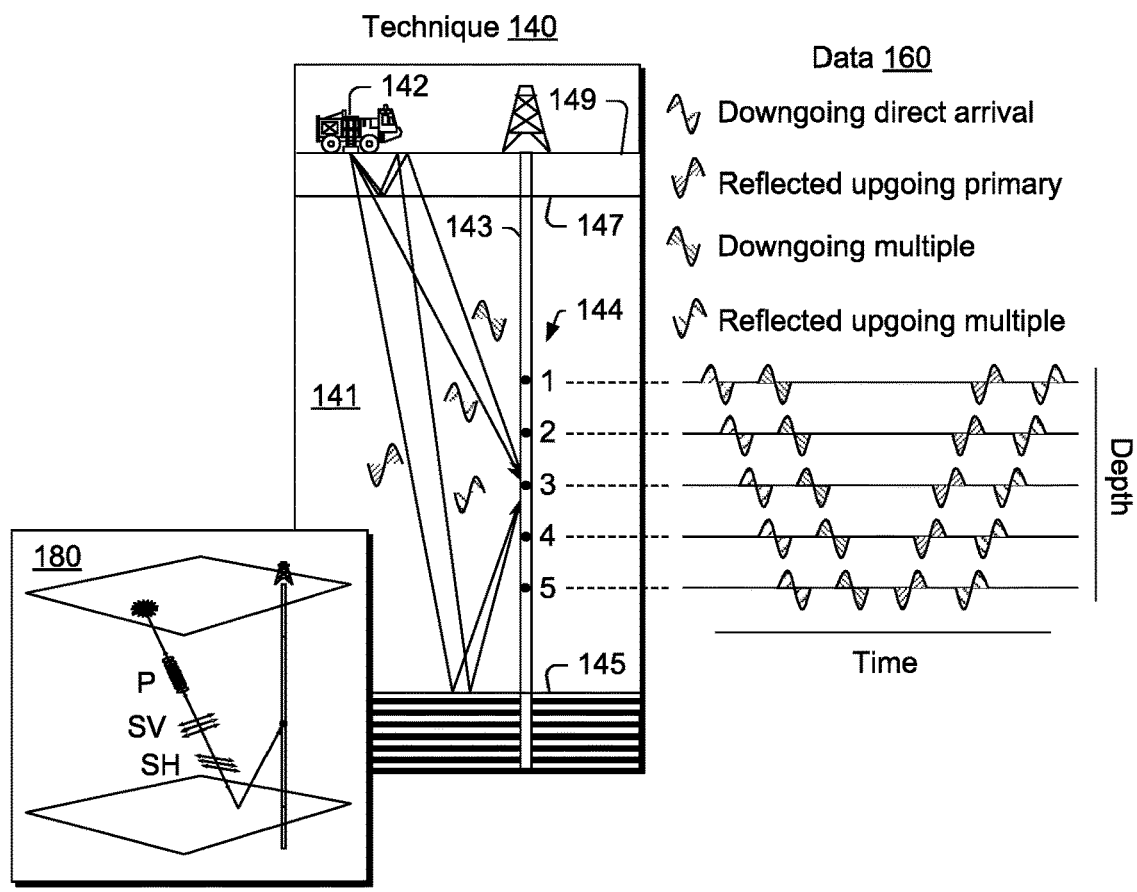
Fig. 1

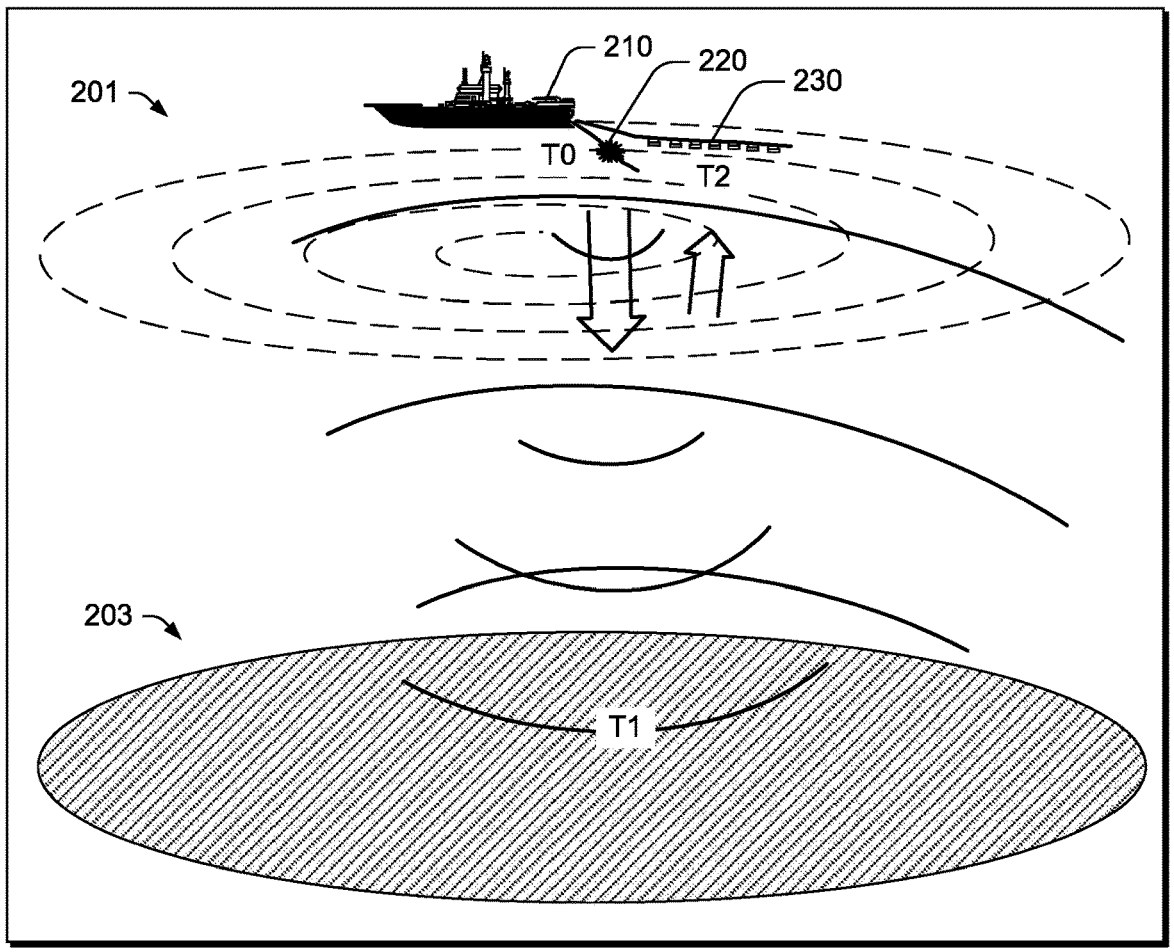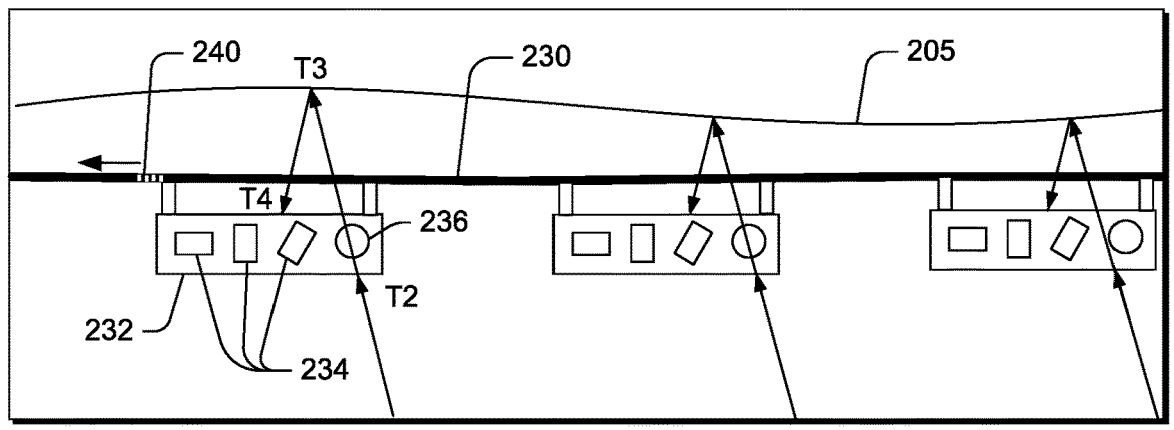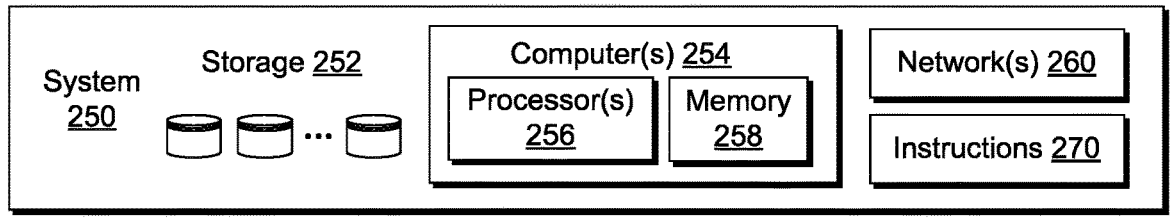
Fig. 2

Method 500 initialize

$\hat{\mathbf{c}} := \mathbf{0}$ $\mathbf{r} := \mathbf{m}$ repeat {IAA-MP loop}

$\mathbf{R} := \mathbf{I}$ repeat {IAA loop} for $i = 1, 2, \cdots, K$ $$c_i^{IAA} = \frac{\mathbf{h}_i^H \Lambda^{1/2} \mathbf{R}^{-1} \Lambda^{1/2} \mathbf{r}}{\mathbf{h}_i^H \Lambda^{1/2} \mathbf{R}^{-1} \Lambda^{1/2} \mathbf{h}_i}$$

end {for}

$$\mathbf{R} = \mathbf{A} \operatorname{diag}\left(|c_1|^2, |c_2|^2, \cdots, |c_K|^2\right) \mathbf{A}^H$$

until (convergence) {IAA loop}

$$i^{MP} = \arg\max_{i \in \{1,2,\cdots,K\}} \frac{\left|\mathbf{h}_i^H \Lambda^{1/2} \mathbf{R}^{-1} \Lambda^{1/2} \mathbf{r}\right|^2}{\mathbf{h}_i^H \Lambda^{1/2} \mathbf{R}^{-1} \Lambda^{1/2} \mathbf{h}_i}$$

$\hat{c}_{i^{MP}} := \hat{c}_{i^{MP}} + c_{i^{MP}}$ $\mathbf{r} := \mathbf{r} - c_{i^{MP}} \mathbf{h}_{i^{MP}}$ until (convergence) {IAA-MP loop}

Fig. 5

FK-slice example, showing limited sparsity
(decomposition by IAA-MP)
710
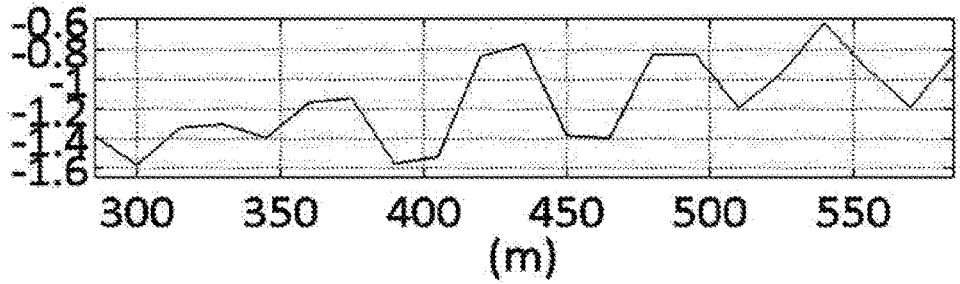
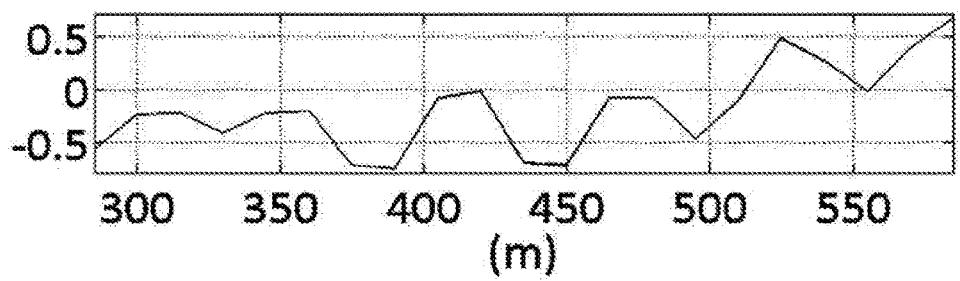
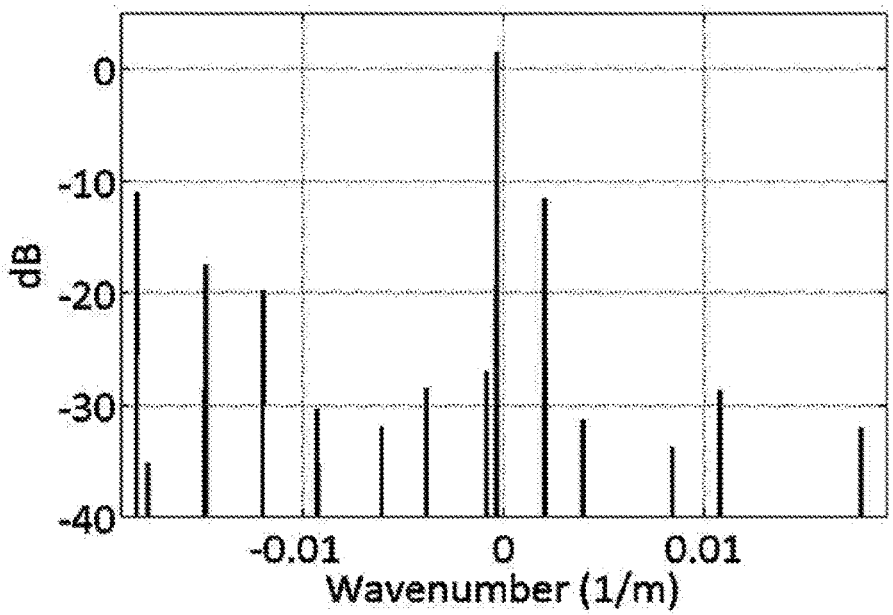
Fig. 7

MIMAP with 4-streamer input 800
Single time-space window, no priors, one spatial dimension 810
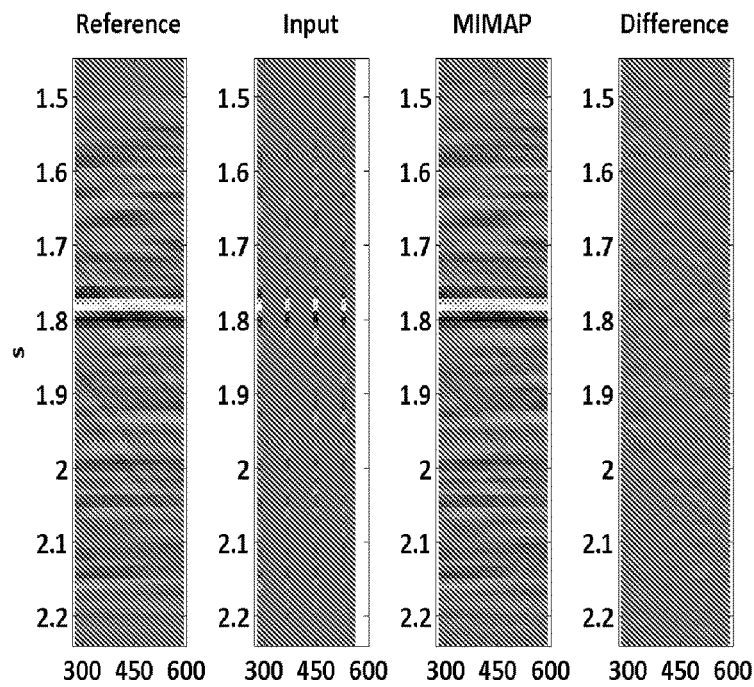
Dipping Weak Signals Missed Out 820
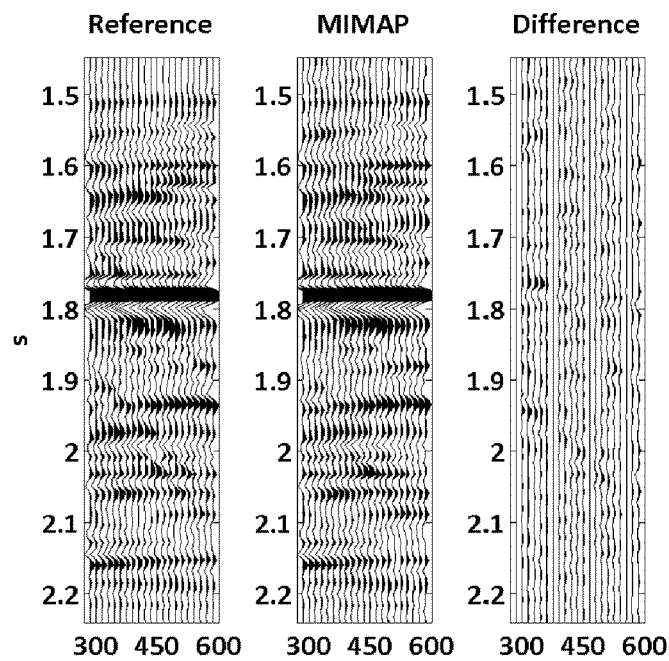
Fig. 8

IAA-MP with 4-streamer input 900
Single time-space window, no priors, one spatial dimension 910
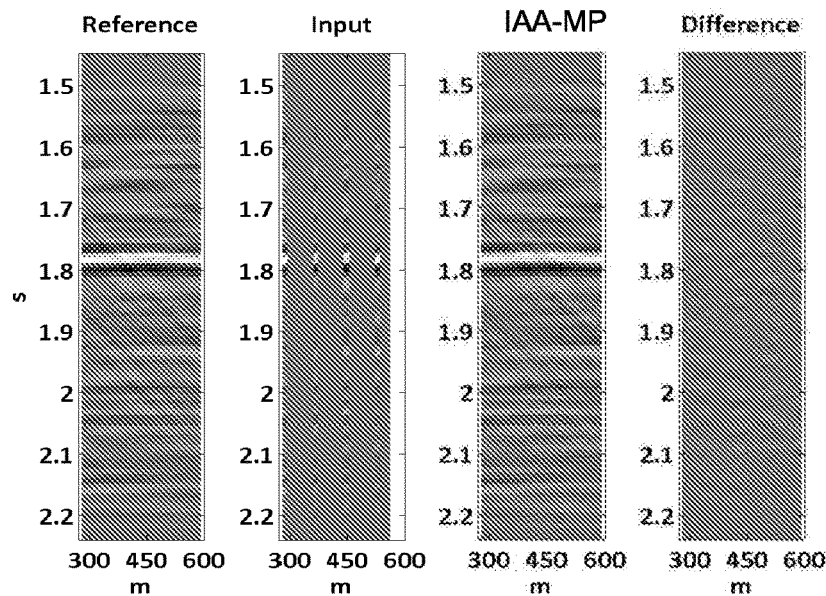
Reference, IAA-MP, Difference 920
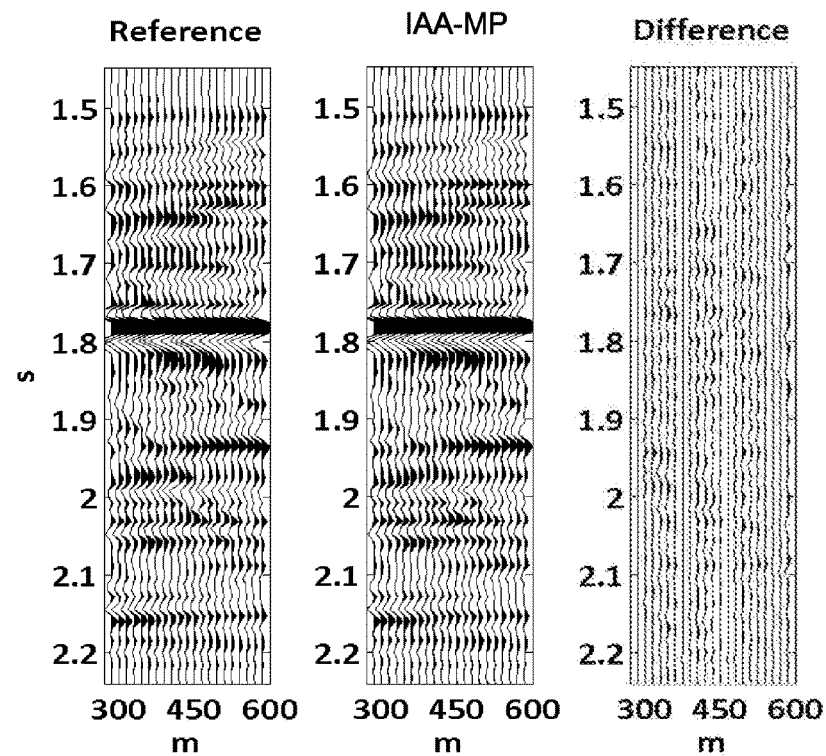
Fig. 9

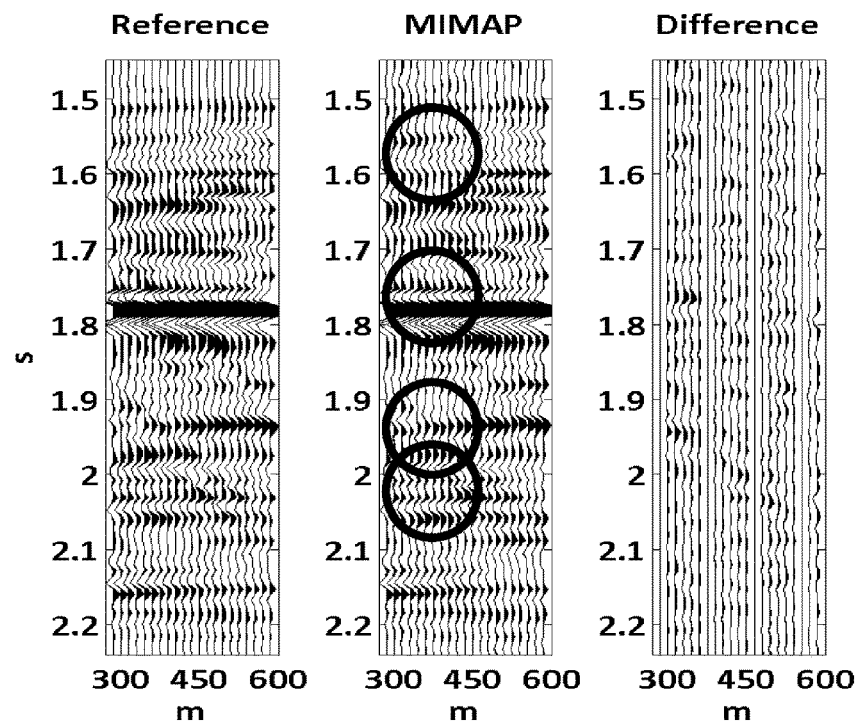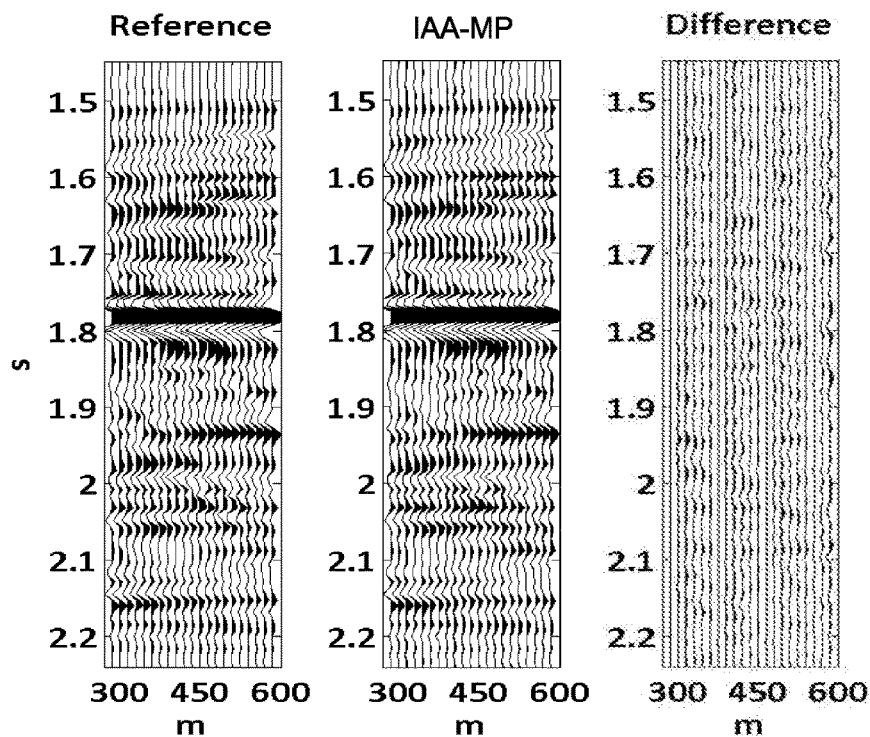
Fig. 10

Compressed Sensing (Multichannel)
1200

$$m = Ac + e$$

m = Measurement Vector
A = Sensing Matrix (dictionary matrix)
c = Vector of Signal Coefficients (sparse)
e = Non-Sparse Noise $$A = [h_1, h_2, \ldots, h_k]$$

Multichannel basis vectors (dictionary atoms)

$$c = [c_1, c_2, \ldots, c_k]^T$$

Complex amplitudes $$s(x) = \sum_{i=1}^{K} c_i \exp(jk_i \cdot x)$$

Signal reconstruction at a desired position

Fig. 12

Multichannel Sampling (Fourier Basis Functions) 1300

Example: 3 pressure sensors, 2 gradient sensors, basis dictionary defined over 100 wavenumbers $$\underbrace{\begin{bmatrix} m_1(\mathbf{x}_1) \\ m_1(\mathbf{x}_2) \\ m_1(\mathbf{x}_3) \\ m_2(\mathbf{x}_4) \\ m_2(\mathbf{x}_5) \end{bmatrix}}_{\mathbf{m}} \begin{matrix} \text{Pressure} \\ \text{data} \\ \\ \text{Gradient} \\ \text{data} \end{matrix} = \underbrace{\begin{bmatrix} \exp(j\mathbf{k}_1 \cdot \mathbf{x}_1) & \exp(j\mathbf{k}_2 \cdot \mathbf{x}_1) & \cdots & \exp(j\mathbf{k}_{100} \cdot \mathbf{x}_1) \\ \exp(j\mathbf{k}_1 \cdot \mathbf{x}_2) & \exp(j\mathbf{k}_2 \cdot \mathbf{x}_2) & \cdots & \exp(j\mathbf{k}_{100} \cdot \mathbf{x}_2) \\ \exp(j\mathbf{k}_1 \cdot \mathbf{x}_3) & \exp(j\mathbf{k}_2 \cdot \mathbf{x}_3) & \cdots & \exp(j\mathbf{k}_{100} \cdot \mathbf{x}_3) \\ j\mathbf{k}_1 \exp(j\mathbf{k}_1 \cdot \mathbf{x}_4) & j\mathbf{k}_2 \exp(j\mathbf{k}_2 \cdot \mathbf{x}_4) & \cdots & j\mathbf{k}_{100} \exp(j\mathbf{k}_{100} \cdot \mathbf{x}_4) \\ j\mathbf{k}_1 \exp(j\mathbf{k}_1 \cdot \mathbf{x}_5) & j\mathbf{k}_2 \exp(j\mathbf{k}_2 \cdot \mathbf{x}_5) & \cdots & j\mathbf{k}_{100} \exp(j\mathbf{k}_{100} \cdot \mathbf{x}_5) \end{bmatrix}}_{\mathbf{h}_1 \quad \mathbf{h}_2 \quad \cdots \quad \mathbf{h}_{100}} \underbrace{\begin{bmatrix} c_1 \\ c_2 \\ \vdots \\ c_{100} \end{bmatrix}}_{\mathbf{c}}$$

Fig. 13

Matching Pursuit for the single channel case 1400

At each iteration:

Solve the nonlinear least-squares problem to find the optimal Fourier vector and its amplitude

$$\left(c^{MP}, \mathbf{h}^{MP}\right) = \arg\min_{i \in \{1,2,\cdots,K\}} \left\| [\mathbf{r} - c_i \mathbf{h}_i] \right\|^2$$

$\mathbf{r} := \mathbf{m}$
$\hat{\mathbf{c}} = 0$

Initialize the residual and the coefficient vector $$i^{MP} = \arg\max_{i \in \{1,2,\cdots,K\}} \left| \mathbf{h}_i^H \mathbf{r} \right|^2$$

Power spectrum computed by DFT indicates the optimal basis vector $$c^{MP} = \mathbf{h}_{i^{MP}}^H \mathbf{r}$$

$\mathbf{r} := \mathbf{r} - c^{MP} \mathbf{h}_{i^{MP}}$
$\hat{c}_{i^{MP}} := \hat{c}_{i^{MP}} + c^{MP}$ Update the residual and the coefficient vector

Fig. 14

Multichannel Compressed Sensing – Solution by Matching Pursuit (EGMP) 1500

At each iteration:
Solve the nonlinear least-squares problem to find the optimal multichannel basis vector and its amplitude $$\left(c_i^{MP}, \mathbf{h}_i^{MP}\right) = \underset{i \in \{1,2,\ldots,\mathcal{K}\}}{\arg\min} \left\| \Lambda^{1/2} [\mathbf{r} - c_i \mathbf{h}_i] \right\|^2$$

$$i^{MP} = \underset{i \in \{1,2,\ldots,\mathcal{K}\}}{\arg\max} \frac{\left|\mathbf{h}_i^H \Lambda \mathbf{r}\right|^2}{\mathbf{h}_i^H \Lambda \mathbf{h}_i}$$

The generalized Lomb spectrum indicates the optimal basis vector $$c^{MP} = \frac{\mathbf{h}_{i^{MP}}^H \Lambda \mathbf{r}}{\mathbf{h}_{i^{MP}}^H \Lambda \mathbf{h}_{i^{MP}}}$$

The multichannel periodogram gives the amplitude $\mathbf{r} = \mathbf{m}$
$\hat{\mathbf{c}} = 0$ Initialize the residual and the coefficient vector $\mathbf{r} := \mathbf{r} - c^{MP} \mathbf{h}_{i^{MP}}$
$\hat{c}_{i^{MP}} := \hat{c}_{i^{MP}} + c^{MP}$ Update the residual and the coefficient vector

Fig. 15

Compressed Sensing, Multichannel
Sampling & Matching Pursuit
1600

Single-channel (normal) compressed sensing involves non-uniform sampling
    Regular sampling can cause hard aliasing Multi-channel sampling allows compressed sensing with regular sampling Matching pursuit (EGMP) solves the aliasing problem of multi-channel regular sampling
    If proper order of aliasing is picked, the aliases are diminished/removed

Fig. 16

Signal 1: Two Events; One Aliased 2000

Signal 3: MIMAP 2900

Features IAA 3800

Amplitude spectral estimation technique

Weighted least squares cost function

Data covariance matrix de-correlates the residual

Covariance matrix can be iteratively computed

Single-snapshot of data

Optionally parameter-free

~15-20 iterations

High accuracy, high resolution at computational cost

Fig. 38

Method 4600

$r^0 = m, \hat{c}^0 = 0$
repeat {MP iterations} *iteration i*
   $g = A^H r^{i-1}$
   $n^{MP} = \max_n \frac{|g_n|^2}{h_n^H h_n}, \forall n = 1, \ldots, N$
   $\hat{c}^i_{n^{MP}} = \hat{c}^{i-1}_{n^{MP}} + \frac{g_{n^{MP}}}{h_{n^{MP}}^H h_{n^{MP}}}$
   $r^i = r^{i-1} - \frac{g_{n^{MP}}}{h_{n^{MP}}^H h_{n^{MP}}} h_{n^{MP}}$
until convergence {MP iterations}
Output: $\hat{c}^i$ Cost 4610

$\mathfrak{L}_{MP} = \left\| r^{i-1} - c_n h_n \right\|_2^2, \forall n = 1, \ldots, N,$

Fig. 46

Method 4700

Input: $m, A$ $r^0 = m, \hat{c}^0 = 0$
repeat {MP iterations} *iteration i*
  repeat {IAA iterations}
    for $n = 1, \ldots, N$ $$\hat{c}_{IAA,n} = \frac{h_n^H \Lambda^{\frac{1}{2}} R^{-1} \Lambda^{\frac{1}{2}} m}{h_n^H \Lambda^{\frac{1}{2}} R^{-1} \Lambda^{\frac{1}{2}} h_n}$$

$$P_n = \left| \hat{c}_{IAA,n} \right|^2$$

end {for}
    $P = \text{diag}(P_1 \quad P_2 \quad \ldots \quad P_N)$
    $R = APA$
  until convergence {IAA iteratrions}

$$\mathfrak{L}_{IAA-MP,n} = P_n h_n^H \Lambda^{\frac{1}{2}} R^{-1} \Lambda^{\frac{1}{2}} h_n, \forall n = 1, \ldots, N$$

$$n^{IAA-MP} = \max_n \eta_n \mathfrak{L}_{IAA-MP,n}, \forall n = 1, \ldots, N$$

$$\hat{c}^i_{n^{IAA-MP}} = \hat{c}^{i-1}_{n^{IAA-MP}} + \hat{c}_{IAA,n^{IAA-MP}}$$

$$r^i = r^{i-1} - \hat{c}_{n^{IAA-MP}} h_{n^{MP}}$$

until convergence {MP iterations}
Output: $\hat{c}^i$

Fig. 47

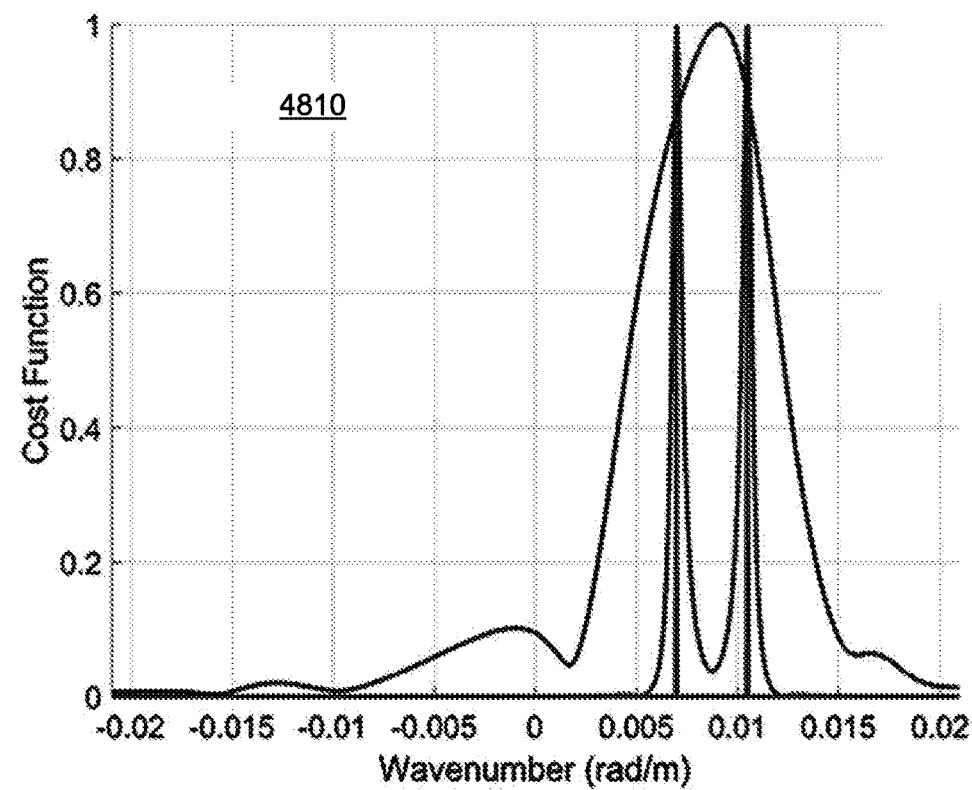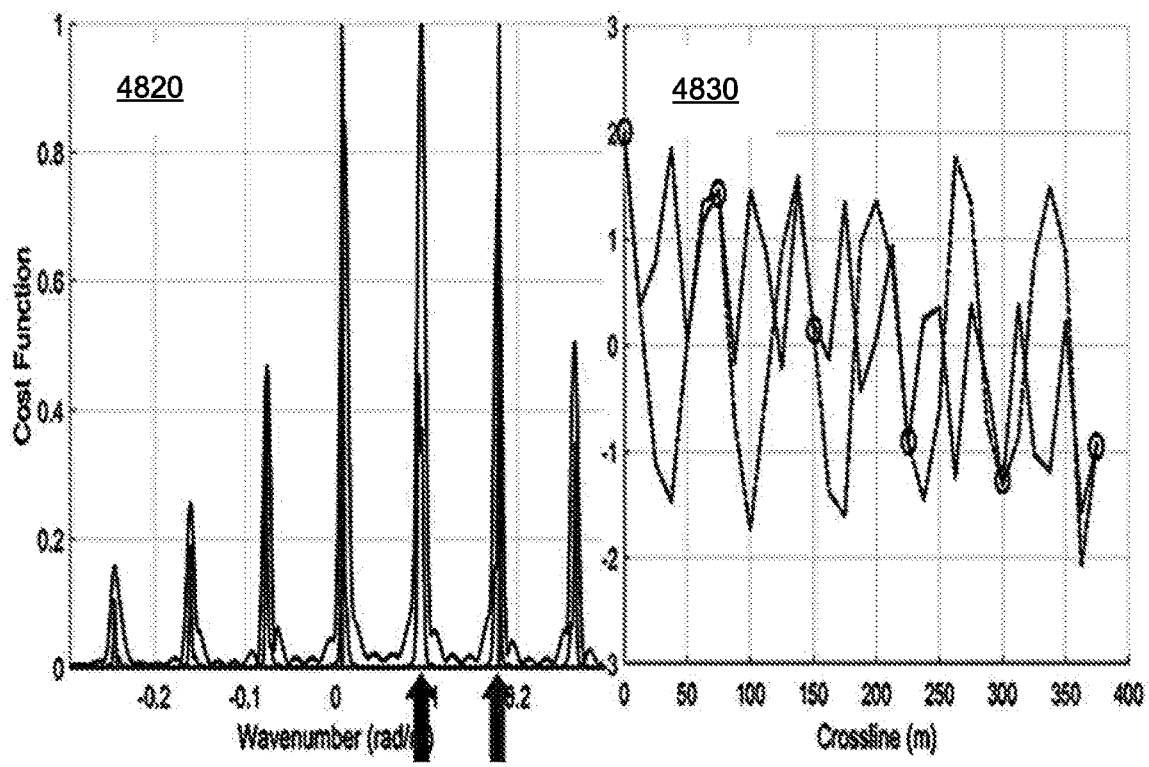
Fig. 48

COMPRESSIVE SENSING IMAGING

RELATED APPLICATIONS

This application claims priority to and the benefit of a US Provisional application having Ser. No. 62/478,586, filed 29 Mar. 2017, which is incorporated by reference herein.

BACKGROUND

Reflection seismology finds use in geophysics to estimate properties of subsurface formations. Reflection seismology may provide seismic data representing waves of elastic energy, as transmitted by P-waves and S-waves, in a frequency range of approximately 1 Hz to approximately 100 Hz. Seismic data may be processed and interpreted to understand better one or more of composition, fluid content, extent and geometry of subsurface rocks.

SUMMARY

A method can include receiving data acquired via survey equipment disposed in an environment; analyzing at least a portion of the data via an iterative adaptive approach that implements matching pursuit to generate analysis results; and identifying at least one feature in the environment based at least in part on a portion of the analysis results. A system can include a processor; memory accessible by the processor; one or more computer-readable storage media that include processor-executable instructions to instruct the system to: receive data acquired via survey equipment disposed in an environment; analyze at least a portion of the data via an iterative adaptive approach that implements matching pursuit to generate analysis results; and identify at least one feature in the environment based at least in part on a portion of the analysis results. One or more computer-readable storage media can include processor-executable instructions to instruct a computing system to: receive data acquired via survey equipment disposed in an environment; analyze at least a portion of the data via an iterative adaptive approach that implements matching pursuit to generate analysis results; and identify at least one feature in the environment based at least in part on a portion of the analysis results.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates a geologic environment and a technique;
FIG. 2 illustrates multiple reflections and techniques;
FIG. 5 illustrates an example of a method;
FIG. 7 illustrates example plots of data;
FIG. 8 illustrates an example of a MIMAP data analysis;
FIG. 9 illustrates an example of an IAA-MP data analysis;
FIG. 10 illustrates results of the MIMAP data analysis and results of the IAA-MP data analysis;
FIG. 12 illustrates examples of equations associated with compressed sensing for multichannel information;
FIG. 13 illustrates examples of equations for analysis of data via Fourier basis functions;
FIG. 14 illustrates an example of a matching pursuit (MP) method for a single channel;
FIG. 15 illustrates an example of a matching pursuit (MP) method for multiple channels;
FIG. 16 illustrates examples of implementations of various methods;
FIG. 38 illustrates various examples of features of one or more methods.

FIG. 46 illustrates pseudo-code of an example of a method and an example of a cost equation;

FIG. 47 illustrates pseudo-code of an example of a method that includes MP iterations and IAA iterations;

FIG. 48 illustrates an example plot of cost functions and examples of plots of cost functions;

DETAILED DESCRIPTION

Figure 3:
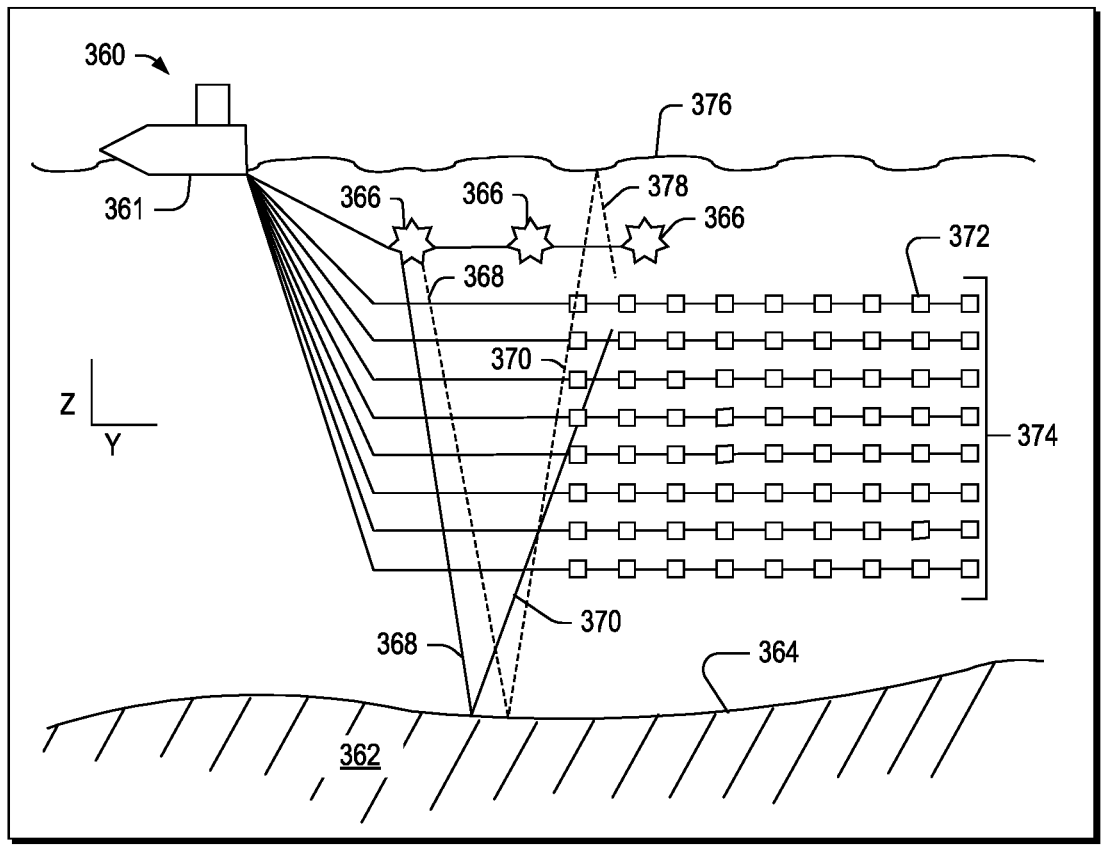
FIG. 3 illustrates a survey technique.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics to estimate properties of subsurface formations. Reflection seismology may provide seismic data representing waves of elastic energy, as transmitted by P-waves and S-waves, in a frequency range of approximately 1 Hz to approximately 100 Hz or optionally less than 1 Hz and/or optionally more than 100 Hz. Seismic data may be processed and interpreted to understand better one or more of composition, fluid content, extent and geometry of subsurface rocks.

FIG. 1 shows a geologic environment 100 (an environment that includes a sedimentary basin, a reservoir 101, a fault 103, one or more fractures 109, etc.) and an acquisition technique 140 to acquire seismic data (see data 160). A system may process data acquired by the technique 140 to allow for direct or indirect management of sensing, drilling, injecting, extracting, etc., with respect to the geologic environment 100. In turn, further information about the geologic environment 100 may become available as feedback (optionally as input to the system). An operation may pertain to a reservoir that exists in the geologic environment 100 such as the reservoir 101. A technique may provide information (as an output) that may specifies one or more location coordinate of a feature in a geologic environment, one or more characteristics of a feature in a geologic environment, etc.

The geologic environment 100 may be referred to as or include one or more formations. A formation may be a unit of lithostratigraphy such as a body of rock that is sufficiently distinctive and continuous that it can be mapped. In stratigraphy, a formation may be a body of strata of predominantly one type or combination of types where multiple formations form groups, and subdivisions of formations are members.

A sedimentary basin may be a depression in the crust of the Earth formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

A system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (about properties and/or structures of a subsurface region). As an example, a structure may be a geological feature produced by deformation of the Earth's crust, such as a fold or a fault; a feature within a rock, such as a fracture or bedding surface; or, more generally, the spatial arrangement of rocks. A reservoir may be considered to be a structure. A geobody may be considered to be a structure. As an example, a salt dome may be a geobody. For example, consider a mushroom-shaped or plug-shaped diapir made of salt, which may have an overlying cap rock. Salt domes may form as a consequence of the relative buoyancy of salt when buried beneath other types of sediment. The salt can flow upward to form salt domes, sheets, pillars and other structures. Hydrocarbons may be found around salt domes because of the abundance and variety of traps created by salt movement and the association with evaporite minerals that can provide sealing capabilities.

As an example, a method may be employed to enhance compressive sensing imaging to identify a trap. As an example, a trap can be a configuration of rocks suitable for containing hydrocarbons and sealed by a relatively impermeable formation through which hydrocarbons do not readily migrate. Traps can be described as structural traps (e.g., in deformed strata such as folds and faults) or stratigraphic traps (e.g., in areas where rock types change, such as unconformities, pinch-outs and reefs). A trap can be a component of a petroleum system.

As an example, compressive sensing imaging may include a method that enhances wavefield reconstruction. As an example, consider a survey that acquires data in a region that includes a pre-salt layer, which is a geological formation on the continental shelves. It is the geological layers that were laid down before a salt layer accumulated above them during the Gondwana breakup. Some of the petroleum that was formed in the pre-salt layer has not leaked upward (see, e.g., salt dome) to the post-salt layers above. Such structural phenomena can be visible through seismological imaging of environments off the coast of Africa and Brazil. Oil and natural gas reserves lie below an approximately 2000 m deep layer of salt, itself below an approximately 2000 m deep layer of rock under about 2000-3000 m of the Atlantic. Drilling through the rock and salt to extract the pre-salt oil and gas tends to be challenging at least in part due to depth.

As an example, a time series survey may be performed where multiple individual surveys take place at particular times, which may be during a production phase of a reservoir. For example, consider a field being developed over a period of years where two or more surveys may be performed to acquire data that can be analyzed to determine how fluids and/or structures may change over time (e.g., in response to production). In such an example, a method may include analyzing acquired data using an IAA-MP approach that can enhance compressive sensing imaging to reconstruct wavefields, optionally while deghosting (e.g., for marine streamer based acquisition techniques for a subsea environment). Acquired data can include data acquired from multisensory streamers that include pressure and acceleration, for example, in crossline and vertical directions. An analysis method may provide for joint wavefield reconstruction and deghosting of compressive sensing imaging data. Results from such an analysis can be interpreted for identification of structure(s) and/or fluid(s).

A system may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance.

A system may include add-ons or plug-ins that operate according to specifications of a framework environment. A commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. Seismic data may be processed using a framework such as the OMEGA® framework (Schlumberger Limited, Houston, Tex.). The OMEGA® framework provides features that can be implemented for processing of seismic data. A framework may be scalable such that it enables processing and imaging on a single workstation, on a massive compute cluster, etc.

A framework for processing data may include features for 2D line and 3D seismic surveys. A seismic survey can be an imaging technique that images a subterranean environment. A framework for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and poststack seismic data conditioning, inversion (seismic to properties and properties to synthetic seismic), wedge modeling for thin-bed analysis, amplitude versus offset (AVO) and amplitude versus angle (AVA) analysis, reconnaissance, etc. A workflow may aim to output rock properties based at least in part on processing of seismic data. Various types of data may be processed to provide one or more models (earth models); consider processing of one or more of seismic data, well data, electromagnetic and magnetic telluric data, reservoir data, etc.

In FIG. 1, the geologic environment 100 includes an offshore portion and an on-shore portion. A geologic environment may be or include one or more of an offshore geologic environment, a seabed geologic environment, an ocean bed geologic environment, etc.

The geologic environment 100 may be outfitted with any of a variety of sensors, detectors, actuators, etc. Equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. One or more satellites may be provided for purposes of communications, data acquisition, etc.; noting that a satellite may additionally or alternatively include circuitry for imagery (spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109; consider a well in a shale formation that may include natural fractures, artificial fractures (hydraulic fractures) or a combination of natural and artificial fractures. A well may be drilled for a reservoir that is laterally extensive. Lateral variations in properties, stresses, etc. may exist where an assessment of such variations may assist with planning, operations, etc. to develop the reservoir (via fracturing, injecting, extracting, etc.). The equipment 107 and/or 108 may include components, a system, systems, etc. for fracturing, seismic sensing, analysis of seismic data, assessment of one or more fractures, etc.

A system may be used to perform one or more workflows. A workflow may be a process that includes a number of worksteps. A workstep may operate on data to create new data, to update existing data, etc. A system may operate on one or more inputs and create one or more results based on one or more algorithms. A system may include a workflow editor for creation, editing, executing, etc. of a workflow. A workflow may include receiving instructions to interact with rendered information to process information and optionally render processed information. A workflow may include transmitting information that may control, adjust, initiate, etc. one or more operations of equipment associated with a geologic environment.

In FIG. 1, the technique 140 may be implemented with respect to a geologic environment 141. As shown, an energy source (a transmitter) 142 may emit energy where the energy travels as waves that interact with the geologic environment 141. The geologic environment 141 may include a bore 143 where one or more sensors (receivers) 144 may be positioned in the bore 143. Energy emitted by the energy source 142 may interact with a layer (a structure, an interface, etc.) 145 in the geologic environment 141 such that a portion of the energy is reflected, which may then be sensed by one or more of the sensors 144. Such energy may be reflected as an upgoing primary wave (or "primary" or "singly" reflected wave). A portion of emitted energy may be reflected by more than one structure in the geologic environment and referred to as a multiple reflected wave (or "multiple"). The geologic environment 141 is shown as including a layer 147 that resides below a surface layer 149. Given such an environment and arrangement of the source 142 and the one or more sensors 144, energy may be sensed as being associated with particular types of waves.

FIG. 1 also shows various types of waves as including P, SV an SH waves. A P-wave can be an elastic body wave or sound wave in which particles oscillate in the direction the wave propagates. P-waves incident on an interface (at other than normal incidence, etc.) may produce reflected and transmitted S-waves ("converted" waves). An S-wave or shear wave can be an elastic body wave in which particles oscillate perpendicular to the direction in which the wave propagates. S-waves may be generated by a seismic energy sources (other than an air gun). S-waves may be converted to P-waves. S-waves tend to travel more slowly than P-waves and do not travel through fluids that do not support shear. In general, recording of S-waves involves use of one or more receivers operatively coupled to earth (capable of receiving shear forces with respect to time). Interpretation of S-waves may allow for determination of rock properties such as fracture density and orientation, Poisson's ratio and rock type by crossplotting P-wave and S-wave velocities, and/or by other techniques. Parameters that may characterize anisotropy of media (seismic anisotropy) can include one or more of the Thomsen parameters $\epsilon$, $\delta$ and $\gamma$.

Seismic data may be acquired for a region in the form of traces. In FIG. 1, the technique 140 may include the source 142 for emitting energy where portions of such energy (directly and/or reflected) may be received via the one or more sensors 144. Energy received may be discretized by an analog-to-digital converter that operates at a sampling rate. Acquisition equipment may convert energy signals sensed by a sensor to digital samples at a rate of one sample per approximately 4 ms. Given a speed of sound in a medium or media, a sample rate may be converted to an approximate distance. The speed of sound in rock may be of the order of around 5 km per second. Thus, a sample time spacing of approximately 4 ms would correspond to a sample "depth" spacing of about 10 meters (assuming a path length from source to boundary and boundary to sensor). A trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing scenario is divided by two (to account for reflection), for a vertically aligned source and sensor, the deepest boundary depth may be estimated to be about 10 km (assuming a speed of sound of about 5 km per second).

FIG. 2 shows a geologic environment 201 that includes a seabed 203 and a sea surface 205. As shown, equipment 210 such as a ship may tow an energy source 220 and a string of sensors 230 at a depth below the sea surface 205. The energy source 220 may emit energy at a time T0, a portion of that energy may be reflected from the seabed 203 at a time T1 and a portion of that reflected energy may be received at the string of sensors 230 at a time T2.

As mentioned with respect to the technique 140 of FIG. 1, a wave may be a primary or a wave may be a multiple. As shown in an enlarged view of the geologic environment 201, the sea surface 205 may act to reflect waves such that sensors 232 of the string of sensors 230 may sense multiples as well as primaries. In particular, the sensors 232 may sense so-called sea surface multiples, which may be multiples from primaries or multiples of multiples (due to sub-seabed reflections, etc.).

Each of the sensors 232 may sense energy of an upgoing wave at a time T2 where the upgoing wave reflects off the sea surface 205 at a time T3 and where the sensors may sense energy of a downgoing multiple reflected wave at a time T4 (see also the data 160 of FIG. 1 and data 240 of FIG. 2). Sensing of the downgoing multiple reflected wave may be considered noise that interferes with sensing of one or more upgoing waves. An approach that includes summing data acquired by a geophone and data acquired by a hydrophone may help to diminish noise associated with downgoing multiple reflected waves. Such an approach may be employed where sensors may be located proximate to a surface such as the sea surface 205 (arrival times T2 and T4 may be relatively close). The sea surface 205 or a water surface may be an interface between two media; consider an air and water interface. Due to differing media properties, sound waves may travel at about 1,500 m/s in water and at about 340 m/s in air. At an air and water interface, energy may be transmitted and reflected.

Each of the sensors 232 may include at least one geophone 234 and a hydrophone 236. A geophone may be a sensor configured for seismic acquisition, whether onshore and/or offshore, that can detect velocity produced by seismic waves and that can transform motion into electrical impulses. A geophone may be configured to detect motion in a single direction. A geophone may be configured to detect motion in a vertical direction. Three mutually orthogonal geophones may be used in combination to collect so-called 3C seismic data. A hydrophone may be a sensor configured for use in detecting seismic energy in the form of pressure changes under water during marine seismic acquisition. Hydrophones may be positioned along a string or strings to form a streamer or streamers that may be towed by a seismic vessel (or deployed in a bore). Thus, in FIG. 2, the at least one geophone 234 can provide for motion detection and the hydrophone 236 can provide for pressure detection. The data 240 (analog and/or digital) may be transmitted via equipment for processing, etc.

A method may include analysis of hydrophone response and vertical geophone response, which may help to improve a PZ summation by reducing receiver ghost and/or free surface-multiple noise contamination. A ghost may be defined as a reflection of a wavefield as reflected from a water surface (water and air interface) that is located above a receiver, a source, etc. (a receiver ghost, a source ghost, etc.). A receiver may experience a delay between an upgoing wavefield and its downgoing ghost, which may depend on depth of the receiver.

A surface marine cable may be or include a buoyant assembly of electrical wires that connect sensors and that can relay seismic data to the recording seismic vessel. A multi-streamer vessel may tow more than one streamer cable to increase the amount of data acquired in one pass. A marine seismic vessel may be about 75 m long and travel about 5 knots while towing arrays of air guns and streamers containing sensors, which may be located about a few meters below the surface of the water. A so-called tail buoy may assist crew in location an end of a streamer. An air gun may be activated periodically, such as about each 25 m (about at 10 second intervals) where the resulting sound wave travels into the Earth, which may be reflected back by one or more rock layers to sensors on a streamer, which may then be relayed as signals (data, information, etc.) to equipment on the tow vessel.

In FIG. 2, the equipment 210 may include a system such as the system 250. As shown in FIG. 2, the system 250 includes one or more information storage devices 252, one or more computers 254, one or more network interfaces 260 and one or more modules 270. As to the one or more computers 254, each computer may include one or more processors (or processing cores) 256 and memory 258 for storing instructions executable by at least one of the one or more processors. A computer may include one or more network interfaces (wired or wireless), one or more graphics cards, a display interface (wired or wireless), etc. A system may include one or more display devices (optionally as part of a computing device, etc.).

Pressure data may be represented as "P" and velocity data may be represented as "Z"; noting, however, that the vertical component of a measured particle velocity vector may be denoted "V" and that "Z" may refer to a scaled, measured particle velocity. In various equations presented herein, "V" represents a measured velocity and "Z" represents a scaling thereof.

A hydrophone may sense pressure information (P data) and a geophone may sense velocity information (V and/or Z data). A hydrophone may output signals, optionally as digital data for receipt by a system. A geophone may output signals, optionally as digital data for receipt by a system. The system 250 may receive P and V/Z data via one or more of the one or more network interfaces 260 and process such data via execution of instructions stored in the memory 258 by the processor 256. The system 250 may store raw and/or processed data in one or more of the one or more information storage devices 252.

FIG. 3 shows a side view of a marine-based survey 360 of a subterranean subsurface 362. In the survey 360 of FIG. 3, the subsurface 362 includes a seafloor surface 364. Seismic sources 366 may include marine sources such as vibroseis or air guns, which may propagate seismic waves 368 (energy signals) into the Earth over an extended period of time or at a nearly instantaneous energy provided by impulsive sources. The seismic waves may be propagated by marine sources as a frequency sweep signal. Marine sources of the vibroseis type may initially emit a seismic wave at a low frequency (about 5 Hz) and increase the seismic wave to a higher frequency (about 80 Hz to about 90 Hz or more) over time.

The component(s) of the seismic waves 368 may be reflected and converted by the seafloor surface 364 (as a reflector), and seismic wave reflections 370 may be received by a plurality of seismic receivers 372. Seismic waves may penetrate the subsurface 362 below the seafloor surface 364 and be reflected by one or more reflectors therein and received by one or more of the plurality of seismic receivers 372. As shown in FIG. 3, the seismic receivers 372 may be disposed on a plurality of streamers (a streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like. One or more streamer steering devices may be used to control streamer position.

In one implementation, the seismic wave reflections 370 may travel upward and reach the water/air interface at the water surface 376, a portion of reflections 370 may then reflect downward again (sea-surface ghost waves 378) and be received by the plurality of seismic receivers 372. The sea-surface ghost waves 378 may be referred to as surface multiples. The point on the water surface 376 at which the wave is reflected downward may be referred to as a downward reflection point.

Electrical signals generated by one or more of the receivers 372 may be transmitted to a vessel 361 via transmission cables, wireless communication or the like. The vessel 361 may then transmit the electrical signals to a data processing center. Alternatively, the vessel 361 may include an onboard computing system capable of processing the electrical signals (representing seismic data). Surveys may be of formations deep beneath the surface. The formations may include multiple reflectors, some of which may include dipping events, and may generate multiple reflections (including wave conversion) for receipt by the seismic receivers 372. Seismic data may be processed to generate a seismic image of the subsurface.

A marine seismic acquisition system may tow streamers in the streamer array 374 at an approximate even depth (about 5 m to about 10 m). However, the marine based survey 360 may tow each streamer in streamer array 374 at different depths such that seismic data may be acquired and processed in a manner that avoids the effects of destructive interference due to sea-surface ghost waves. For instance, the marine-based survey 360 of FIG. 3 illustrates eight streamers towed by the vessel 361 at eight different depths. The depth of each streamer may be controlled and maintained using the birds disposed on each streamer.

A survey may use equipment that can be positioned on a seabed such as seismic sensor nodes. Such nodes may include motion sensors that can measure one or more of displacement, velocity and acceleration. A motion sensor may be a geophone, an accelerometer, etc. As to pressure waves, a node may include pressure wave sensors such as hydrophones. Various nodes may optionally be coupled via a cable or cables. A cable may include one or more sensors. A cable that extends from, to, between, etc., one or more nodes may optionally include one or more sensors that may include one or more geophones, one or more hydrophones, etc.

As mentioned, a vessel or vessels may include one or more sensors that may be towable. A streamer that includes one or more sensors may be towed by a vessel and utilized to acquire information such as seismic information associated with energy emitted by one or more sources.

A streamer can include sensor circuitry for acquiring measurements of a seismic pressure wavefield and its gradient; consider sensor circuitry that can measure a seismic pressure wavefield and its gradient in vertical and crossline directions.

Streamers can be towed at spatial distances in a range of between about 50 meters and about 200 meters. Sampling in a crossline direction may be in a range of about 16 times to about 64 times sparser than an inline direction. In such a survey approach, seismic energy propagating with a substantial crossline element (across a streamer spread) may become aliased and create noise in image volumes (as may be subsequently used for structural and stratigraphic inversion, etc.). Such effects can increases risk in exploration, appraisal, development, and production activities.

A streamer can include point-receiver circuitry. A point-receiver approach can combine hydrophones with tri-axial microelectromechanical system (MEMS) accelerometers. In such a streamer, the MEMS accelerometers can measure a substantial bandwidth of particle acceleration due to up- and down-going seismic wavefields. Measurements of particle acceleration can be directly related to a gradient in a pressure wavefield. A streamer can include the ISOMETRIX™ technology, which includes point-receiver circuitry (Schlumberger Limited, Houston, Tex.).

A streamer can include particle motion sensors that are sensitive to acoustical vibrations within a streamer cable. Streamer technology can account for one or more noise modes that may propagate along at least a portion of a streamer. A noise mode can depend on one or more factors. A noise mode can depend on streamer construction and sensor positioning.

A streamer may be implemented to perform dense single-sensor sampling of accelerometers. Such an approach can allow for accurately characterizing and removing one or more noise modes at least in part at low frequencies. One or more technologies and/or methods can provide for suppression of noise. Noise suppression can provide reliable signal from accelerometers below about 10 Hz. Where a system includes a spread of about 12 streamers of about 8 km lengths, such a system can include over about 500,000 active sensors. In such a streamer, an acquisition system can provide for continuously recording of individual shots that are part of a seismic survey. A method can include storing data and/or processing data.

As an example, for a streamer segment of about 100 meters in length, the streamer segment may include one hundred or more spacers; consider a streamer segment with about four hundred spacers over about 100 meters (spacing center-to-center of about 25 centimeters). A streamer outer tube may be of a diameter of the order of tens of millimeters (about 20 millimeters to about 80 millimeters). A streamer can include a number of sensors, which may be spaced axially; consider about 643-axis accelerometers (3C geophones) and about 32 hydrophones; noting that other arrangements, types of sensors, number of sensors, etc., may be included in a streamer. Such sensors may be within respective housings and operatively coupled to one or more wires, fibers, etc. Wires and/or fibers may be individually spaced and/or gathered together with a sheath or other binding material about them.

More than one sensor package may be included in a chamber of a streamer where the sensor packages in the chambers may optionally differ (as to sensor type, etc.). A streamer cable can include a plurality of pressure sensors (hydrophones) and a plurality of particle velocity sensors (geosensors, geophones or accelerometers).

Sampling noise can be kT/C noise (thermal noise), which can be introduced by switching and can degrade a dynamic range of a sensor. As an example, an accelerometer can include a charge amplifier configured with an input terminal that is continuously connected to a mobile electrode (e.g., during times in which the sensor receives both actuation and activation voltages). In such an approach, sampling noise can be reduced in comparison to circuitry that does not include such a configuration of components.

A sensor package may include a three component (3C) particle motion sensor assembly; consider a 3C accelerometer assembly. Such an assembly may acquire inline (x), crossline (y) and vertical (z) particle acceleration measurements; consider an accelerometer assembly that includes microelectromechanical system (MEMS) sensor units that sense accelerations along respective inline (x), crossline (y) and vertical (z) axes. In a package, orientations of MEMS sensor units may be appropriately varied for purposes of alignment with corresponding axes.

Streamer cables may be spooled onto drums for storage on a vessel, which subjects the streamer cables to various contact and bending forces, etc. (consider winding and unwinding operations).

Assuming that a direct arrival has been removed from measured data (e.g., a source may also be shot at a depth greater than the measuring cable depth), measured pressure data may be written as a combination of upgoing and downgoing wavefields as well as measured noise:

$$P_n = U + D + n_p.$$

In the foregoing expression, U represents the upgoing wavefield; D represents the downgoing wavefield; and $n_p$ is the pressure noise. In such an example, the combination U+D can result in constructive interference and destructive interference in different frequencies along a signal spectrum. For example, such interference(s) can create nulls or notches in a recorded spectrum, which may reduce the effective bandwidth of the recorded seismic wavefield.

In the frequency domain, D can be written as a function of U by using the wavefield extrapolation operator $\Psi$ and the reflection coefficient E at the water-air interface as follows:

$$D(f) = \varepsilon \Psi U(f) = \varepsilon e^{-j2\pi f \tau} U(f).$$

In the foregoing equation, j is the imaginary unit, f represents frequency and $\tau$ is the time delay that the upgoing wave will take to travel to the sea surface and reflect back to the recording seismic array. For a flat sea surface, the reflection coefficient can be approximated as $\varepsilon \approx -1$. Note that in the special case of vertical incidence angle, the delay $$\tau = \frac{2z}{c}$$

where z is the cable depth (e.g., streamer depth) and c is the acoustic speed of seismic wave in water. Also, the expression can be written in the frequency wavenumber (FK) domain as:

$$D(f,k) = \varepsilon e^{-j2z k_z} U(f,k),$$

where $k_z$ represents the vertical wavenumber and given by:

$$k_z = \frac{2\pi f}{c} \cos\theta = \sqrt{\left(\frac{2\pi f}{c}\right)^2 - k_x^2 - k_y^2},$$

where $\theta$ is the incidence angle of the wavefield at the receiver and where $k_x$ and $k_y$ denote the inline and cross line wavenumbers, respectively. By substituting the expression for D, one may obtain the following expression for the total pressure:

$$P_n = (1 + \varepsilon e^{-j2z k_z}) U + n_p = G_p U + n_p.$$

where $G_p$ may be referred to as the pressure ghost operator. Per equation, ghost notches, where present, can be a function of frequency, depth of streamer and incidence angle.

In a deghosting problem, a solution may aim to provide an estimate of U. A method may aim to fill ghost notches where present, may attempt to restore signal bandwidth, etc., and, as a result, increase resolution of a final seismic image (e.g., via an imaging technique such as survey imaging technique).

Particle motion measurements can describe a particle displacement vector itself, or alternatively and equivalently a particle velocity vector or a particle acceleration vector, depending on the measuring devices, and or any subset of the components of these vectors. In some embodiments, a method may include applying one or more methods and techniques to multi-measurement deghosting.

As an example, a method can include processing seismic data where the method may jointly interpolate and deghost densely sampled multicomponent seismic data, which can be seismic data acquired using a marine acquisition system. For example, the ISOMETRIX® marine system (Schlumberger Limited, Houston, Tex.) may be utilized to acquire seismic data (e.g., as part of a marine seismic survey). As an example, a computerized system can receive and process seismic data to generate results, which can be utilized to identify structures and/or fluids in the earth.

A method may be implemented for wavefield reconstruction and 3D deghosting. A technique known as generalized matching pursuit (GMP) can be implemented via the ISOMETRIX® marine system to simultaneously reconstruct a pressure wavefield and perform 3D deghosting. For example, survey equipment of the ISOMETRIX® marine system can acquire multimeasurement data that can be processed via one or more computers or computing systems for pressure wavefield reconstruction and deghosting. As an example, a system may generate a field deliverable, which includes a "carpet" of channels for individual shot points such as, for example, approximately 6.25 m channel intervals on virtual streamers towed at a nominal approximately 6.25 m lateral separation, which may be referred to as an IsoGrid.

The aforementioned GMP approach can handle components of a seismic wavefield, including those not confined to travelling straight from source to receiver (e.g., consider those with a degree of propagation across the streamer spread). A method may aim to process data as to one or more of seismic reflections, diffractions, multiples or other noise modes with reduction in artefacts generation in results, which can be interpretation volumes (e.g., seismic cubes that may be analyzed via one or more frameworks for structures, fluids, etc.).

Using the aforementioned GMP approach, energy arriving from a crossline direction, which had previously been spatially aliased and wrapped around as noise on conventional shot records, may be sampled appropriately both spatially and temporally. GMP can be referred to as a data-driven approach to reconstruct a pressure wavefield. GMP may be implemented in situations where recorded seismic events may be exposed to a high order of aliasing in the crossline direction.

As to source deghosting, consider use of a broadband delta calibrated marine broadband seismic source that provides improved low-frequency content and lacks source notches below approximately 150 Hz for directions within an approximately 20 degree cone from vertical. As an example, residual spectral shaping may be performed after wavefield reconstruction.

After wavefield reconstruction to an IsoGrid, one or more processing techniques may be implemented to meet survey intent, project development, etc. One or more techniques may utilize a dense, 3D geometry of IsoGrid shot records, for example, to enable more powerful 3D noise attenuation or accurate multiple prediction.

As an example, one or more methods may be utilized that can allow for towing wider, increasing streamer separation, while reconstructing measurements equivalent to finer cable separations while maintaining crossline sampling. Such methods may help increase acquisition rates, which can lead to reduced operational, weather, and environmental exposure. As an example, multi-vessel operations may be implemented, for example, doubling or tripling sub-surface coverage per sail line.

One or more methods may be implemented to improve resolution for reservoir characterization, for example, for appraisal, field development or other purpose(s). For example, consider a method that can process data to provide a more detailed understanding of the overburden (e.g., in imaging deeper reservoir units), establishing a safe and efficient well design (e.g., equipment, trajectory, operation, etc.) to reach a target, etc.

As an example, one or more methods may be part of a 4D seismic survey. For example, a 4D seismic survey may be implemented for production monitoring. A marine seismic system can include elements for time-lapse (4D) repeat acquisition. A system may have an ability to reconstruct a wavefield at a desired location, with repeatability to a level to better reveal subtle variations in seismic responses related to changes in reservoir fluids and pressure. An ability to reconstruct both the up- and downgoing wavefields can allow for redatuming to improve comparison with baseline surveys, while providing a broadband dataset fit for future high-resolution monitor surveys.

An international application published under the Patent Cooperation Treaty (PCT) having International Publication Number WO 2015/168130 A1 is incorporated by reference herein, to Özbek et al. and entitled "Wavefield Reconstruction".

As an example, one or more method may be implemented to analyze data acquired using a compressive sensing technique or techniques. For example, compressive sensing may be utilized in medical imaging (e.g., PET, CT, MRI, ultrasound, etc.), radar, sonar, digital imaging, etc. For example, a MR scanner may acquire data from a body responsive to delivering energy via a time varying magnetic field to the body and acquiring data as to relaxation of certain atoms as a portion of the delivered energy dissipates in the presence of a static magnetic field. Such data may be analyzed by a computer that can implement an IAA-MP approach to enhance generation of an image that can be rendered to a display. Such an enhanced image may present details that allow for identification of one or more structures in the body and/or fluid in the body. Such a body may be a mammalian body (e.g., a human body).

Compressed sensing or compressive sensing (e.g., compressive sampling or sparse sampling) is a signal processing technique that can be implemented to more efficiently acquire and reconstruct a signal through obtaining solutions to underdetermined systems. Through optimization, sparsity of a signal may possibly be exploited to recover it from far fewer samples than through adherence to the Shannon-Nyquist sampling theorem (e.g., a theorem that aims to establish a sufficient condition for a sample rate that permits a discrete sequence of samples to capture the information from a continuous-time signal of finite bandwidth). Two conditions under which recovery may be possible include: sparsity where a signal is sparse in some domain; and incoherence which may be applied through the isometric property as sufficient for sparse signals.

Compressive sensing may be utilized in signal processing and compression, solution of inverse problems, design of radiating systems, radar and through-the-wall imaging, and antenna characterization. Imaging techniques having a strong affinity with compressive sensing include coded aperture and computational photography. Implementations of compressive sensing in hardware and/or software executing on hardware may be utilized at one or more different technology readiness levels. In an acquisition system, a method may be applied as part of the acquisition system. In an interpretation system, a method may be applied as part of the interpretation system. In a modeling system, a method may be applied as part of the modeling system.

As an example, time series data may be analyzed where a region is imaged at different times. For example, a four-dimensional seismic survey can include performing a series of three-dimensional surveys over time, which may be spaced at regular and/or irregular intervals in time. Data from a 4D survey may be interpreted to identify one or more structures, one or more fluids (e.g., fluid regions), etc. in a region, which may be a subterranean region of a geologic environment.

The aforementioned publication to Özbek et al. describes an extended GMP approach (EGMP). As an example, a method can include an iterative adaptive approach with matching pursuit (IAA-MP). As an example, IAA-MP may be applied to enhance the performance of methods that are based on EGMP (Extended GMP), which can include BASS.

IAA-MP may be utilized for wavefield reconstruction and may be implemented to enhance the performance of one or more other matching pursuit approaches (e.g., such as those used in MIMAP, GMP and BASS).

IAA-MP (Iterative Adaptive Approach—Matching Pursuit) may be applied to solve wavefield reconstruction problems that arise from multichannel (generalized) sampling. An IAA-MP approach may enhance performance through lower aliasing sidelobes in its Lomb spectrum used to pick the proper signal component (e.g., especially at higher frequencies), higher resolution (e.g., especially at lower frequencies), more accurate estimation of basis vector amplitude (e.g., over a range of frequencies) and higher dynamic range (e.g., protection of weaker events).

An IAA-MP approach can utilize a cost function with a term that pre-whitens (e.g., de-correlates) a residual vector. Such an approach can enhance resolution and accuracy. Such a cost function can be implemented in multichannel (generalized) matching pursuit.

An IAA-MP approach can define and solve a cost function that de-correlates (pre-whitens) with a correlation matrix that includes a matching pursuit residual to thereby increase accuracy and resolution. Such a correlation matrix can be computed iteratively using IAA iterations within an IAA-MP iteration.

An IAA-MP approach can enhance performance via (i) lower aliasing sidelobes in the Lomb spectrum used to pick the proper signal component (e.g., particularly at higher frequencies), (ii) higher resolution (e.g., especially lower frequencies), (iii) more accurate estimation of basis vector amplitude (e.g., over a range of frequencies) and (iv) higher dynamic range (e.g., protection of weaker events).

In compressed (compressive) sensing, the problem is to recover a sparse signal coefficient vector c from its underdetermined linear measurements:

$$m = Ac + e, \quad (1)$$

where $A = [h_1, h_2, \ldots, h_K]$ is an M×K sensing (measurement) matrix of basis vectors (dictionary atoms) $h_i$, with M<K, $c = [c_1, c_2, \ldots, c_K]^T$, and e is additive non-sparse noise. The recovery of c from m may be performed by solving the following optimization problem:

$$\hat{c} = \arg\min \|c\|_0 \text{ s.t. } \|m - Ac\|_2 < \varepsilon, \quad (2)$$

where $\|c\|_0$ is the number of nonzero elements of c, and the fit error constraint has a bound $\varepsilon$ that is related to the statistics of e. The solution of the $l_0$ optimization problem can involve a combinatorial search, which can make it infeasible for practical applications. To reduce the computational complexity, sub-optimal techniques such as matching pursuit or basis pursuit denoising may be implemented. As mentioned, a method can include a matching pursuit approach.

Signal and measurement model for multichannel sampling.

A compressed sensing problem that arises in multichannel sampling can be considered. Suppose that an unknown signal s(x) at position x can be modelled in terms of a basis as $$s(x) = \sum_{i=1}^{K} c_i \beta(\theta_i, x), \quad (3)$$

where $\beta(\theta_i, x)$, i=1, 2, ..., K, are basis functions with parameter set $\theta_i$. $c_i$ are complex coefficients, and K is the size of the basis dictionary. If the basis allows a sparse representation of the signal, a small number of the complex coefficients would be nonzero. The compressed sensing problem is to find these coefficients from a small number of measurements.

Within local spatiotemporal windows, seismic data can be modelled as a superposition of local plane waves:

$$s(x) = \sum_{i=1}^{K} c_i \exp(jk_i \cdot x), \quad (4)$$

where the basis functions are complex exponentials with complex amplitude $C_i$ and wavenumber vector $k_i$. With this choice, the dictionary index i can run over the potential wavenumbers. An alternative is to index over the wave slownesses.

As an example, an additional dimension may be present (such as time or temporal frequency). As examples, consider that temporal frequency may be fixed or that temporal frequency may be an additional dimension that varies (e.g., not fixed). Various examples provide equations that consider temporal frequency as being fixed; noting that it or time may be an additional dimension.

The measurements of an unknown signal can be available at discrete positions in space, which may be referred to as stations. At each station, multichannel measurements of the unknown signal can be recorded (e.g., acquired as data via field equipment in an environment). The number of channels per station may be one or more. In multichannel sampling, each channel may sense not necessarily the signal itself, but a version of the signal after it has undergone a known transformation or filter. An example could be the gradient of the unknown signal.

If there are M types of channels in a multichannel sampling scenario, denote the set of stations as $x_S = \{x_1, x_2, \ldots, x_M\}$, where $x_m = \{x_{m1}, x_{m2}, \ldots, x_{mN_m}\}$, m=1, 2, ..., M, is the set of $N_m$ positions that correspond to channel m. The measurement vector is then [q.v. eq. (3) of the EGMP ID]

$$m(x_S) = [m_1(x_1), m_2(x_2), \ldots, m_M(x_M)]^T, \quad (5)$$

where each vector $m_m(x_m)$ contains the measurements of channel type m:

$$m_m(x_m) = [m_m(x_{m1}), m_m(m_2), \ldots, m_m(X_{mN_m})] \quad (6)$$

Each entry $m_m(x_{mn})$ can be written as $$m_m(x_{mn}) = \sum_{i=1}^{K} \eta_m(k_i, x_{mn}) c_i \exp(jk_i \cdot x_{mn}), \quad (7)$$

where $\eta_m(k_p, x_{mn})$ describes the transfer function from the unknown signal to the measurement channel m at spatial positions $x_{mn}$.

The measurement vector can be written as:

$$m(x_S)=Ac+e, \quad (8)$$

where $$A=[h_1, h_2, \ldots, h_K] \quad (9)$$

is the sensing matrix; noting that one or more other terms could be generalized (multichannel) steering matrix, the array manifold matrix. or the mode matrix, $$c=[c_1, c_2, \ldots, c_K]^T \quad (10)$$

is the vector of complex coefficients, and e is the noise vector.

In (9), $h_i$, $i=1, 2, \ldots, K$, are the generalized (multichannel) steering vectors chosen as the basis vectors (atoms) in the MP dictionary of size K. These generalized steering vectors are defined as [q.v. eq. (10) of the EGMP ID]

$$h_i \square h(k_i, x_S) = \eta(k_i, x_S) \otimes d(k_i, x_S), i=1,2,\ldots,K, \quad (11)$$

Here, $\otimes$ denotes the Kronecker product, and $$\eta(k_i, x_S) = [\eta_1(k_i, x_1), \eta_2(k_i, x_2), \ldots, \eta_M(k_i, x_M)]^T, \quad i=1,2,\ldots,K, \quad (12)$$

are the transfer function vectors, with $\eta_m(k_i, x_m)$ describing the transfer function from the unknown signal to the measurement channel m at spatial positions $x_m$, and at wavenumber $k_i$.

In (11), $$d(k_i, x_S) = [d_1(k_i, x_1), d_2(k_i, x_2), \ldots, d_M(k_i, x_M)]^T, \quad i=1,2,\ldots,K, \quad (13)$$

are the overall steering vectors, whose components $$d_m(k_i, x_m) = [\exp(jk_i \cdot x_{m1}), \exp(jk_i \cdot x_{m2}), \ldots, \exp(jk_i \cdot x_{mN_m})]^T, \quad i=1,2,\ldots,K, \quad (14)$$

are defined for each channel m for the spatial positions $x_m = \{x_{m1}, x_{m2}, \ldots, x_{mN_m}\}$ which correspond to that channel. Entries of the steering vector contain the phase shifts at the measurement locations.

IAA-MP iterations:

Initialization of the optimum coefficient vector and the residual before the first iteration:

$$\hat{c} := 0,$$

$$r := m. \quad (15)$$

At a given iteration, these are updated as $$\hat{c}_i^{MP} := \hat{c}_i^{MP} + c_i^{MP},$$

$$r := r - c_i^{MP} h_i^{MP}, \quad (16)$$

where $h_i^{MP}$ and $c_i^{MP}$ respectively are the optimal MP basis vector and its optimal complex amplitude determined at that iteration; $i^{MP}$ is the index of the dictionary element that is selected at the given iteration.

Below, an example of a method is described to determine the optimal MP basis vector and its complex amplitude at a given iteration. Consider the following optimization problem:

$$(c_{iMP}, h_{iMP}) = \underset{i \in \{1,2,\ldots,K\}}{\operatorname{argmin}} J^{MP}(c_i, h_i), \quad (17)$$

where $$J^{MP}(c_i, h_i) = \|Q_i^{-1/2} \Lambda^{1/2}[r - c_i h_i]\|_2^2 \quad (18)$$
$$= [r - c_i h_i]^H \Lambda^{1/2} Q_i^{-1} \Lambda^{1/2} [r - c_i h_i].$$

The foregoing equations define a weighted nonlinear least squares optimization problem. For dictionary index i, the covariance matrix of interference is given by $$Q_i = R - p_i h_i h_i^H, \quad (19)$$

where the covariance matrix of the data is $$R = \sum_{i=1}^{K} p_i h_i h_i^H = A P A^H, \quad (20)$$

and $$p_i = |c_i|^2 \quad (21)$$

is the "multichannel power estimate" for dictionary index i. With the use of $Q_i^{-1}$ for weighting matrix, the spectral components except the one at the wavenumber of interest are considered as interference.

The diagonal matrix P includes the power estimates for the atoms in the dictionary:

$$P = \operatorname{diag}[p_1, p_2, \ldots, p_K]. \quad (22)$$

The $\Lambda$ matrix in (18) can be as that in the EGMP ID. Minimizing $J^{MP}$ in (18) with respect to $c_i$ yields a relationship between optimal $h_i^{MP}$ and $c_i^{MP}$ for the current matching pursuit iteration:

$$c_{iMP} = \frac{h_{iMP}^H \Lambda^{1/2} Q_{iMP}^{-1} \Lambda^{1/2} r}{h_{iMP}^H \Lambda^{1/2} Q_{iMP}^{-1} \Lambda^{1/2} h_{iMP}}. \quad (23)$$

Using (19) and the matrix inversion lemma, this can be rewritten as $$c_{iMP} = \frac{h_{iMP}^H \Lambda^{1/2} R^{-1} \Lambda^{1/2} r}{h_{iMP}^H \Lambda^{1/2} R^{-1} \Lambda^{1/2} h_{iMP}}. \quad (24)$$

Substituting (23) in (14) gives the cost function for the optimal dictionary atom:

$$i^{MP} = \underset{i \in \{1,2,\ldots,K\}}{\arg \max} \mathcal{L}(i), \quad (25)$$

giving $$\mathcal{L}(i) = \frac{|h_i^H \Lambda^{1/2} Q_i^{-1} \Lambda^{1/2} r|^2}{h_i^H \Lambda^{1/2} Q_i^{-1} \Lambda^{1/2} h_i}, \quad i = 1, 2, \ldots, K. \quad (26)$$

Using (19) and the matrix inversion lemma once again:

$$\mathcal{L}(i) = \frac{|h_i^H \Lambda^{1/2} R^{-1} \Lambda^{1/2} r|^2}{h_i^H \Lambda^{1/2} R^{-1} \Lambda^{1/2} h_i}, \quad i = 1, 2, \ldots, K. \quad (27)$$

The foregoing form can speed up the computation considerably, since $R^{-1}$ is to be computed once, unlike $Q_i^{-1}$, which would have to be computed for each i. $\mathcal{L}(i)$ is the generalized Lomb spectrum for IAA-MP; for R=I, it reduces to the generalized Lomb spectrum for the EGMP problem.

To compute (24) and (27), a method estimates P and R, which include the estimation of $c_i$ for i in the dictionary. A multichannel version of IAA-APES (IAA for short) may be utilized.

IAA iterations within each MP iteration:
At a given MP iteration:

$$r(x_S) = Ac + n, \quad (28)$$

where A and c have the form defined previously in (9) and (10), respectively, and n is the residual noise. A method can estimate the complex coefficients $c_1, c_2, \ldots, c_K$ for each atom in the dictionary. Consider the optimization problem as:

$$c_i^{IAA} = \arg\min_c \|Q_i^{-1/2} \Lambda^{1/2} [r - ch_i]\|^2, \; i = 1, 2, \ldots, K, \quad (29)$$

where $Q_i$ is again defined as in (19). The cost function is as that of the MP cost function defined in (18). However, the optimization problem set out in (29) is different from the MP optimization problem written in (17). Unlike the MP, where the best basis function is sought, here the aim is to find the best complex amplitude at each wavenumber.

The solution at each wavenumber is:

$$c_i^{IAA} = \frac{h_i^H \Lambda^{1/2} Q_i^{-1} \Lambda^{1/2} r}{h_i^H \Lambda^{1/2} Q_i^{-1} \Lambda^{1/2} h_i}, \; i = 1, 2, \ldots, K. \quad (30)$$

Again using the matrix inversion lemma, this can be written in terms of the index-independent R:

$$c_i^{IAA} = \frac{h_i^H \Lambda^{1/2} R^{-1} \Lambda^{1/2} r}{h_i^H \Lambda^{1/2} R^{-1} \Lambda^{1/2} h_i}, \; i = 1, 2, \ldots, K. \quad (31)$$

Since the covariance matrix R depends on the c values as in (20)-(22), $c_i^{IAA}$ are computed iteratively.

The IAA iterations can be initialized using the multichannel periodogram solution of $$p_i = |c_i|^2 = \frac{|h_i^H \Lambda r|^2}{|h_i^H \Lambda h_i|^2}, \; i = 1, 2, \ldots, K. \quad (32)$$

Note that this corresponds to the optimal c solution given by eq. (16) of the EGMP ID; it also corresponds to the $c_i^{IAA}$ solution given in (31) for R=I.

In the later iterations, P and R can be computed as $$P = \text{diag}[p_1, p_2, \ldots, p_K] \quad (33)$$

and $$R = APA^H \quad (34)$$

respectively, with $p_i = |c_i|^2$. The complex amplitudes $c_i^{IAA}$ can then be computed for $i = 1, 2, \ldots, K$ using (31). Empirically, trials demonstrate that about 15-20 iterations suffice.

Note on general applicability of the IAA-MP algorithm:
The IAA-MP method may be utilized for one or more types of compressive sensing problems, for example, where the measurements are of the form as in equation (6) above, with columns $h_i$, as in (7). While various examples are illustrated using Fourier basis functions as in (2), more general basis functions, as implied in (1) could be used.

Example of the IAA-MP Approach:

```
initialize
  ĉ := 0
  r := m
repeat {IAA-MP loop}
  R := I
  repeat {IAA loop}
    for i = 1, 2, ..., K
```

$$c_i^{IAA} = \frac{h_i^H \Lambda^{1/2} R^{-1} \Lambda^{1/2} r}{h_i^H \Lambda^{1/2} R^{-1} \Lambda^{1/2} h_i}$$

```
    end {for}
    R = A diag (|c₁|², |c₂|², ..., |cK|²) A^H
  until (convergence) {IAA loop}
```

$$i^{MP} = \underset{i \in \{1,2,\ldots,K\}}{\arg\max} \frac{|h_i^H \Lambda^{1/2} R^{-1} \Lambda^{1/2} r|^2}{h_i^H \Lambda^{1/2} R^{-1} \Lambda^{1/2} h_i}$$

$$\hat{c}_{iMP} := \hat{c}_{iMP} + c_{iMP}$$

$$r := r - c_{iMP} h_{iMP}$$

```
until (convergence) {IAA-MP loop}
```

As an example, a greedy method can be utilized in solving one or more types of underdetermined inverse problems, for example, consider finding sparse solutions to underdetermined inverse problems. The matching pursuit (MP) method can be implemented in a "greedy" manner. As mentioned, it may be implemented in an iterative adaptive approach MP (IAA-MP) that can outperforms MP in terms of one or more of higher resolution, lower sidelobe levels superior interference rejection capabilities, better estimation of the coefficient levels and higher dynamic range.

The IAA-MP approach can improve performance in a robust way in challenging scenarios where the MP performance is not optimal.

Consider, as an example, an approximation problem using overcomplete representations and computation of a sparse solution to the associated underdetermined linear system of equations. Such a problem can arise in various inverse problems such as interpolation, deghosting, demultiple, source separation, noise attenuation and image compression.

As an example, measure a signal $m \in \mathbb{C}^{M \times 1}$ and perform a method that includes modelling using a linear model:

$$m = Ac + e, \quad (35)$$

where $A \in \mathbb{C}^{M \times N}$ with M<N, and possibly M<<N. A can be referred to as the overcomplete dictionary, with each column $h_i$ as an atom, also called basis or steering vector. c is the unknown coefficient vector to be recovered. $e \in \mathbb{C}^{M \times 1}$ is measurement noise corrupting the measurements. Because M<N, there can be an infinite number of c satisfying the above equation. Thus, it is possible to look for the sparsest c (with the smallest number of non-zero elements). As such, the following optimization can be used $$\hat{c} = \arg\min_x \|c\|_0 \text{ s.t. } m \approx Ac. \quad (36)$$

Such an approach is known to be NP-hard. To address such a problem, a greedy method can be implemented that can outperform MP in terms of one or more of higher resolution, lower sidelobe levels, superior interference rejection capabilities, better estimation of the coefficient levels and higher dynamic range.

Matching Pursuit (MP)

MP is regarded as an iterative algorithm used to approximate the signal in terms of a linear combination of a set of waveforms. The algorithm can be summarized as follows:

---

Example Algorithm 1: Matching Pursuit (MP)

Input: c, A
$r^0 = m$, $\hat{c}^0 = 0$
repeat {MP iterations} iteration i
$g = A^H r^{i-1}$ $$n^{MP} = \max_n \frac{|g_n|^2}{h_n^H h_n}, \forall n = 1, \ldots, N$$

$$\hat{c}_{n^{MP}}^i = \hat{c}_{n^{MP}}^{i-1} + \frac{g_{n^{MP}}}{h_{n^{MP}}^H h_{n^{MP}}}$$

$$r^i = r^{i-1} - \frac{g_{n^{MP}}}{h_{n^{MP}}^H h_{n^{MP}}} h_{n^{MP}}$$

until convergence {MP iterations}
Output: $\hat{c}^i$

--- where $(\cdot)^H$ is the conjugate transpose operator and $(\cdot)_n$ is the $n^{th}$ element (or column) of the vector (or matrix). The MP solves the signal approximation problem in (35) iteratively by dividing the problem into two stages: the selection stage and the estimation stage. In the selection stage, it iteratively selects one atom ($h_{n^{MP}}$) from A that best matches the residual and the coefficient associated with the selected atom is then updated in the estimation stage. As such the MP incrementally explains the input measurement vector while reducing the residual $\|r^i\|_2^2$ and convergence is achieved when the residual is adequately reduced or most of the energy of the input signal is explained. In Algorithm 1, the MP update minimizes the approximation cost $$\mathcal{L}_{MP} = \|r^{i-1} - c_n h_n\|_2^2, \forall n = 1, \ldots, N, \quad (37)$$

with respect to the selected coefficient. As such the MP gives equal weights to the cost function of least squares and ignores the potentially different noise statistics between measurements. A diagonal matrix $\Lambda$ can be used to incorporate the different noise statistics and as such the cost function can be replaced by weighted Euclidean norm:

$$\mathcal{L}_{MP} = \|r^{i-1} - c_n h_n\|_{2,\Lambda}^2 \quad (38)$$

$$= (r^{i-1} - c_n h_n)^H \Lambda (r^{i-1} - c_n h_n)$$

This can be written in terms of MP by defining change of variables:

$$m \triangleq \Lambda^{\frac{1}{2}} m \quad (39)$$
$$A \triangleq \Lambda^{\frac{1}{2}} A,$$

The MP approach can be modified to incorporate some a priori information about the solution $\hat{c}$ by using multiplicative weights in the selection stage while the estimation or update stage remains unchanged.

Above, in the example Algorithm 1, the selection and the estimation stages at an iteration in MP can be based on the normalised inner product between the dictionary matrix A and the residual $r^{i-1}$

IAA-MP

IAA can solve (35) by minimizing the following cost function:

$$\min_{c_n} \|m - c_n h_n\|_{2, Q_i^{-1}}^2, n = 1, 2, \ldots, N, \quad (40)$$

where the matrix $Q_n$ define the interference covariance matrix defined as:

$$Q_n = R - |c_n|^2 h_n h_n^H, \quad (41)$$

where R is the IAA covariance matrix:

$$R = APA^H, \quad (42)$$

where $P = \text{diag}(|c_1|^2 |c_2|^2 \ldots |c_N|^2)$ is the diagonal matrix containing the power at each atom. Minimizing (40) and using the matrix inversion lemma yields:

$$\hat{c}_{IAA,n} = \frac{h_n^H R^{-1} m}{h_n^H R^{-1} h_n}, n = 1, 2, \ldots, N \quad (43)$$

The IAA algorithm can iteratively estimate the unknown coefficient vector $\hat{c}_{IAA}$. Since IAA involves the computation of R, which itself depends on the unknown vector $\hat{c}_{IAA}$, it can be implemented as an iterative method and the initialization may be performed via a DAS beamformer (e.g., delay and sum (DAS) beamforming in array processing in which the array output is steered toward a specific direction by taking the inner product between a data-independent weight associated with that direction and the array input). Empirically, trials demonstrated that about 15-20 iterations suffice.

As an example, a method can include a spectrum refining stage using IAA, which can be referred to as IAA-MP. As such, in an iteration, the method can replace the measurement m by the residual at that iteration. Such an approach can provide enhanced-resolution capability, reduce sidelobes and enhance interference rejection capabilities of MP. An example algorithm 2 is summarized as follows:

---

Example Algorithm 2: IAA-MP

Input: m, A
$r^0 = m$, $\hat{c}^0 = 0$
repeat {MP iterations} iteration i
repeat {IAA iterations}
for n = 1, . . . , N $$\hat{c}_{IAA,n} = \frac{h_n^H \Lambda^{\frac{1}{2}} R^{-1} \Lambda^{\frac{1}{2}} m}{h_n^H \Lambda^{\frac{1}{2}} R^{-1} \Lambda^{\frac{1}{2}} h_n}$$

$P_n = |\hat{c}_{IAA,n}|^2$
end {for}
$P = \text{diag}(P_1 P_2 \ldots P_N)$
$R = APA$
    until convergence {IAA iterations}

$$\mathcal{L}_{IAA-MP,n} = P_n h_n^H \Lambda^{\frac{1}{2}} R^{-1} \Lambda^{\frac{1}{2}} h_n, \forall n = 1, \ldots, N$$

-continued

Example Algorithm 2: IAA-MP $$n^{IAA-MP} = \max_n \eta_n \mathcal{L}_{IAA-MP,n}, \forall n = 1, \ldots, N$$

$$\hat{c}^i_{n,IAA-MP} = \hat{c}^{i-1}_{n,IAA-MP} + \hat{c}_{IAA,n}^{IAA-MP}$$

$$r^i = r^{i-1} - \hat{c}_{n,IAA-MP} h_n^{MP}$$

until convergence {MP iterations}
Output: $\hat{c}^i$

In the example Algorithm 2, $\eta_n$ are multiplicative weights containing some a priori information about the solution $\hat{c}$, for example from low frequencies in the interpolation problem. The cost function $\mathcal{L}_{IAA-MP}$ can derived from the weighted least square. As an example, a method may estimate the noise level from the data adaptively.

Consider 1D synthetic examples of a sum of two complex spatial harmonics. In a first example, the wavenumbers of the exponentials are at 0.007 and 0.0105 rad/m and the measurement is sampled at 75 m. The MP and IAA-MP are used to separate the two exponentials. As an example, a method can include estimating the wavenumbers to be used in one or more other applications (e.g., deghosting, etc.). The dictionary A can be defined as the discrete Fourier matrix:

$$A \triangleq [\exp(jk_{x,1}x) \ldots \exp(jk_{x,N}x)], \tag{44}$$

where x is the sampled locations. FIG. 48 (plot 4810) shows the cost functions $\mathcal{L}_{MP}$ and $\mathcal{L}_{IAA-MP}$ after the first iteration. The MP suffers from smearing and leakage while the IAA-MP provides a much better result than MP, with low sidelobes and peaks at the true wavenumbers (see also FIG. 10).

In a second example, the measurement and its gradient are used to de-alias a combination of 0.007 and 0.18 rad/m harmonics. As such the dictionary matrix can be given by:

$$A \triangleq \begin{bmatrix} \exp(jk_{x,1}x) & \cdots & \exp(jk_{x,N}x) \\ jk_{x,1}\exp(jk_{x,1}x) & \cdots & jk_{x,N}\exp(jk_{x,N}x) \end{bmatrix} \tag{45}$$

FIG. 48 (plot 4820) shows the cost functions $\mathcal{L}_{MP}$ and $\mathcal{L}_{IAA-MP}$ after the first iteration. The interference between the high aliasing sidelobes in MP causes the algorithm to pick the wrong order of aliasing which result in large interpolation error as shown in FIG. 48 (plot 4830), which displays the real part of the signal. As shown, the IAA-MP method as implemented is able to select the proper aliasing order in part due to its low sidelobes and interference rejection ability.

Applications

Figure 49:
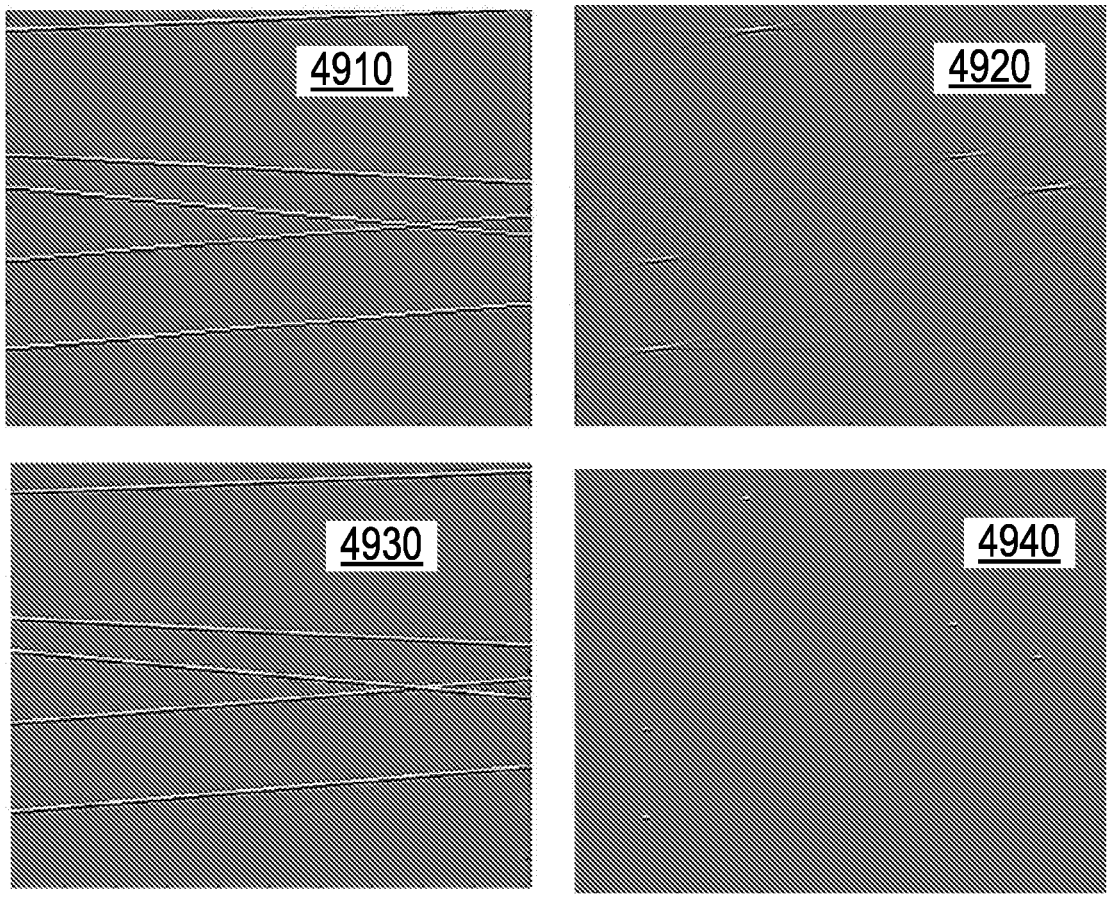
FIG. 49 illustrates examples of plots of data.

High resolution radon transform: Radon transforms have been widely used in different applications such as attenuation of multiple reflections, source separation, noise attenuation. Reduced spatial aperture and/or coarse offset sampling may reduce the resolution of linear and parabolic radon transforms. An IAA-MP approach can be used to construct high resolution radon spectra. As an example, the IAA-MP method can be utilized in a linear radon transform and be compared to a radon transform that does not implement such an approach. Consider a dictionary matrix A defined in a manner akin to that above. The data in this example can include 5 superposed linear events as shown in FIG. 49 (see FIG. 3a at the top left) where spatial sampling is approximately 25 m and where the source signature spectrum is substantially flat up to approximately 65 Hz, and the wavelet is substantially zero phase. As such, an event propagating horizontally generates first-order alias at about 30 Hz. FIG. 49 shows (plot 4920) the linear radon transform where aliasing artefacts are noticeable and FIG. 49 also shows (plot 4930) the application of the IAA-MP using priors from low frequencies. It can be seen that the radon transform is sparse. FIG. 49 also shows (plot 4930) data reconstruction to 12.5 m spacing alleviating aliasing effects.

A method may include joint interpolation and deghosting. A method may implement matching pursuit and exploit the anti-aliasing and the deghosting potential enabled by the additional measurements and relate measured signals to a common 3D wavefield (i.e., the upgoing wavefield). As such the dictionary matrix A can be defined as:

$$A \triangleq \begin{bmatrix} H_{p,1}\exp(jk_{y,1}y) & \cdots & H_{p,N}\exp(jk_{y,N}y) \\ H_{y,1}\exp(jk_{y,1}y) & \cdots & H_{y,N}\exp(jk_{y,N}y) \\ H_{z,1}\exp(jk_{y,1}y) & \cdots & H_{z,N}\exp(jk_{y,N}y) \end{bmatrix}$$

where $H_{p,i}$, $H_{y,i}$, $H_{z,i}$ are the ghost operators for pressure, crossline and vertical particle velocity measurements. GMP can be capable of reconstructing the upgoing wave under aliasing of an order provided that no spectral overlap between replicas of different events affects the input in the crossline wavenumber domain. When proper mitigation strategies are in place, the likelihood of such overlap in the crossline wavenumber domain is normally low. However, the likelihood of overlap increases with the presence of high order aliasing and a non-sparse crossline spectrum.

As an example, data were acquired using 8 multi-measurement streamers, approximately 3 km long, with a nominal cable separation of about 75 m. In the example, the depth of cables was approximately 17 m. To challenge GMP, the method omitted every other cable to have a nominal crossline separation of about 75 m. Wavefields were reconstructed by GMP in the shot domain on a 6.25 m×6.25 m isometrically sampled grid and compared to IAA-MP.

Figure 50:
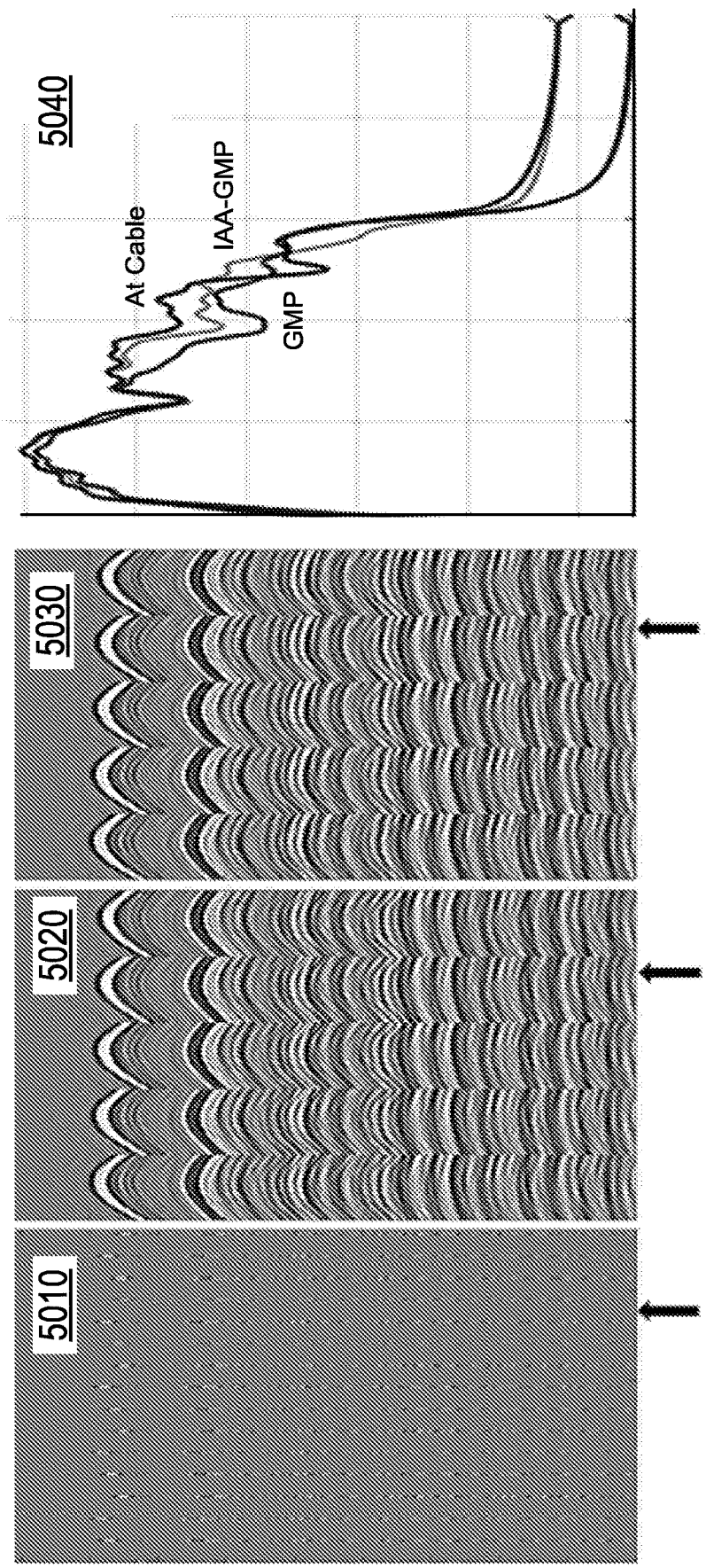
FIG. 50 illustrates examples of plots of data.

FIG. 50 (plots 5020 and 5030) shows the total pressure wavefield computed using both approaches, and sorted in crossline. The enhancements in the reconstruction of IAA-MP over GMP are evident. FIG. 50 (plot 5040) shows the spectrum of input pressure data at one of the omitted cables, and the total pressure wavefield at the cable after reconstruction using both approaches. It can be seen that IAA-MP reconstruction is enhanced over 60 Hz.

As an example, a method can include performing a high resolution parabolic radon transform. Parabolic radon transforms can be utilized in the attenuation of multiple reflections. Suppose that there a direct measurement of the unknown wavefield is available at the positions $[x_{11}\ x_{12}\ \ldots\ x_{1M}]$. In such an example, the parabolic radon transform can be posed as a signal approximation problem that can be solved using a greedy pursuit algorithm. The dictionary matrix A in the signal approximation can be defined as follows:

$$A \triangleq \begin{bmatrix} \exp(j2\pi f p_1 \cdot x_{11}^2) & \cdots & \exp(j2\pi f p_N \cdot x_{11}^2) \\ \vdots & \ddots & \vdots \\ \exp(j2\pi f p_1 \cdot x_{1M}^2) & \cdots & \exp(j2\pi f p_N \cdot x_{1M}^2) \end{bmatrix}$$

where f is the signal frequency and $p_n$ is the wave slowness. The proposed approach can be used to improve the performance of the greedy pursuit algorithm.

As an example, a method can include a high resolution feature (e.g., executable code, etc.) to update the selection and estimation stages within greedy pursuit strategies.

As an example, an IAA-MP approach may be implemented to solve formulated equations in the oil and gas industry. For example, as to geophysics, consider one or more of reconstruction, multiple attenuation, noise attenuation, source separation, etc.

Figure 4:
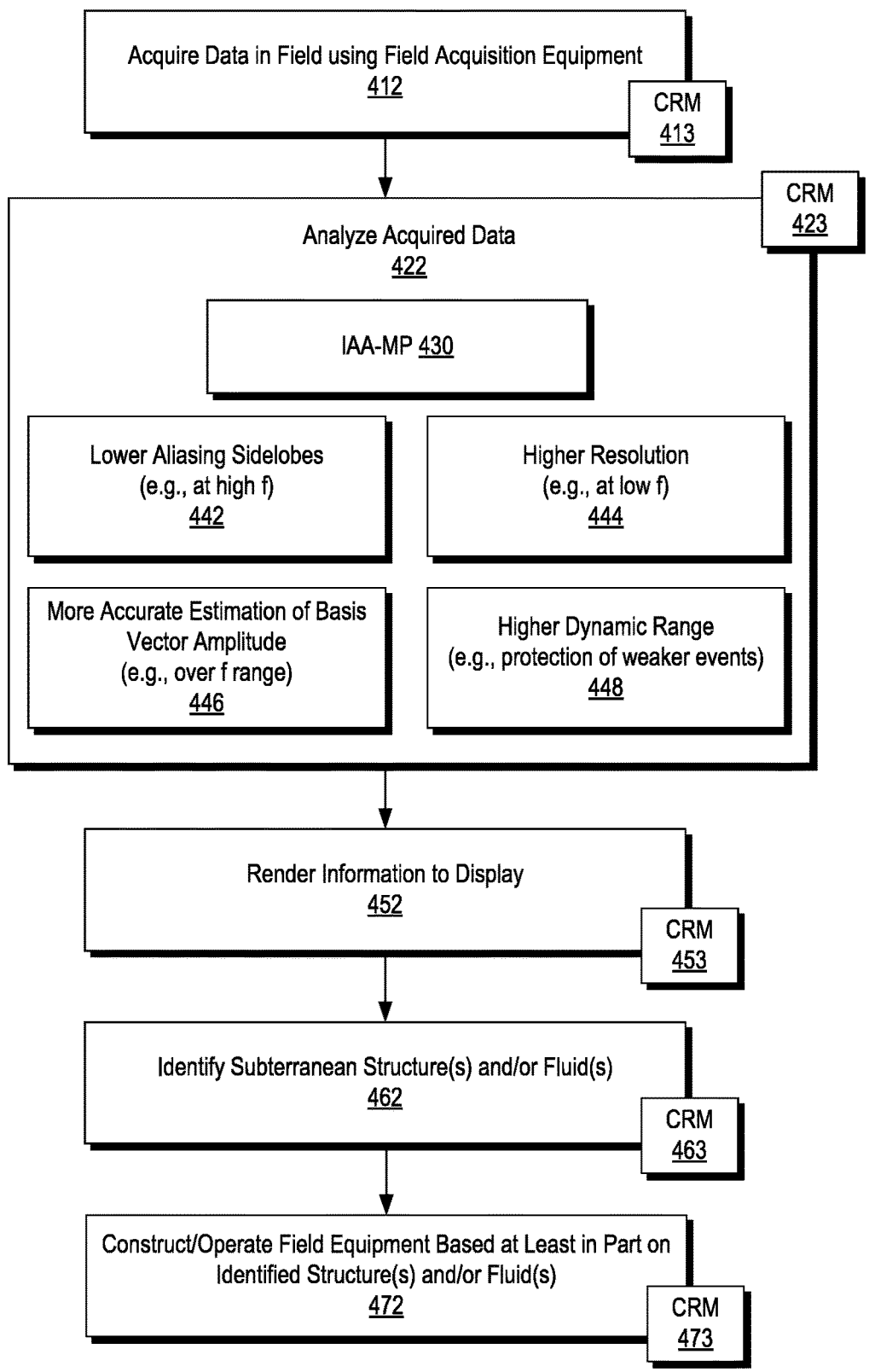
FIG. 4 illustrates an example of a method.

Referring to FIG. 4, it illustrates an example of a method 400 that includes an acquisition block 412 for acquiring data in the field using field acquisition equipment (e.g., via a marine survey acquisition system); an analysis block 422 for analyzing at least a portion of the acquired data that can implement a IAA-MP technique 430 to optionally provide one or more enhancements as in the blocks 442, 444, 446 and 448; a render block 452 for rendering information to a display where the information is based at least in part on the analysis of the analysis block 422; an identification block 462 for identifying one or more subterranean structure(s) and/or fluid(s) in an environment that has been surveyed (e.g., in which data has been acquired per the acquisition block 412); and a construction and/or operation block 472 for constructing and/or operating field equipment based at least in part on the one or more identified structures and/or fluids.

In the method 400, the analysis block 422 can generate information that can be rendered to a display via one or more processors (e.g., CPUs, GPUs, etc.) utilizing graphics processing capabilities of a computing device or computing system. The information rendered can include structural information as to an environment such as horizons, geobodies, etc. (see, e.g., the environment 100 of FIG. 1, which includes various structures, reservoirs, etc.). As an example, information generated by the analysis block 422 may be received by a framework such as the PETREL® framework, which can provide for interpretation (e.g., identification) and/or modeling, which may include generating one or more models that may be utilized to simulate one or more physical phenomena in a geologic environment. Results of simulation can be utilized for constructing and/or operating field equipment where such results are based at least in part on the one or more identified structures and/or fluids of the analysis block 422 of the method 400.

One or more of the blocks of FIG. 4 can correspond to processor-executable instructions stored in one or more computer-readable storage media that are not signals, not carrier waves and that are non-transitory. As an example, a computer-readable storage medium can be a memory device. Such a memory device can be accessible via circuitry that includes one or more processors for execution of the processor-executable instructions to cause a computer (e.g., a computing device, a computing system, etc.) to perform one or more actions of the method 400. As an example, a computing system may be distributed. As an example, a computing system may be a field computing system that is deployed in the field along with survey equipment that can acquire data.

The method 400 is shown in FIG. 4 in association with various computer-readable media (CRM) blocks 413, 423, 453, 463 and 473. Such blocks generally include instructions suitable for execution by one or more processors (or cores) to instruct a computing device or system to perform one or more actions. While various blocks are shown, a single medium may be configured with instructions to allow for, at least in part, performance of various actions of the method 400. As an example, a CRM block can be a computer-readable storage medium that is non-transitory, not a carrier wave and not a signal. As an example, such blocks can include instructions that can be stored in memory and can be executable by one or more of processors.

FIG. 5 illustrates an example of a method 500 that includes initializing, repeating an IAA-MP loop until convergence and repeating an IAA loop until convergence where the IAA loop is an inner loop and the IAA-MP loop is an outer loop.

Figure 6:
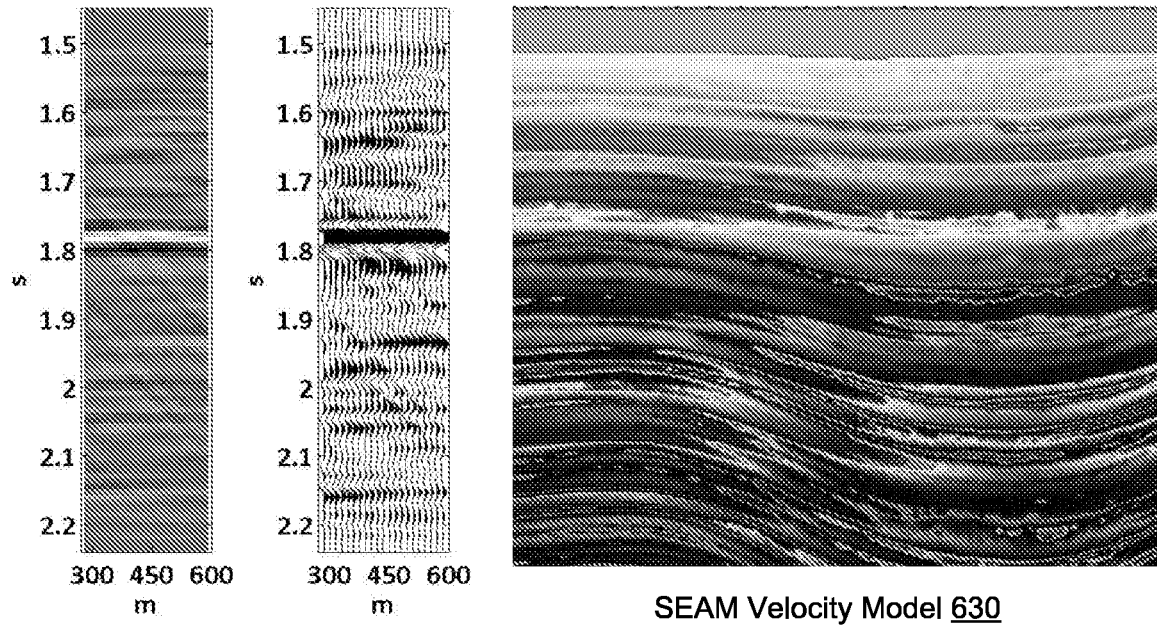
FIG. 6 illustrates an example of data and an example of a velocity model.

FIG. 6 illustrates an example of data 610 and an example of a velocity model 630. The SEAM velocity model 630 is illustrated that was used to create synthetic data (e.g., pressure data). In the example of FIG. 6, five earth models were generated to simulate a realistic earth mode of a salt canopy region of the Gulf of Mexico. As to size of models, various models were in a range from approximately 1.44 GB to approximately 426 GB; noting that data set can be in size ranging, for example, from approximately 4 GB to approximately 1.6 TB.

FIG. 7 illustrates example plots 710 of data. In particular, FIG. 7 illustrates wavenumber spectrum of finely sampled reference data (frequency slice at 28 Hz) as in FIG. 6, as computed via an IAA-MP method. As shown, the plots 710 include a real part at 28 Hz and an imaginary part at 28 Hz as well as a plot of amplitude in decibels (dB) versus wavenumber (1/m) for the 28 Hz FK-slice.

FIG. 8 illustrates an example of a MIMAP data analysis. In particular, examples of single time-space window plots 810 and examples of dipping weak signals plots 820 are shown with respect to a MIMAP data analysis for four streamer input. The plots 810 include a reference, an input, MIMAP and difference. As to the plots 820, a reference is shown along with MIMAP and a difference.

FIG. 9 illustrates an example of an IAA-MP data analysis (see, e.g., the method of FIG. 4). As an example, information in FIG. 9 may be rendered to a display. The plots 910 include a reference, an input, IAA-MP and difference. As to the plots 920, a reference is shown along with IAA-MP and a difference.

FIG. 10 illustrates results of the MIMAP data analysis and results of the IAA-MP data analysis. In particular, FIG. 10 shows examples plots 1010 for MIMAP data and example plots 1020 for IAA-MP data. The plots 1010 and 1020 include six panels. The reference synthetic data finely sampled in the crossline direction at 15 m intervals (1st panel and 4th panel); reconstruction by MIMAP using 4 streamers at 75 m intervals (e.g., 5× decimation) (2nd panel); reconstruction error by MIMAP (3rd panel); reconstruction by IAA-MP (5th panel); reconstruction error by IAA-MP (6th panel).

Figure 11:
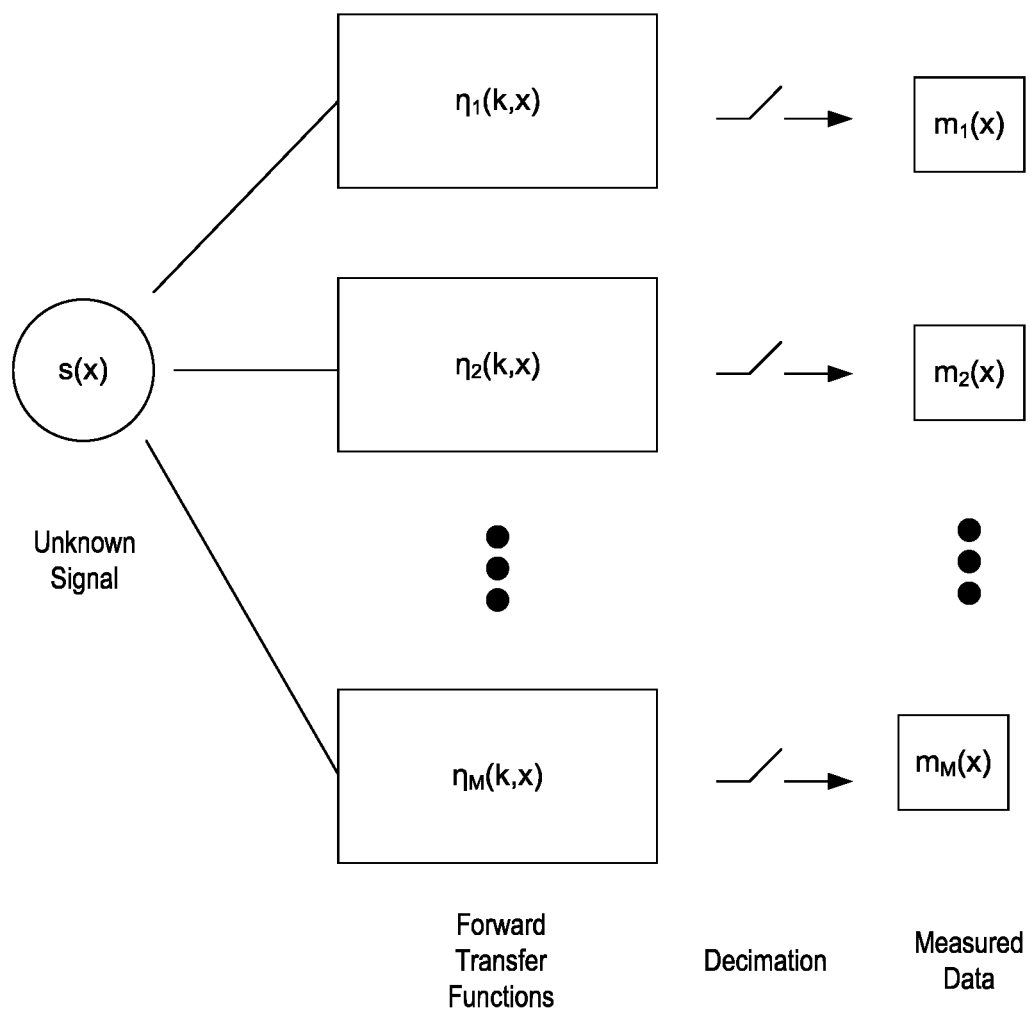
FIG. 11 illustrates an example of generalized multichannel sampling.

FIG. 11 illustrates an example of generalized multichannel sampling. As shown in the example of FIG. 11, an unknown signal is input, forward transfer functions are utilized followed by decimation and measured data.

FIG. 12 illustrates examples of equations associated with compressed sensing for multichannel information 1200. As shown, m is a measurement vector, A is a sensing matrix (e.g., dictionary matrix), c is a vector of signal coefficients (e.g., sparse) and e is non-sparse noise. An equation is shown for signal reconstruction at a desired position s(x). Such an approach may be implemented with Fourier basis functions (see, e.g., "h" elements of the sensing matrix A).

FIG. 13 illustrates examples of equations for analysis of data via Fourier basis functions 1300. As shown, the various elements "h" can be part of the sensing matrix A of FIG. 12.

In FIG. 13, there are 3 pressure sensors and 2 gradient sensors, as represented by the measurement vector m. The signal coefficients vector c is also shown. In FIG. 13, 100 wavenumbers are represented by a basis dictionary.

FIG. 14 illustrates an example of a matching pursuit (MP) method 1400 for a single channel.

FIG. 15 illustrates an example of a matching pursuit (MP) method 1500 for multiple channels.

FIG. 16 illustrates examples of implementations 1600 of various methods such as compressed sensing, multichannel sampling and matching pursuit.

Figure 17:
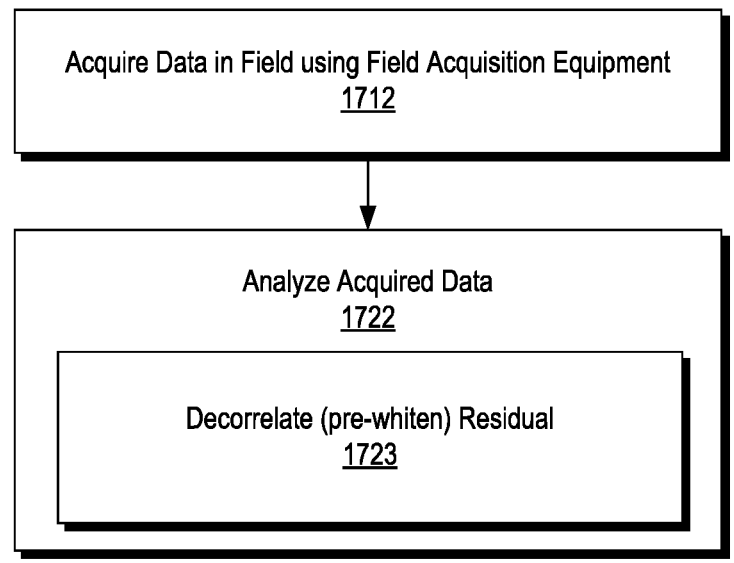
FIG. 17 illustrates an example of a method that may be part of the method of FIG. 4.

FIG. 17 illustrates an example of a method 1700 that may be part of the method of FIG. 4. Specifically, FIG. 17 shows an acquisition block 1712 for acquiring data in a field using field acquisition equipment and an analysis block 1722 for analyzing acquired data where such an approach can include a decorrelation block 1723 for decorrelating (pre-whitening) a residual.

Figure 18:
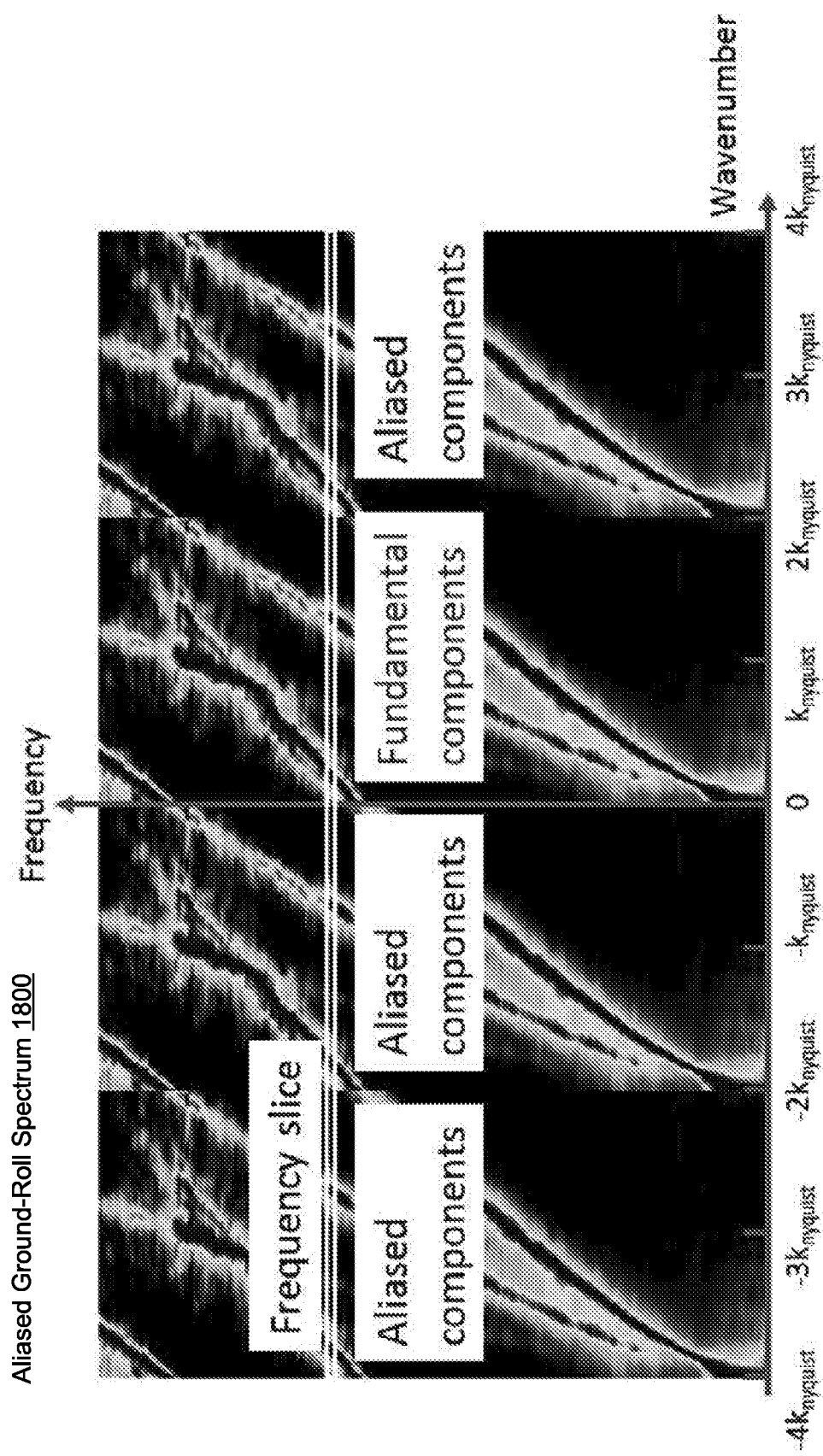
FIG. 18 illustrates examples of aliased components and fundamental components.

FIG. 18 illustrates example plots 1800 of examples of aliased components and fundamental components with respect to a frequency slice. As shown, various Nyquist multiples are shown as centered about a frequency. In particular, the plots 1800 illustrate an aliased ground-roll spectrum. The plots 1800 are based in part on a FK-MUSIC spectrum estimated within surface wave analysis, modeling and inversion (SWAMI), which is an integrated technology for near-surface characterization and noise attenuation of surface waves, as well as the generation of more accurate near-surface velocity models.

Figure 19:
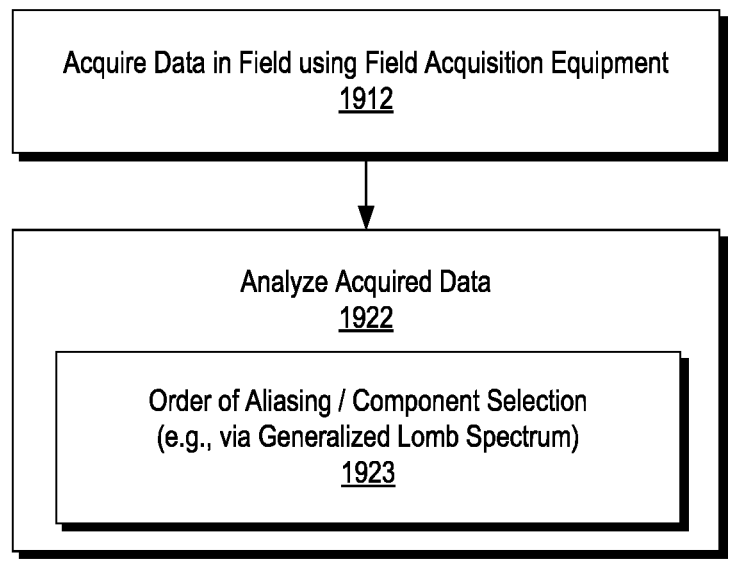
FIG. 19 illustrates an example of a method that may be part of the method of FIG. 4.

FIG. 19 illustrates an example of a method 1900 that may be part of the method of FIG. 4. As shown, the method 1900 can include an acquisition block 1912 for acquiring data in a field using field acquisition equipment and an analysis block 1922 for analyzing at least a portion of the acquired data where such analyzing can include implementation of a ordering/component selection block 1923, for example, via a generalized Lomb spectrum.

Least-squares spectral analysis (LSSA) is a method of estimating a frequency spectrum, based on a least squares fit of sinusoids to data samples. Fourier analysis tends to boost long-periodic noise in long gapped records; whereas, LSSA can mitigate such boosting. LSSA is also known as the Vaniček method and as the Lomb method (or the Lomb periodogram) and the Lomb-Scargle method (or Lomb-Scargle periodogram).

Figure 20:
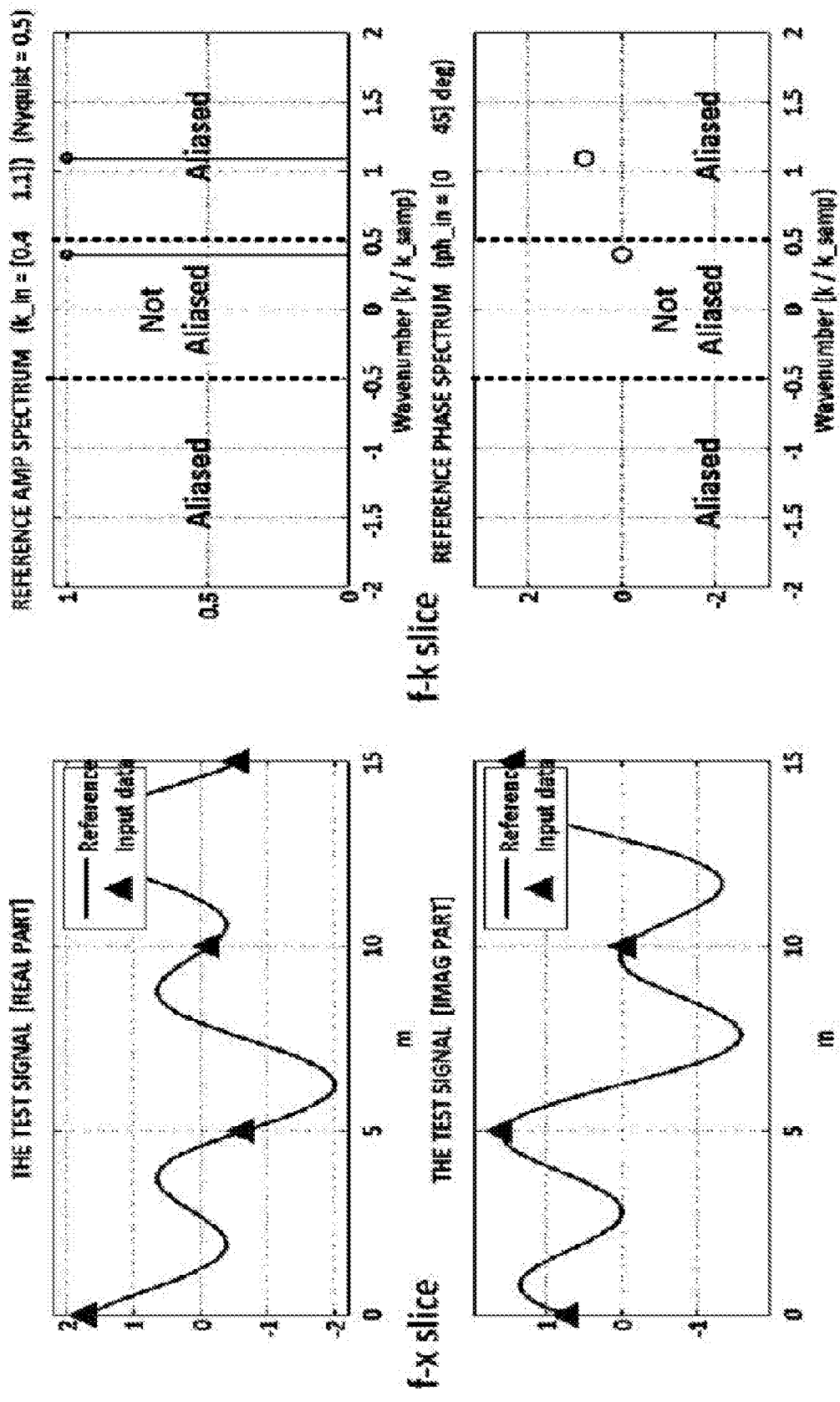
FIG. 20 illustrates an example of a signal that includes real and imaginary parts.

FIG. 20 illustrates an example of a signal 2000 that includes real and imaginary parts with respect to two events where one is aliased.

Figure 21:
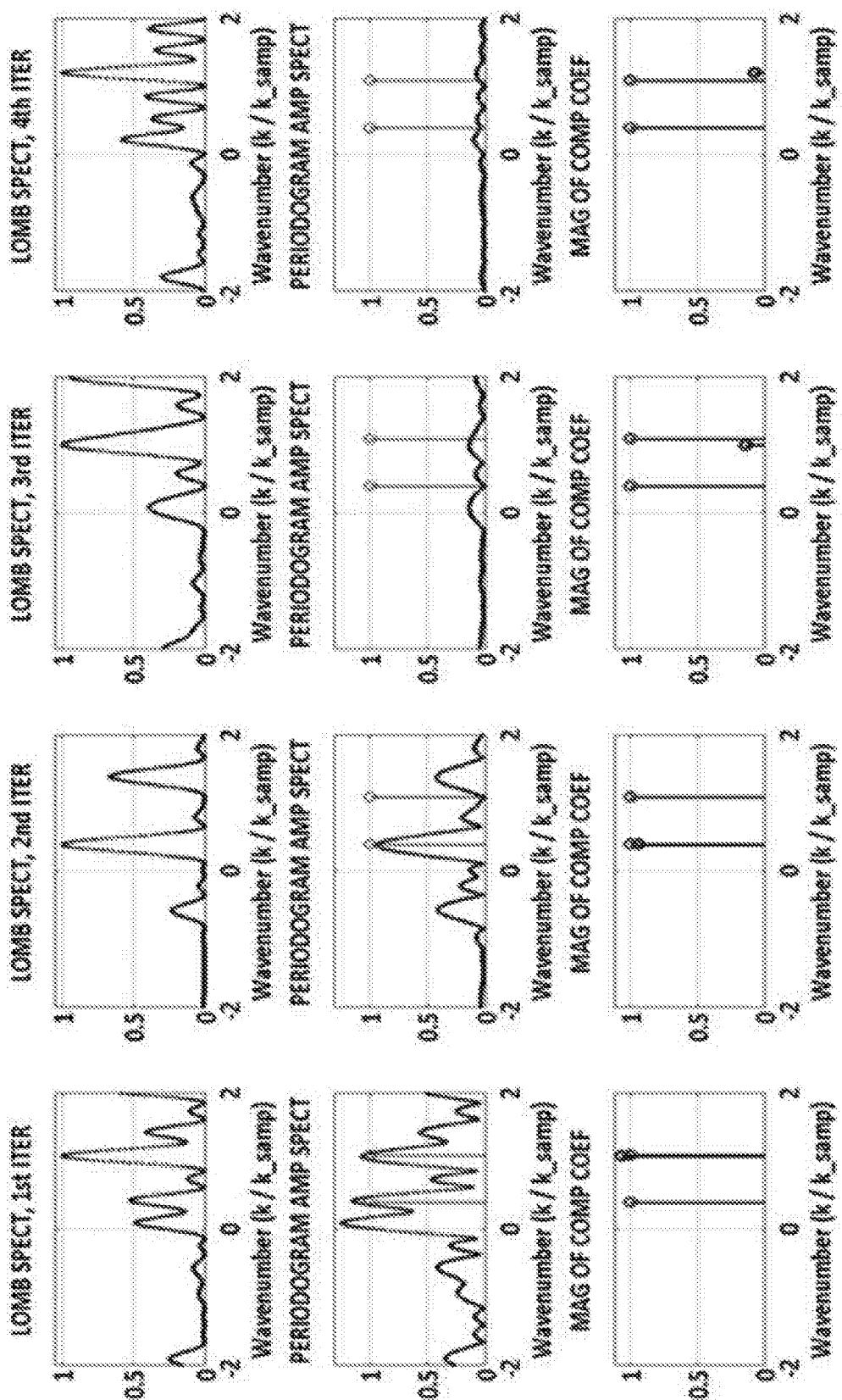
FIG. 21 illustrates examples of plots of data for a series of iterations of a MIMAP method.

FIG. 21 illustrates examples of plots 2100 of data for a series of iterations of a MIMAP method. In FIG. 21, the first four iterations of multichannel matching pursuit are shown in the four columns. The top row shows the generalized Lomb spectrum, which is to indicate the optimum dictionary atom (wavenumber) to pick. The second row shows the magnitudes of the components that can be picked at a given matching pursuit iteration. The last row shows the component picked, versus the test signal.

Figure 22:
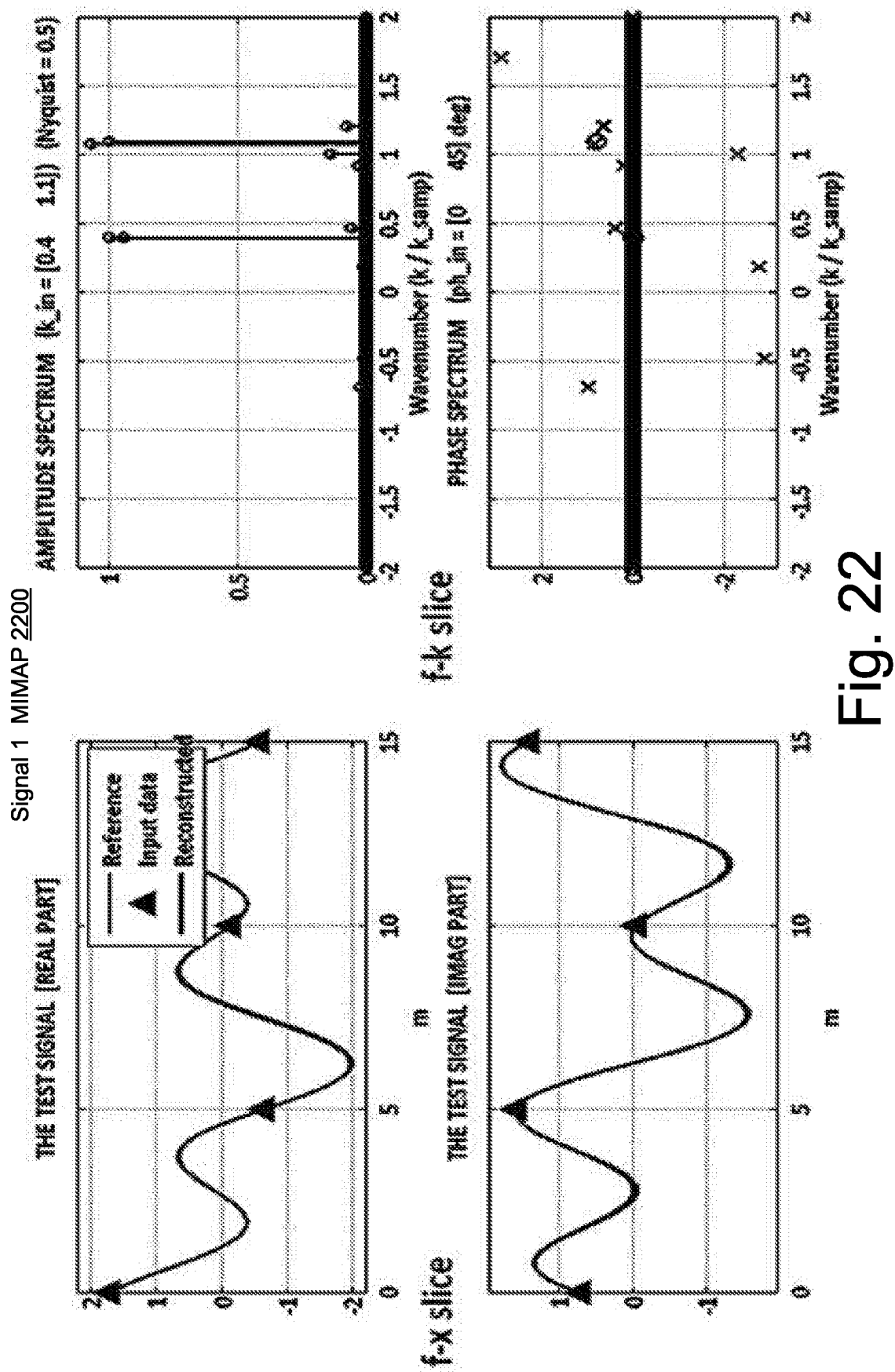
FIG. 22 illustrates examples of plots for the signal of FIG. 20 analyzed via the MIMAP method.

FIG. 22 illustrates examples of plots 2200 for the signal of FIG. 20 analyzed via the MIMAP method.

Figure 23:
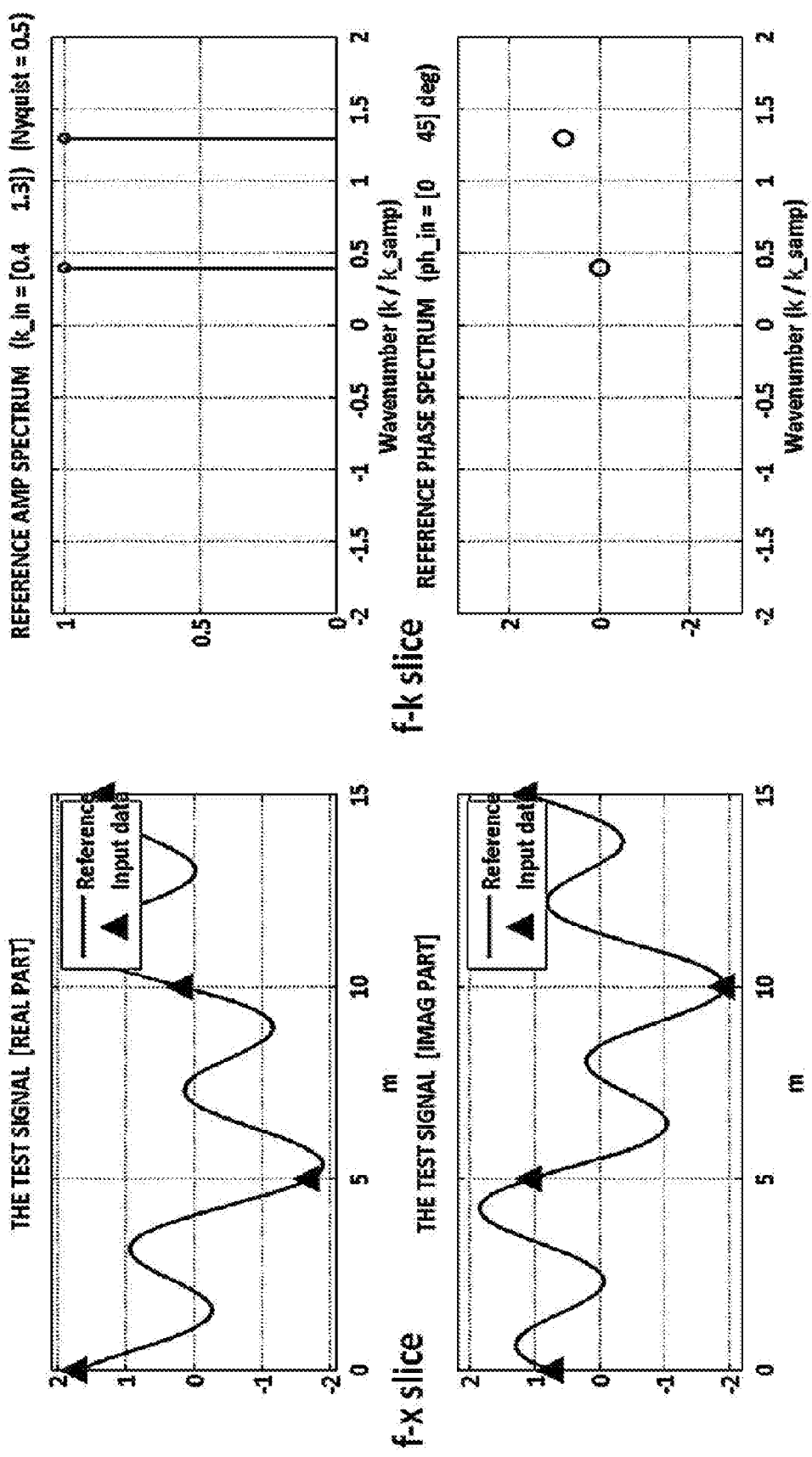
FIG. 23 illustrates an example of another signal that includes real and imaginary parts.

FIG. 23 illustrates examples of plots 2300 of an example of another signal that includes real and imaginary parts. As shown, there are interfering aliased components. The non-aliased component lies with −0.5 to 0.5 as to wavenumber whereas the aliased component lies greater than 1 as to wavenumber.

Figure 24:
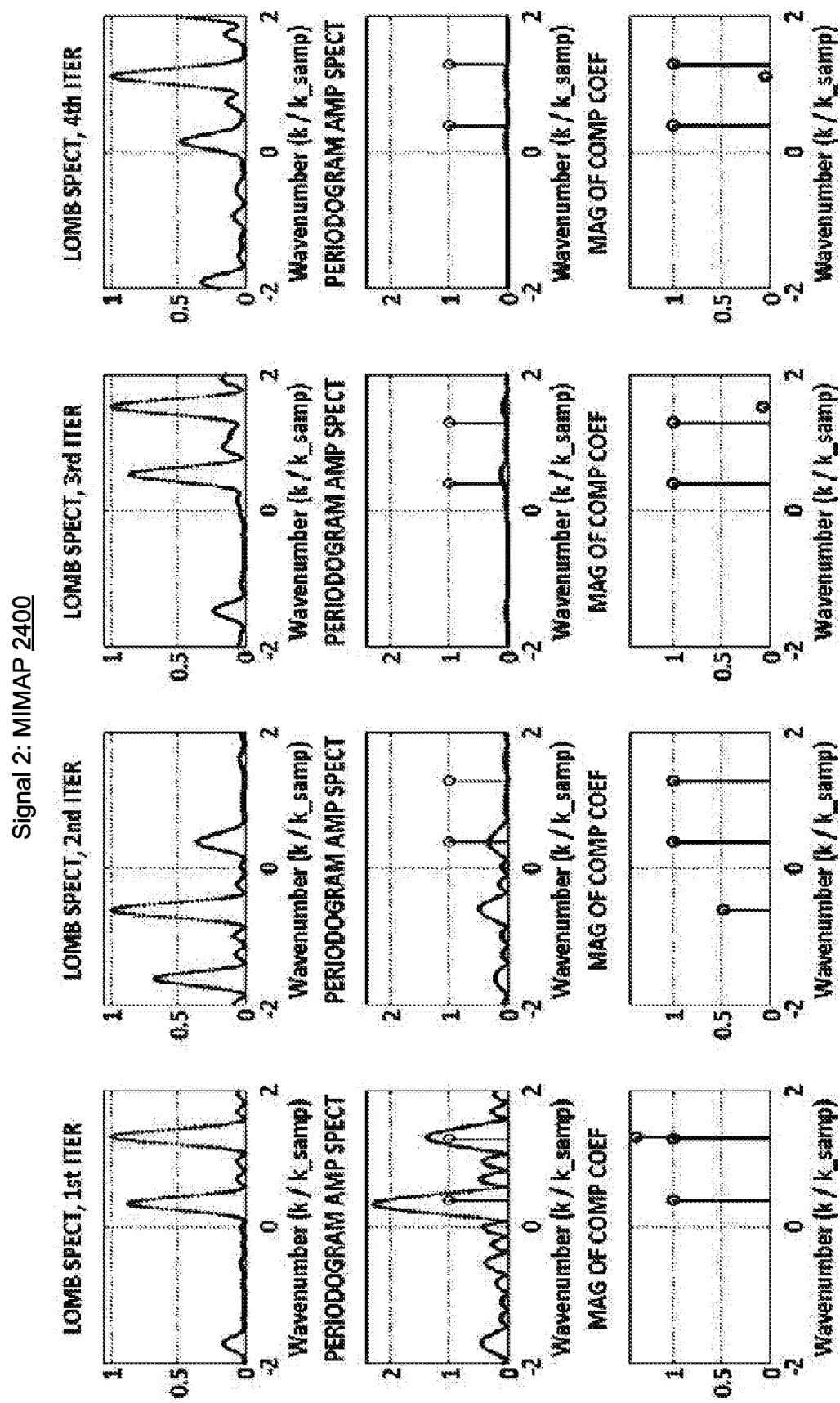
FIG. 24 illustrates examples of plots of data for a series of iterations of a MIMAP method.

FIG. 24 illustrates examples of plots 2400 of data for a series of iterations of a MIMAP method. In FIG. 24, the first four iterations of IAA-MP are shown in the four columns. The top row shows the generalized Lomb spectrum for IAA-MP, to indicate the optimum dictionary atom. The second row shows the IAA spectrum, giving the magnitudes of the potential components that can be picked at a given matching pursuit iteration. The last row shows the component picked, versus the test signal.

Figure 25:
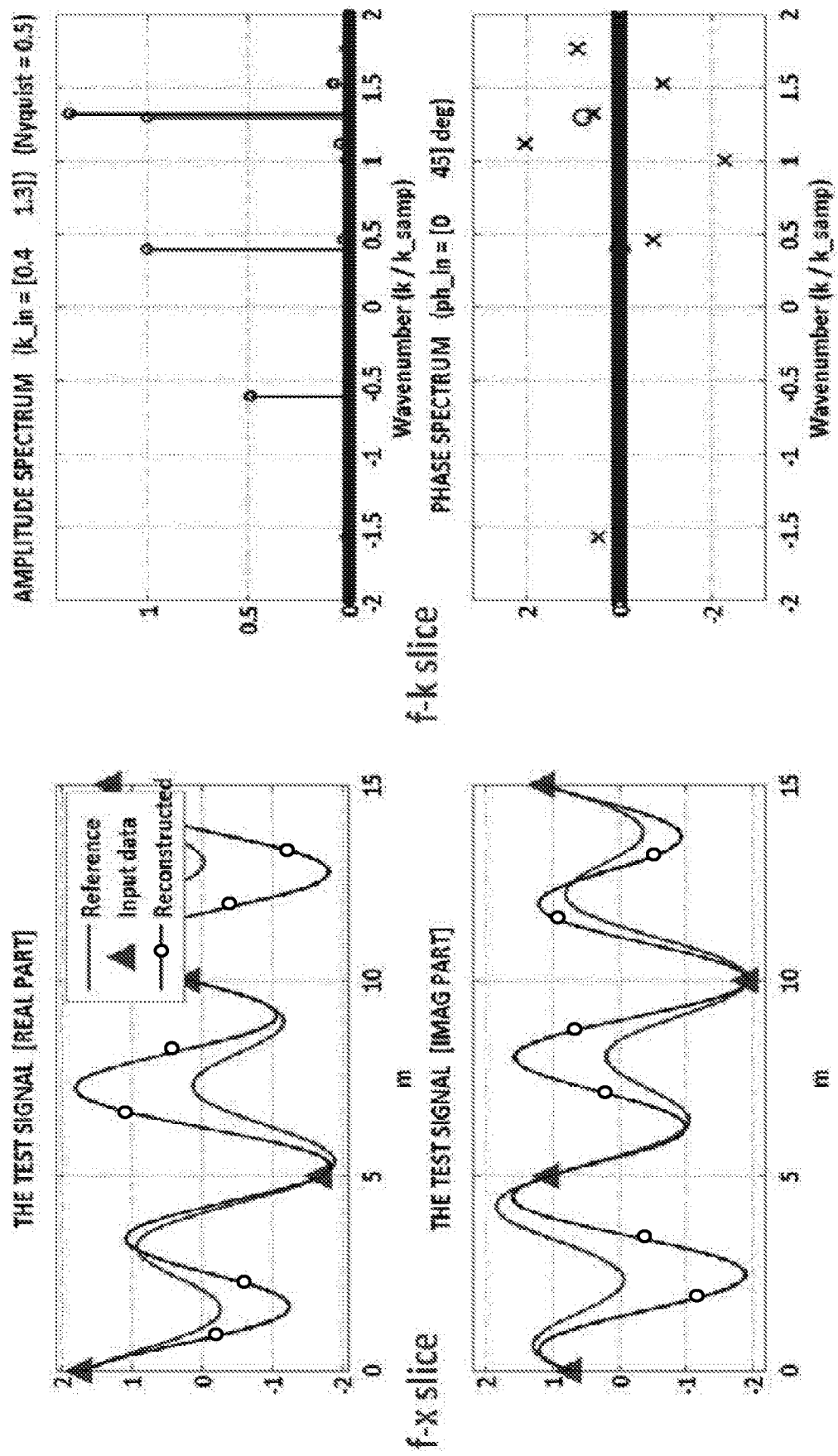
FIG. 25 illustrates examples of plots for the signal of FIG. 23 analyzed via the MIMAP method.

FIG. 25 illustrates examples of plots 2500 for the signal of FIG. 23 analyzed via the MIMAP method.

Figure 26:
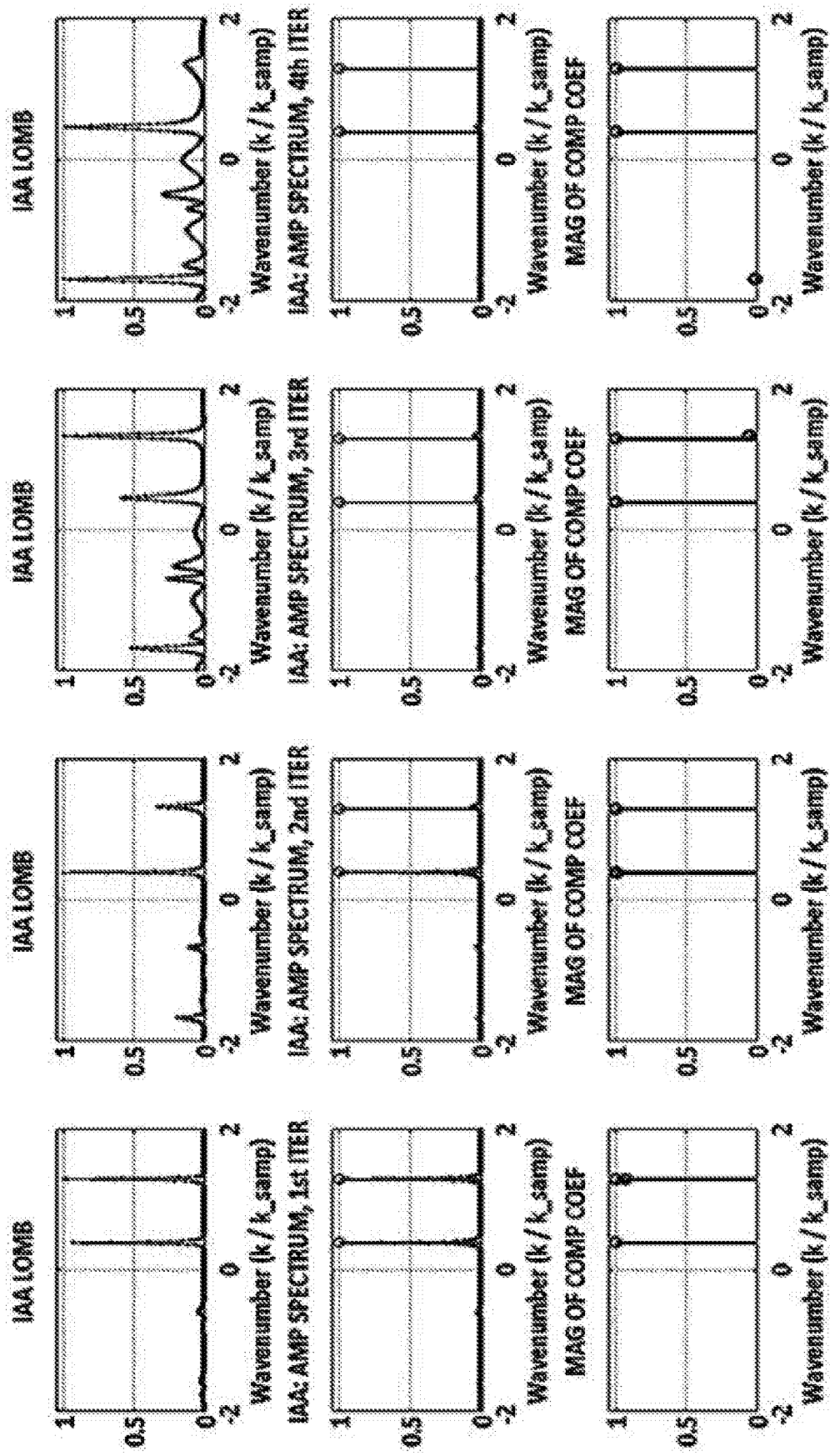
FIG. 26 illustrates examples of plots of data for a series of iterations of a IAA-MP method.

FIG. 26 illustrates examples of plots 2600 of data for a series of iterations of an IAA-MP method.

Figure 27:
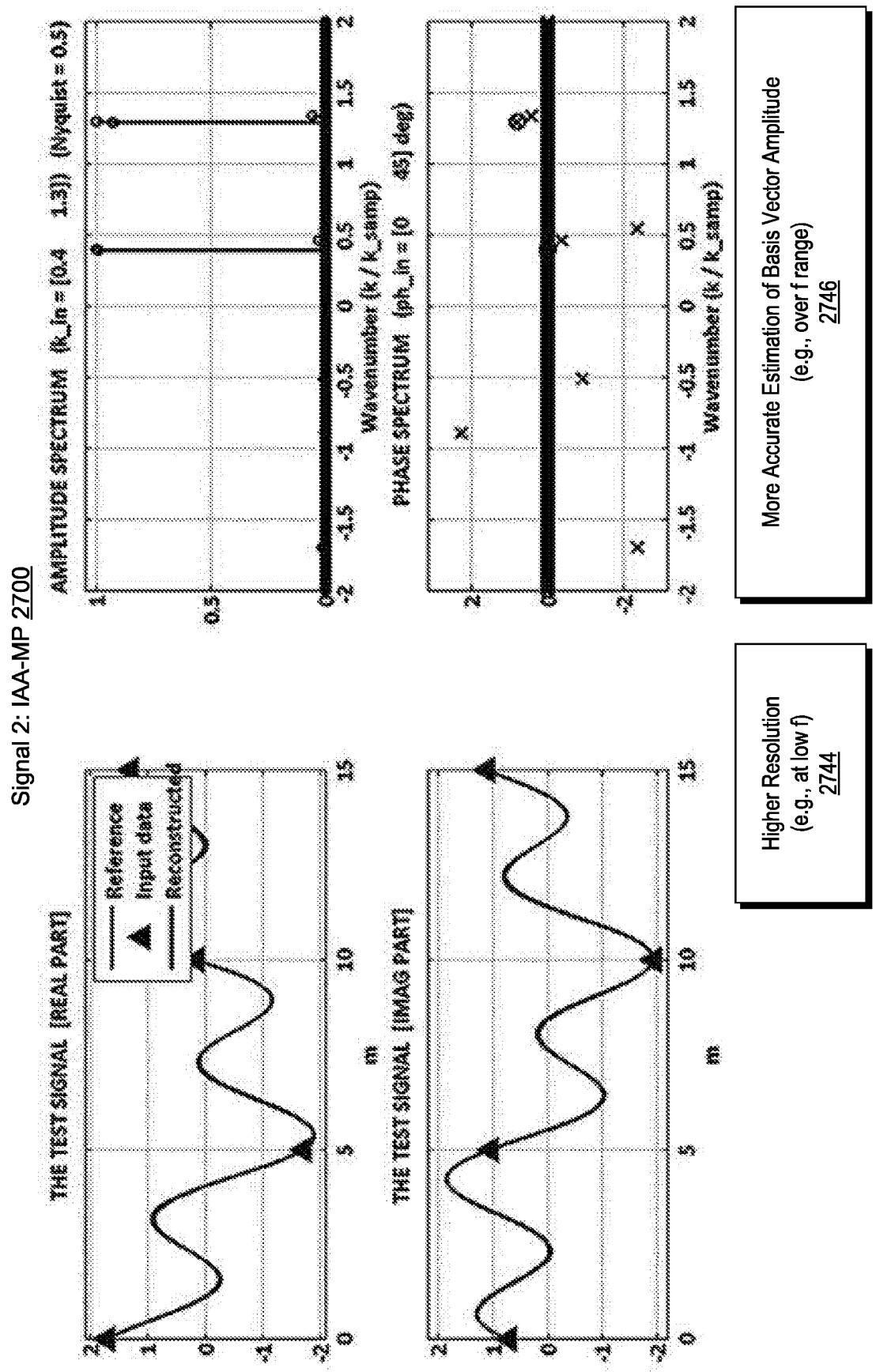
FIG. 27 illustrates examples of plots for the signal of FIG. 23 analyzed via the IAA-MP method.

FIG. 27 illustrates examples of plots 2700 for the signal of FIG. 23 analyzed via the IAA-MP method. FIG. 27 shows a block 2744 as to higher resolution (e.g., at a low frequency) and a block 2746 as to a more accurate estimation of basis vector amplitudes (e.g., over a frequency range).

Figure 28:
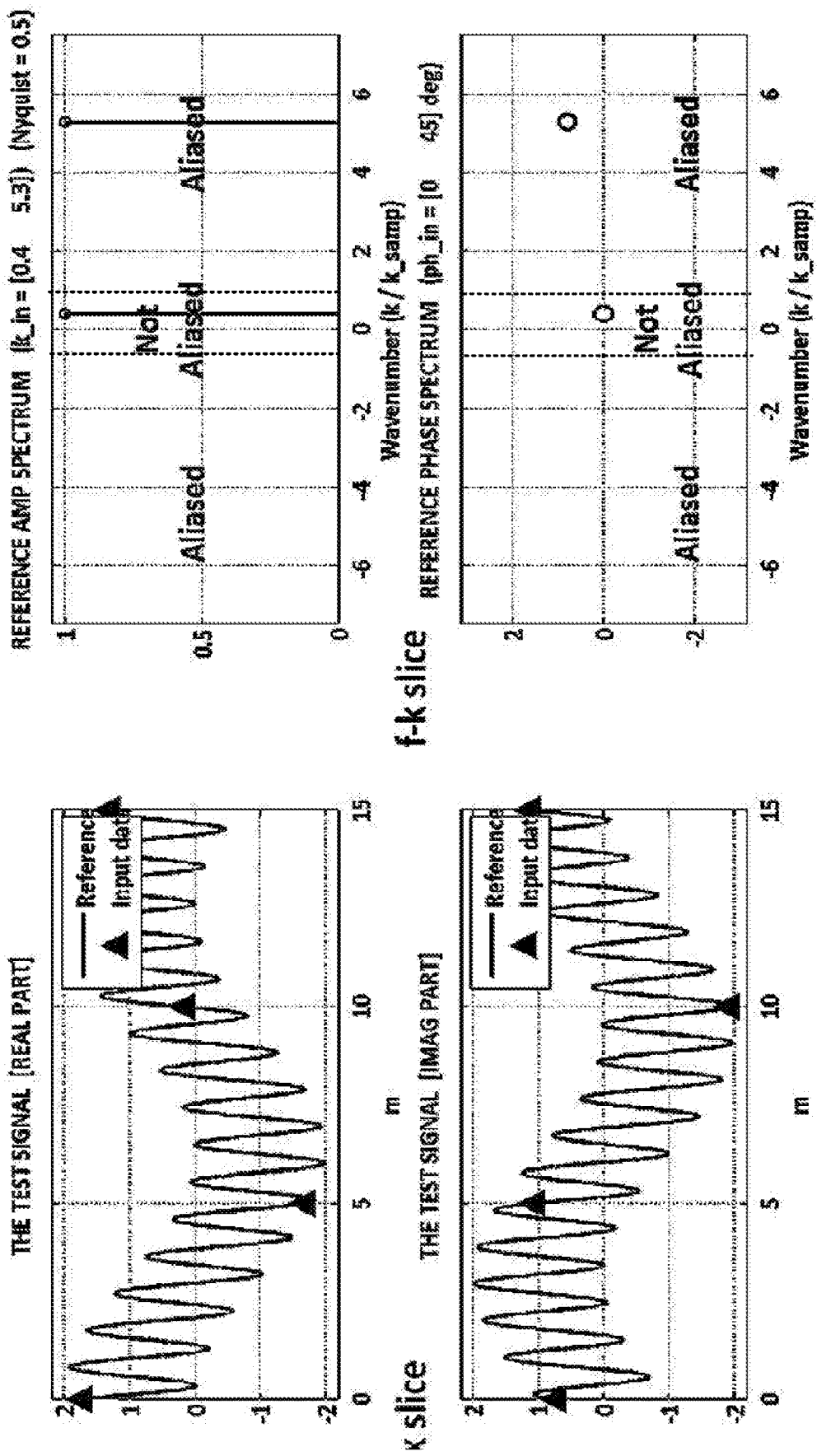
FIG. 28 illustrates an example of another signal that includes real and imaginary parts.

FIG. 28 illustrates examples of plots 2800 of an example of another signal that includes real and imaginary parts where not aliased and aliased components are shown. In particular, the plots 2800 show high order aliasing and interfering aliased components.

Figure 29:
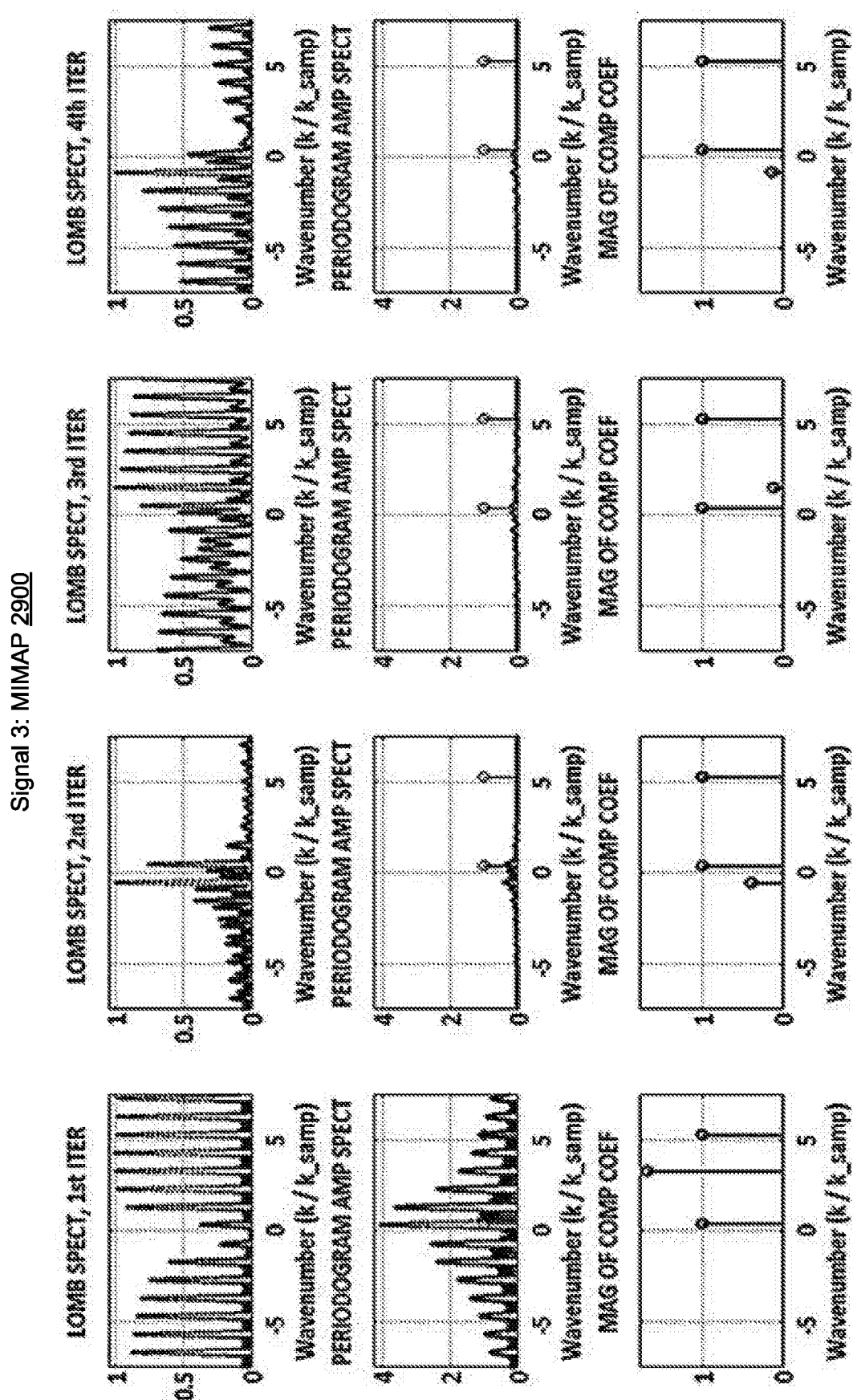
FIG. 29 illustrates examples of plots of data for a series of iterations of a MIMAP method.

FIG. 29 illustrates examples of plots 2900 of data for a series of iterations of a MIMAP method.

Figure 30:
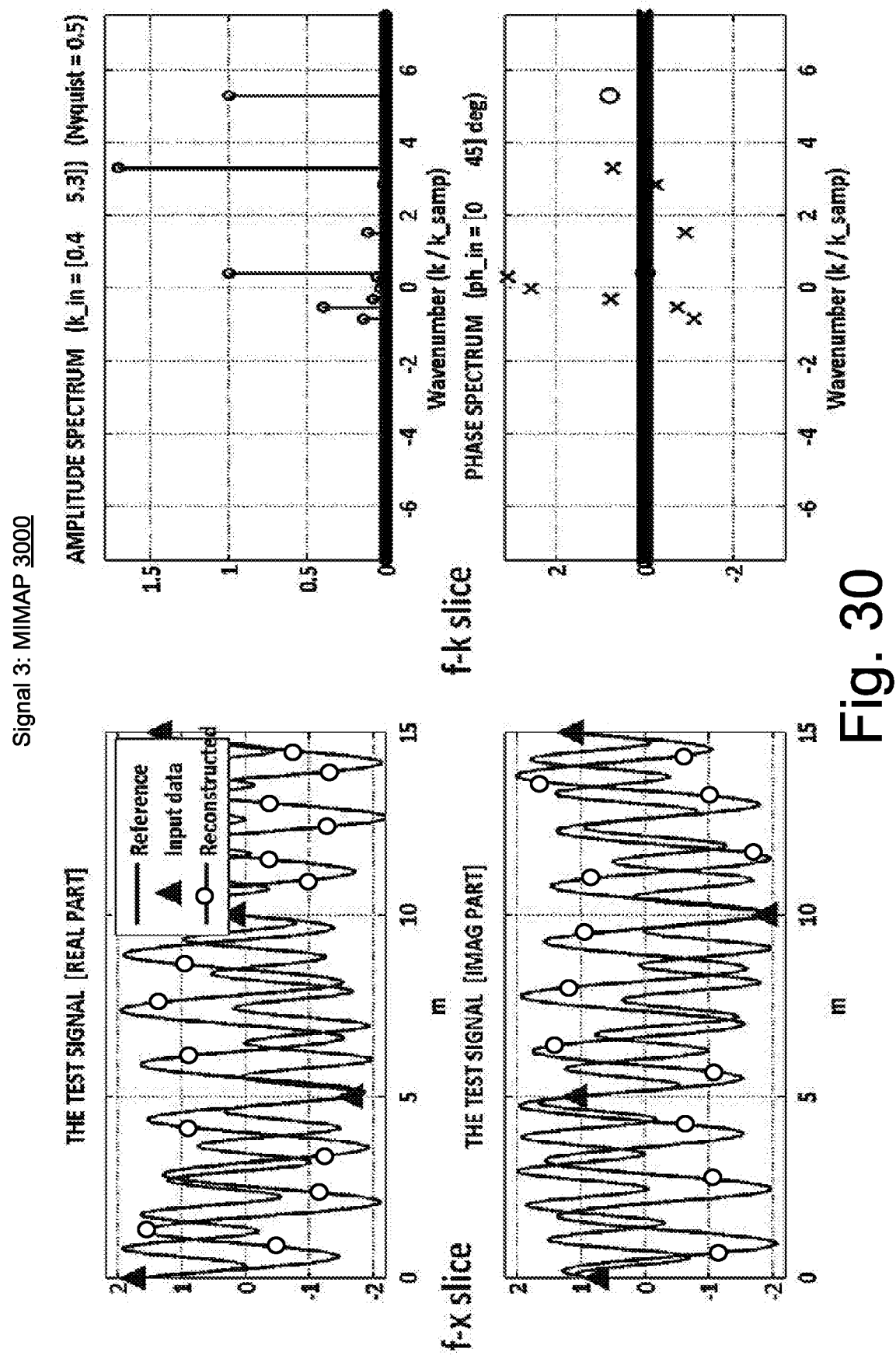
FIG. 30 illustrates examples of plots for the signal of FIG. 28 analyzed via the MIMAP method.

FIG. 30 illustrates examples of plots 3000 for the signal of FIG. 28 analyzed via the MIMAP method. In the signal f-x slice plots (left hand side), reconstruction data are illustrated with open circles as markers, which illustrate variations that exceed those of the reference. Input data are also shown via black, filled triangles.

Figure 31:
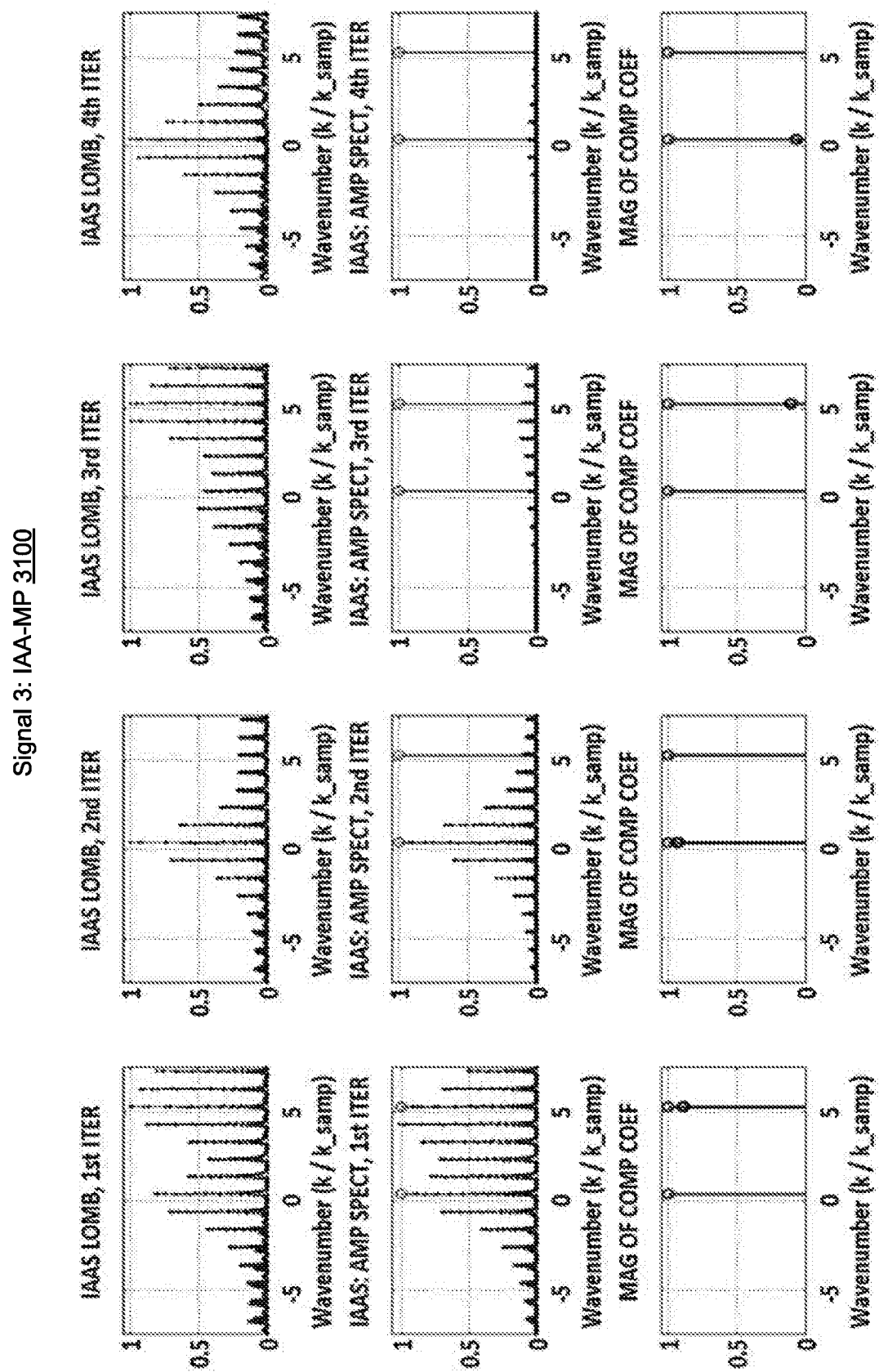
FIG. 31 illustrates examples of plots of data for a series of iterations of a IAA-MP method.

FIG. 31 illustrates examples of plots 3100 of data for a series of iterations of an IAA-MP method.

Figure 32:
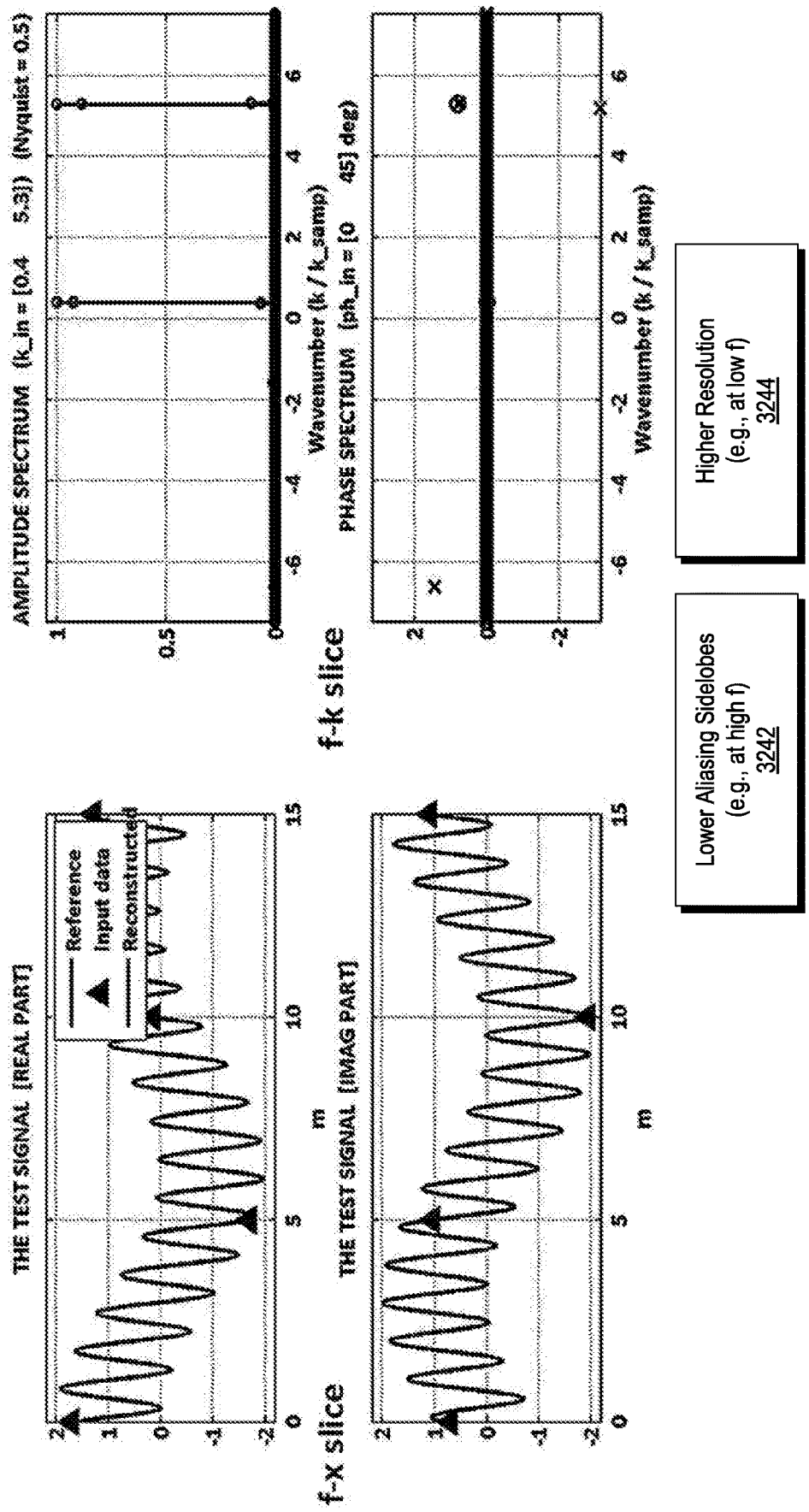
FIG. 32 illustrates examples of plots for the signal of FIG. 28 analyzed via the IAA-MP method.

FIG. 32 illustrates examples of plots 3200 for the signal of FIG. 28 analyzed via the IAA-MP method. Also shown in FIG. 32 are blocks 3242 and 3244, which correspond to lower aliasing sidelobes (e.g., at high frequencies) and higher resolution (e.g., at lower frequencies), respectively. As an example, an IAA-MP approach can provide improvements over a MP approach. In particular, IAA-MP can provide for lower aliasing sidelobes (e.g., beneficial particularly at high frequencies) and can provide for higher resolution (e.g., beneficial particularly at low frequencies).

Figure 33:
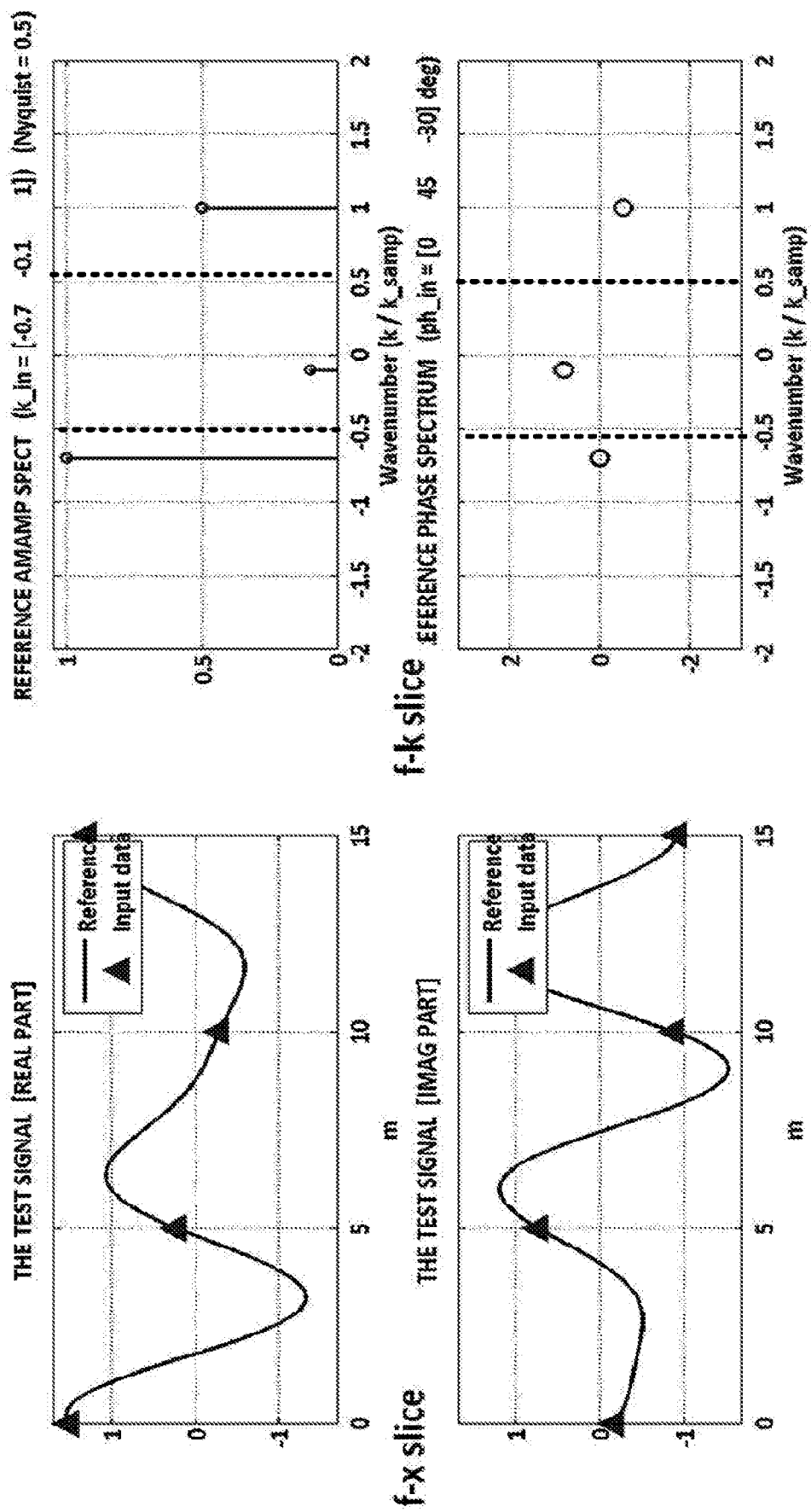
FIG. 33 illustrates an example of another signal that includes real and imaginary parts.

FIG. 33 illustrates examples of plots 3300 for an example of another signal that includes real and imaginary parts. As shown, the signal can provide for an analysis of weak signal where it can be desirable to preserve weak signal.

Figure 34:
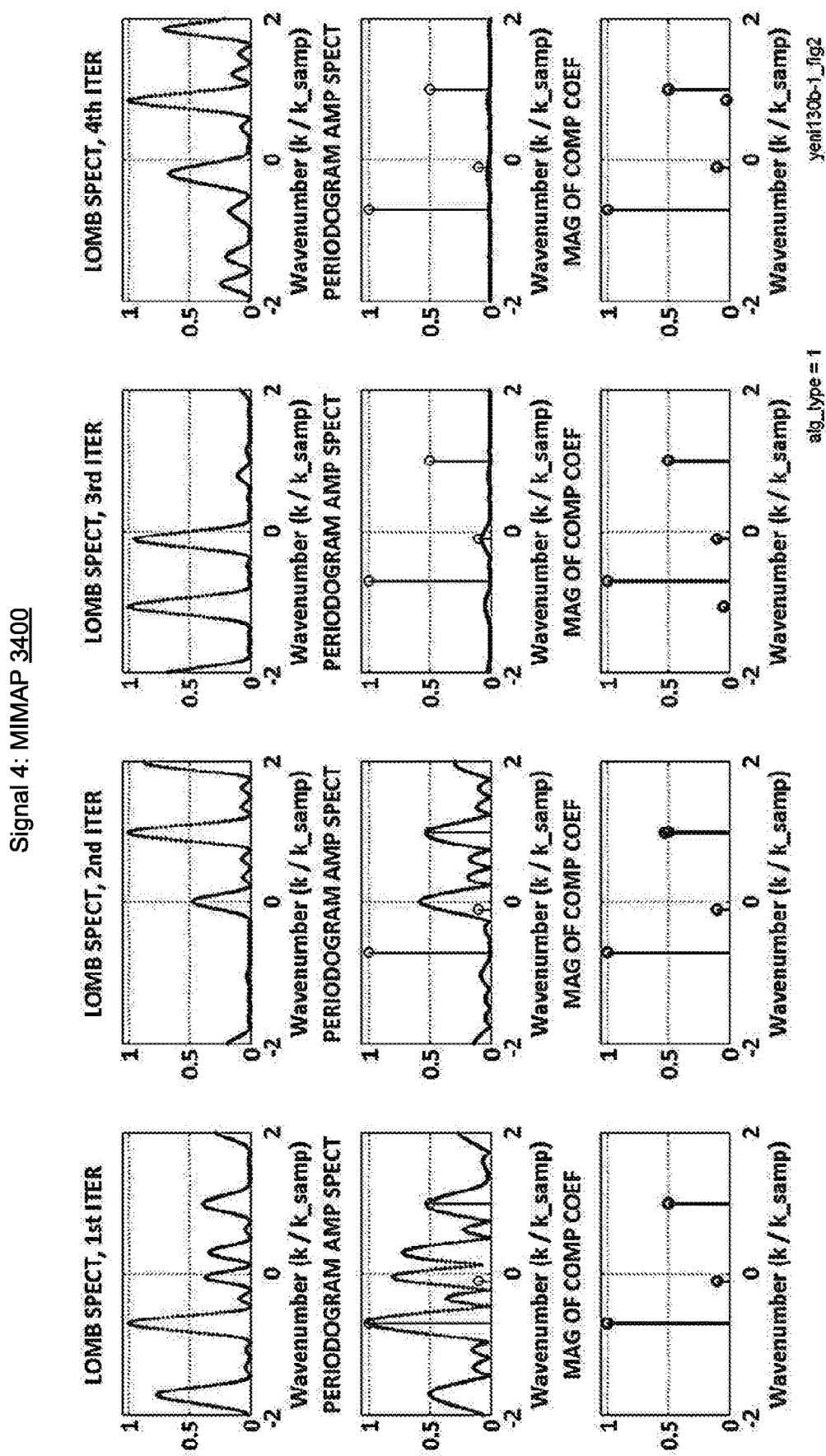
FIG. 34 illustrates examples of plots of data for a series of iterations of a MIMAP method.

FIG. 34 illustrates examples of plots 3400 of data for a series of iterations of a MIMAP method.

Figure 35:
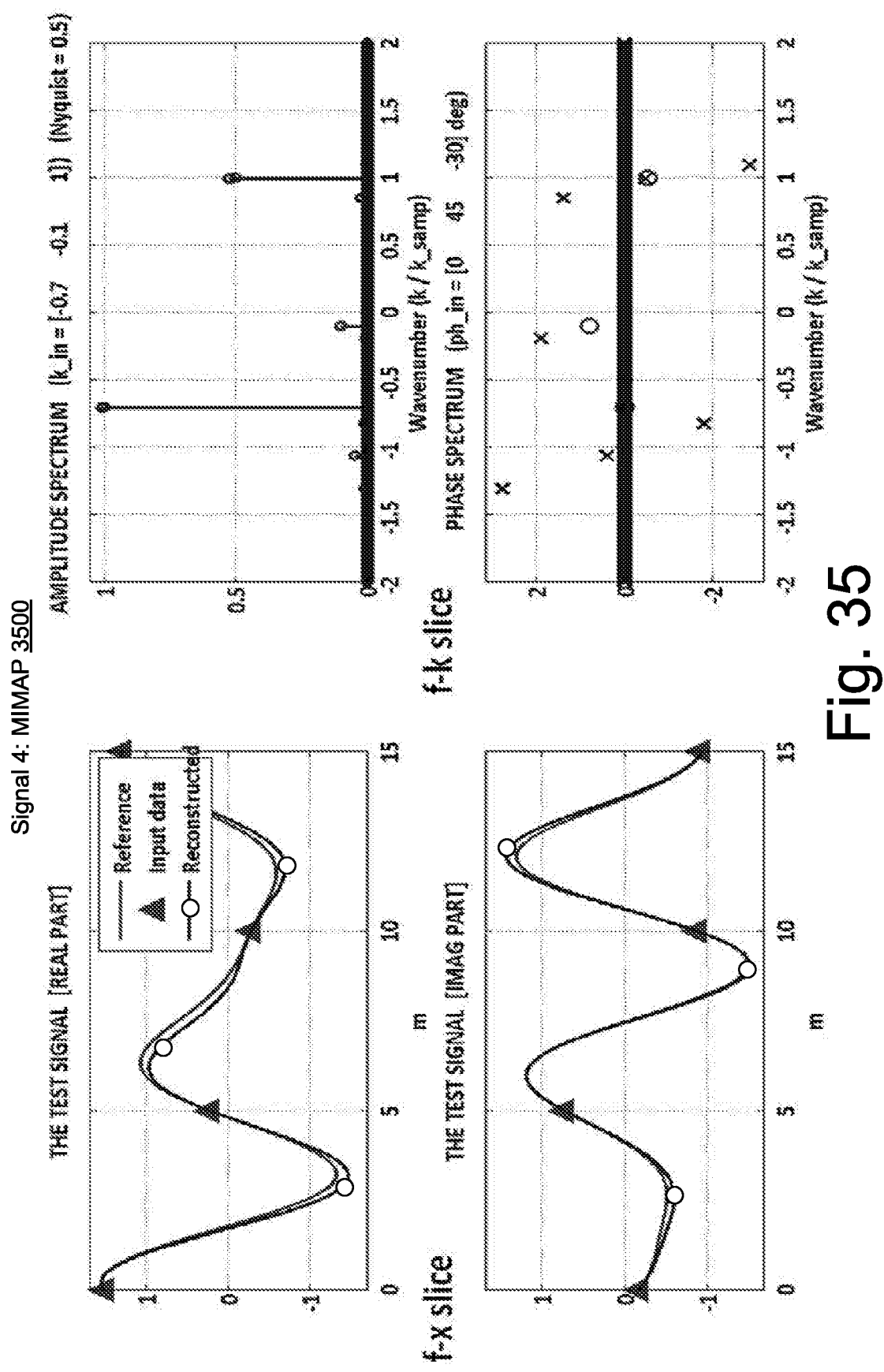
FIG. 35 illustrates examples of plots for the signal of FIG. 33 analyzed via the MIMAP method.

FIG. 35 illustrates examples of plots 3500 for the signal of FIG. 33 analyzed via the MIMAP method.

Figure 36:
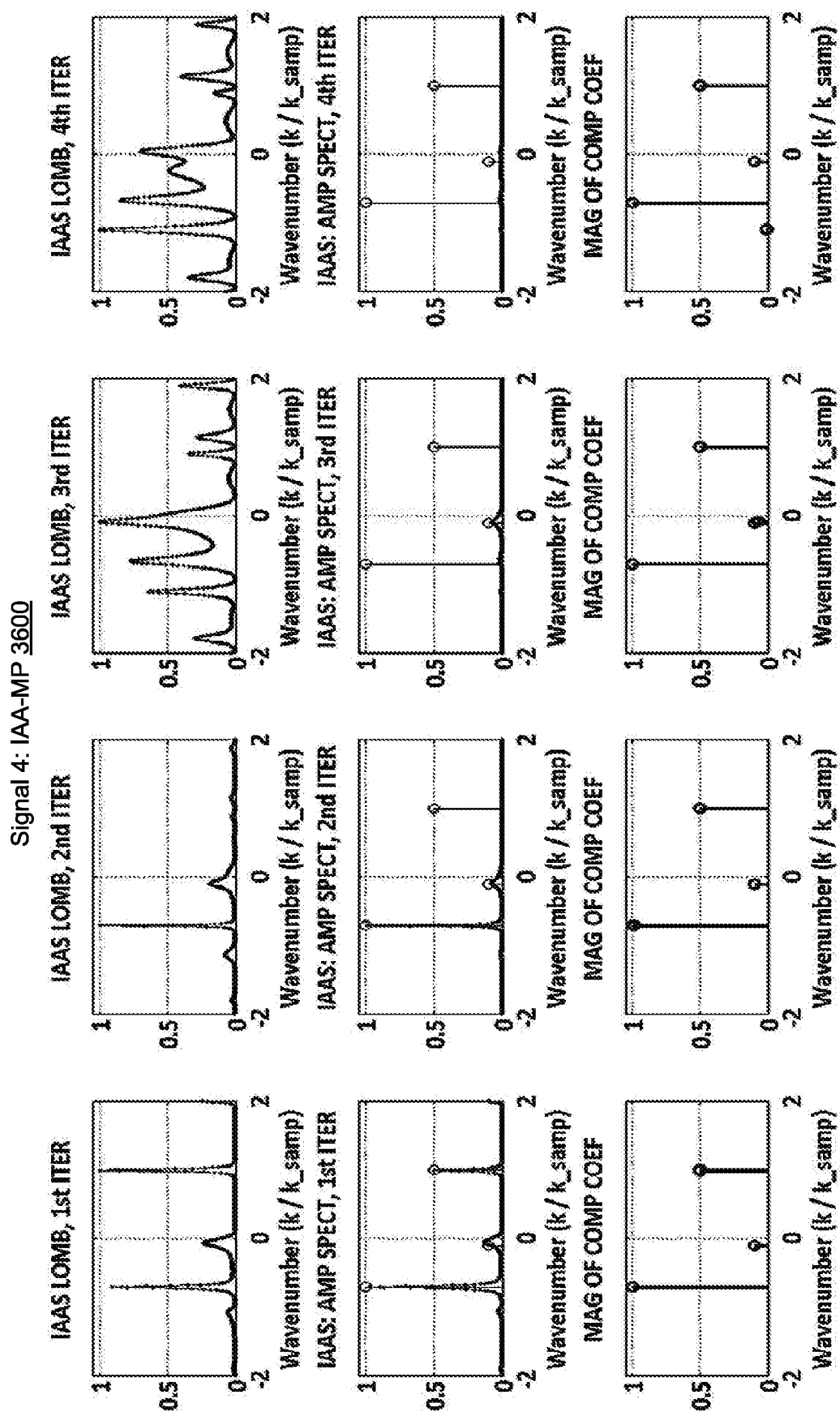
FIG. 36 illustrates examples of plots of data for a series of iterations of a IAA-MP method.

FIG. 36 illustrates examples of plots 3600 of data for a series of iterations of an IAA-MP method.

Figure 37:
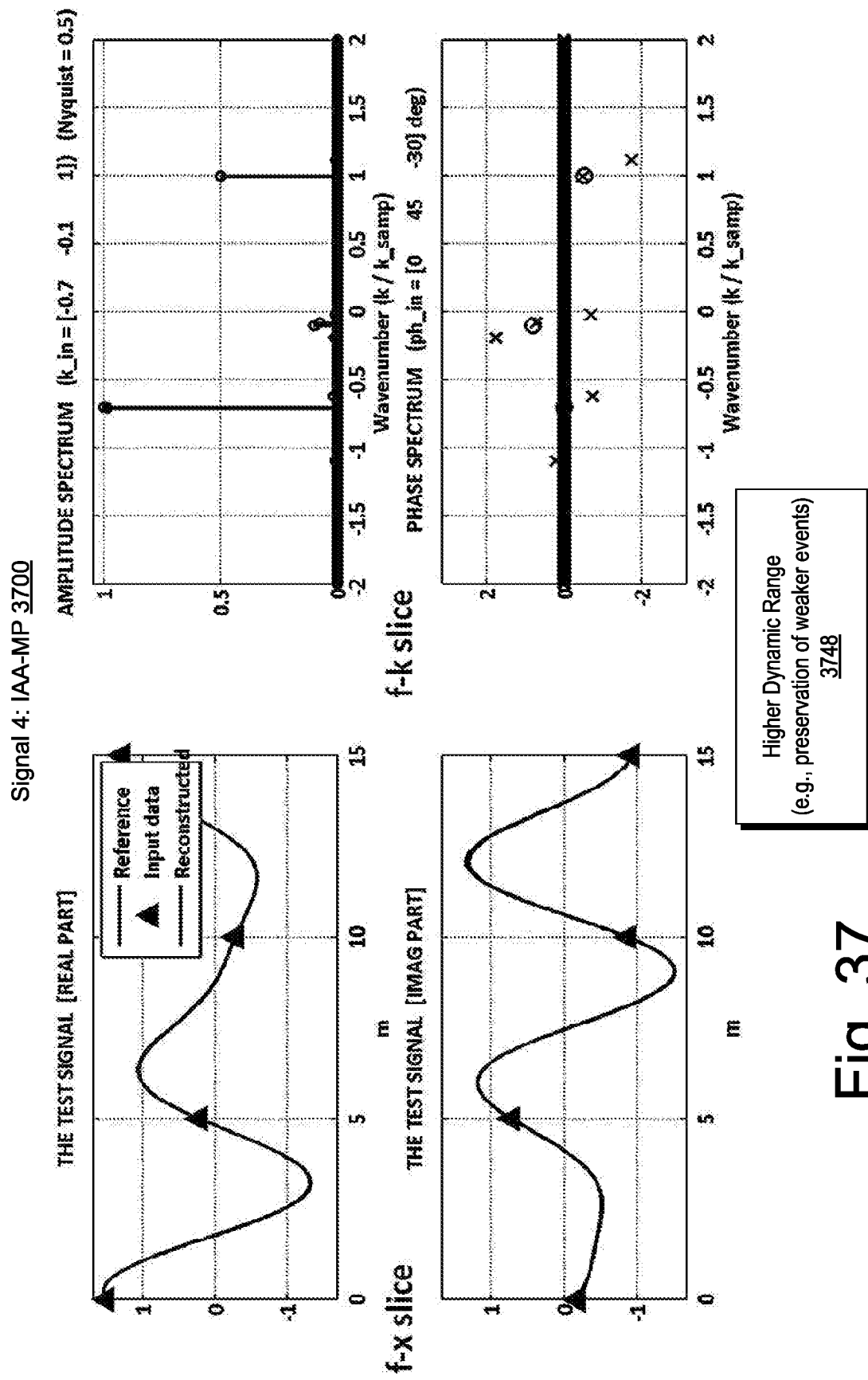
FIG. 37 illustrates examples of plots for the signal of FIG. 33 analyzed via the IAA-MP method.

FIG. 37 illustrates examples of plots 3700 for the signal of FIG. 33 analyzed via the IAA-MP method. FIG. 37 also shows a block 3748 as to higher dynamic range. For example, an IAA-MP approach can provide for preservation of weaker events (e.g., weaker signal).

FIG. 38 illustrates various examples of features 3800 of an IAA approach.

Figure 39:
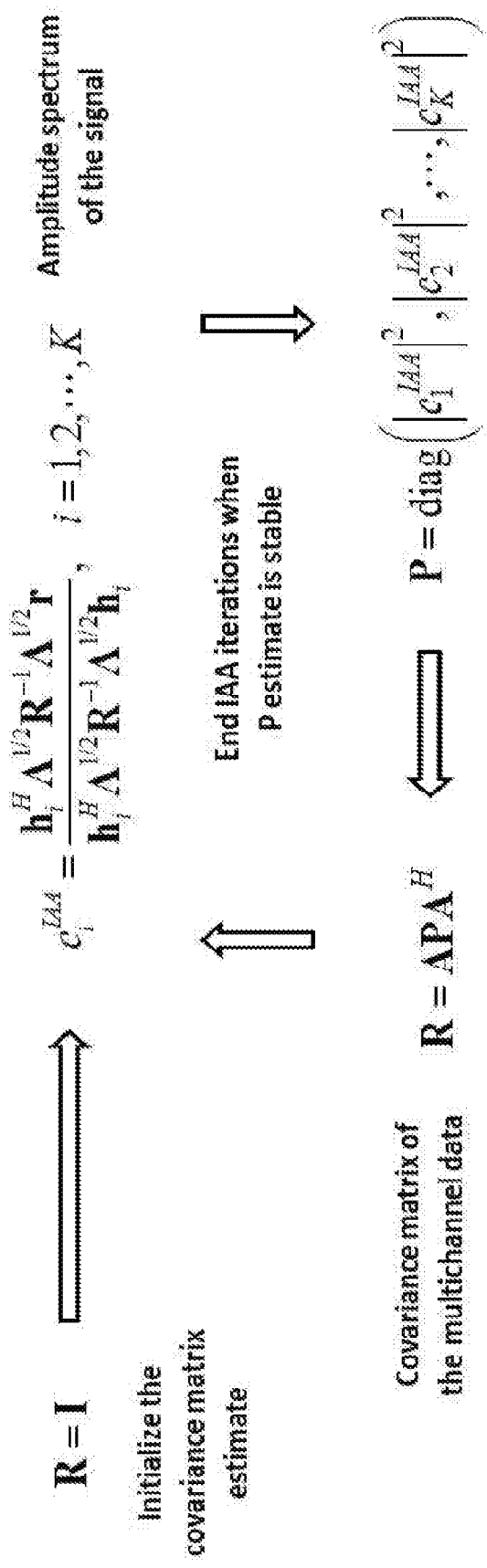
FIG. 39 illustrates an example of a method that includes IAA iterations to estimate the covariance matrix of multichannel data.

FIG. 39 illustrates an example of a method 3900 that includes IAA iterations to estimate the covariance matrix of multichannel data.

Figure 40:
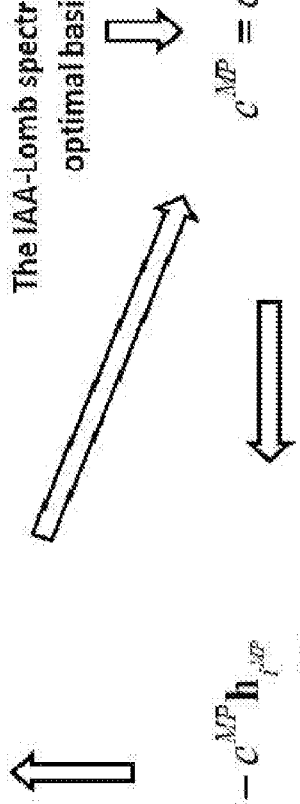
FIG. 40 illustrates an example of a method for solution of multicomponent compressed sensing via a IAA-MP (IAA-EGMP) method.

FIG. 40 illustrates an example of a method 4000 for solution of multicomponent compressed sensing via an IAA-MP (IAA-EGMP) method. As shown in the example of FIG. 40, an IAA-Lomb spectrum can be utilized where such an approach may be utilized to indicate an optimal basis vector. As shown, the method 4000 can include solving a nonlinear weighted-least squares problem to find an optimal multichannel basis vector and its amplitude.

Figure 41:
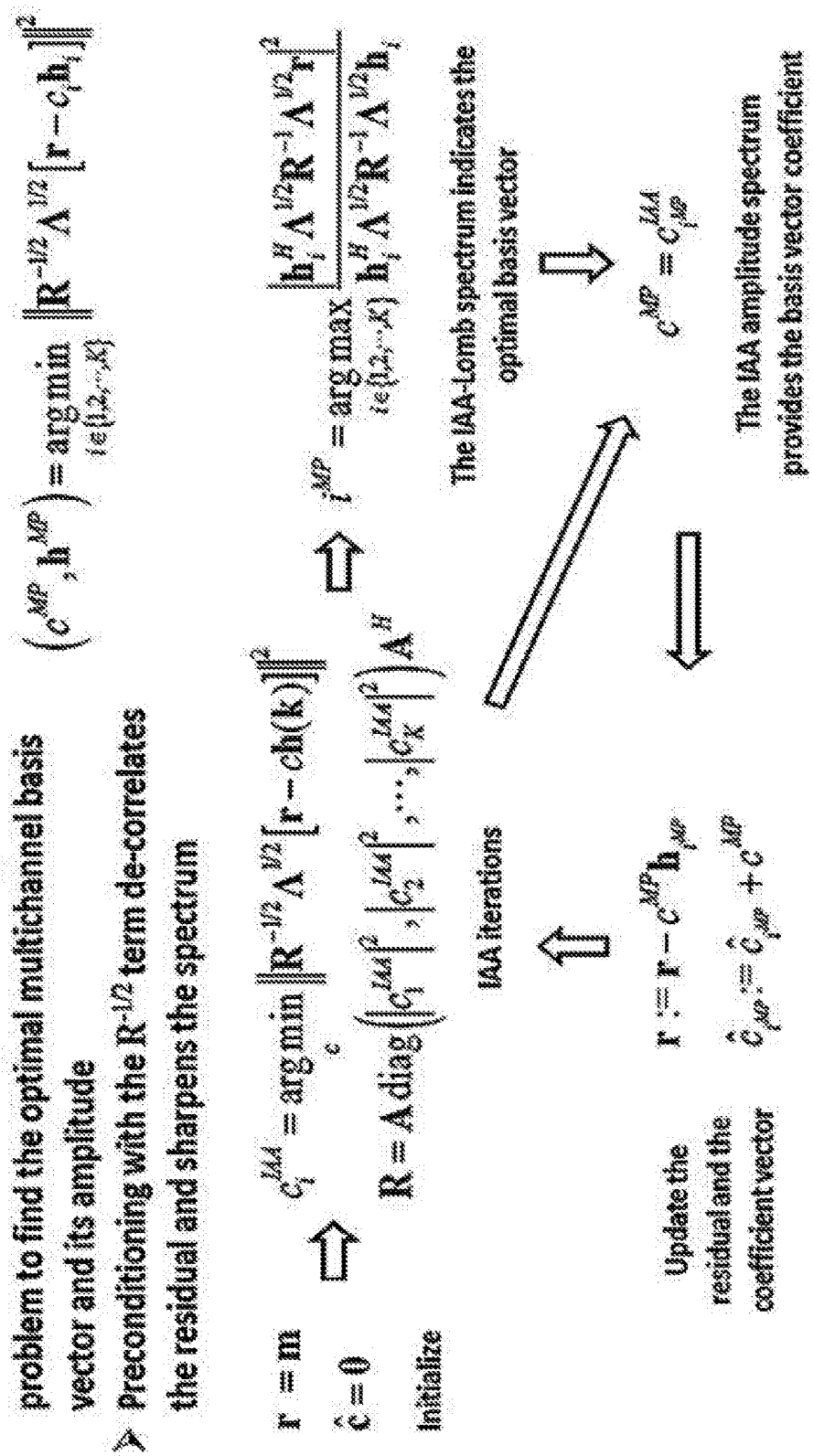
FIG. 41 illustrates the example method of FIG. 40 along with example equations for IAA iterations.

FIG. 41 illustrates the example method of FIG. 40, as an example method 4100, along with example equations for IAA iterations.

Figure 42:
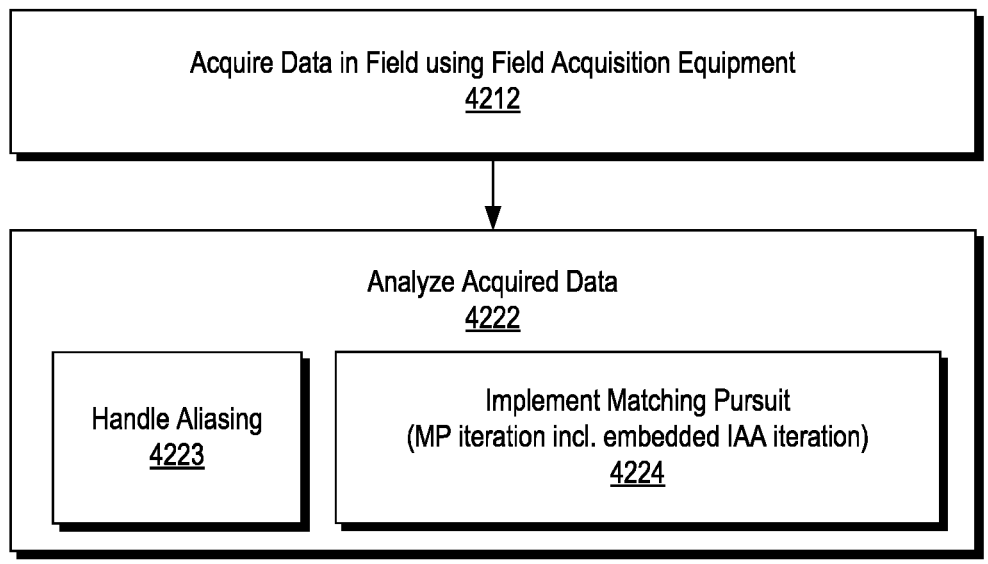
FIG. 42 illustrates an example of a method that may be part of the method of FIG. 4.

FIG. 42 illustrates an example of a method 4200 that may be part of the method of FIG. 4. As shown, the method 4200 includes an acquisition block 4212 for acquiring data in a field using field acquisition equipment and an analysis block 4222 for analyzing at least a portion of the acquired data. As shown, an analysis can include a block 4223 that handles aliasing and an implementation block 4224 for implementing matching pursuit, for example, via a MP iteration that includes one or more embedded IAA iterations.

Figure 43:
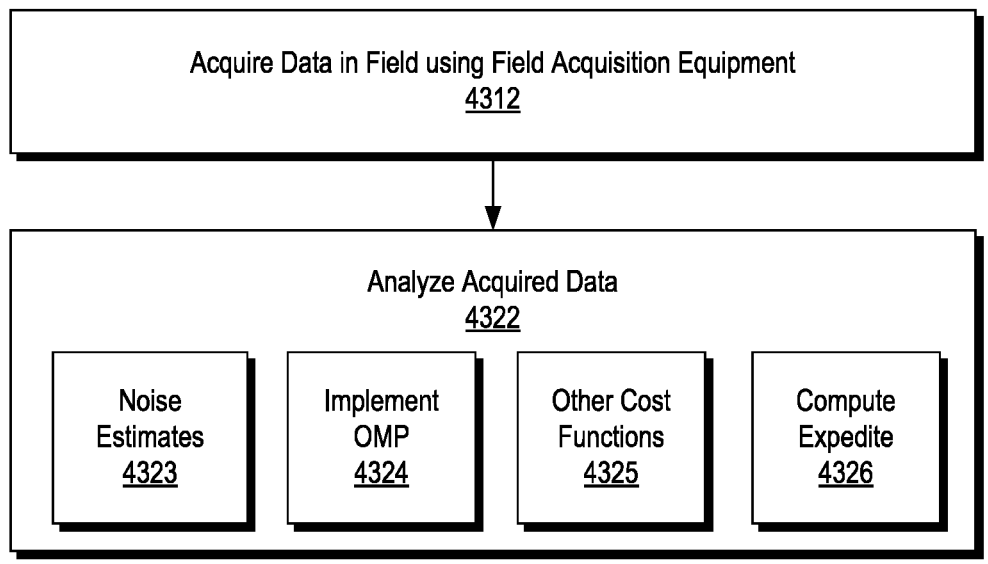
FIG. 43 illustrates an example of a method that may be part of the method of FIG. 4.

FIG. 43 illustrates an example of a method 4300 that may be part of the method of FIG. 4. The method 4300 includes an acquisition block 4312 for acquiring data in a field using field acquisition equipment and an analysis block 4322 for analyzing at least a portion of the acquired data. As shown, the analysis block 4322 can include features for noise estimates 4323, implementation of OMP 4324, utilizing of one or more cost functions 4325 and, for example, expedited computations 4326.

Figure 44:
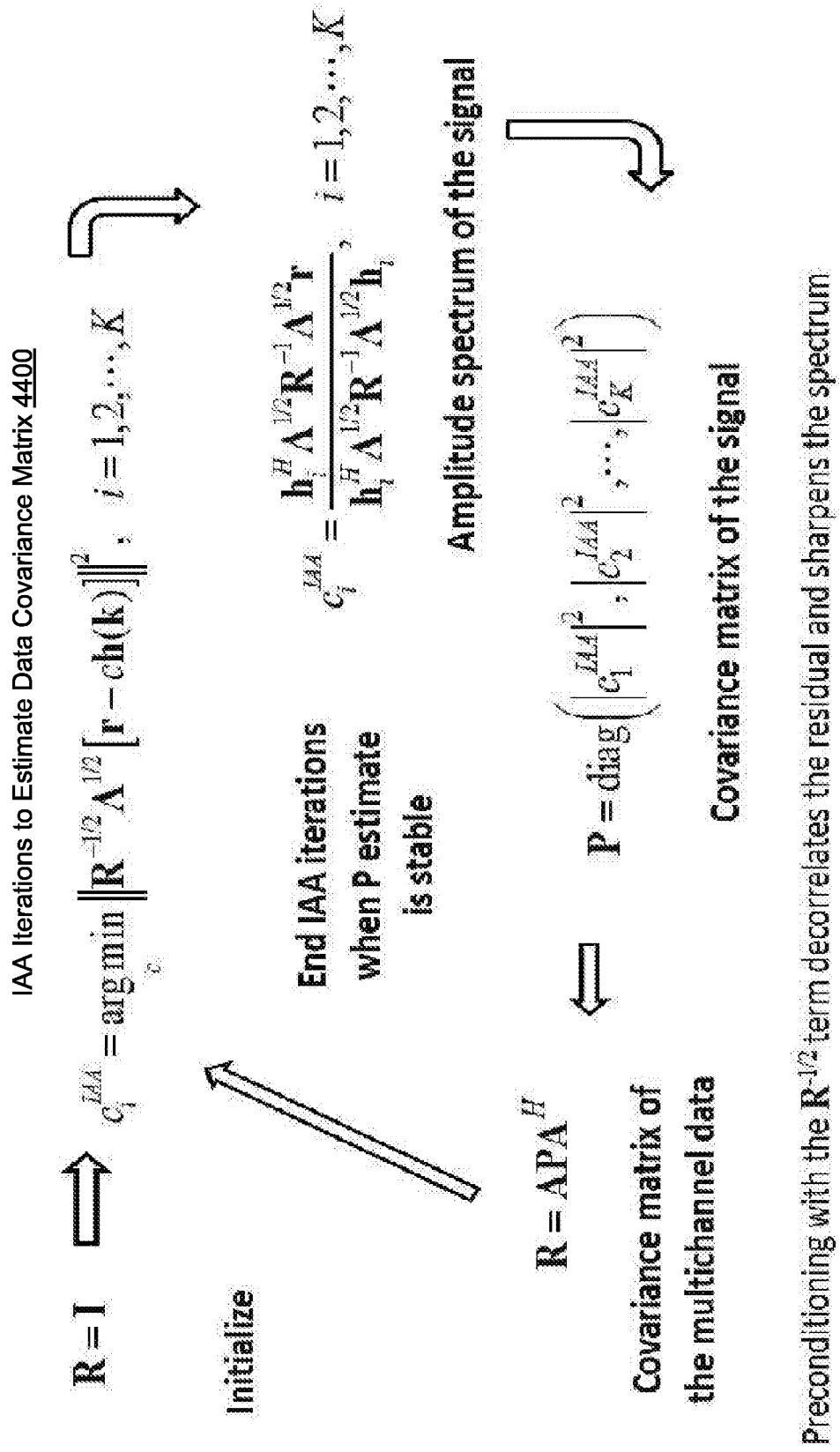
FIG. 44 illustrates an example of IAA iterations to estimate a covariance matrix.

FIG. 44 illustrates an example of a method 4400 that includes IAA iterations to estimate a covariance matrix.

Figure 45:
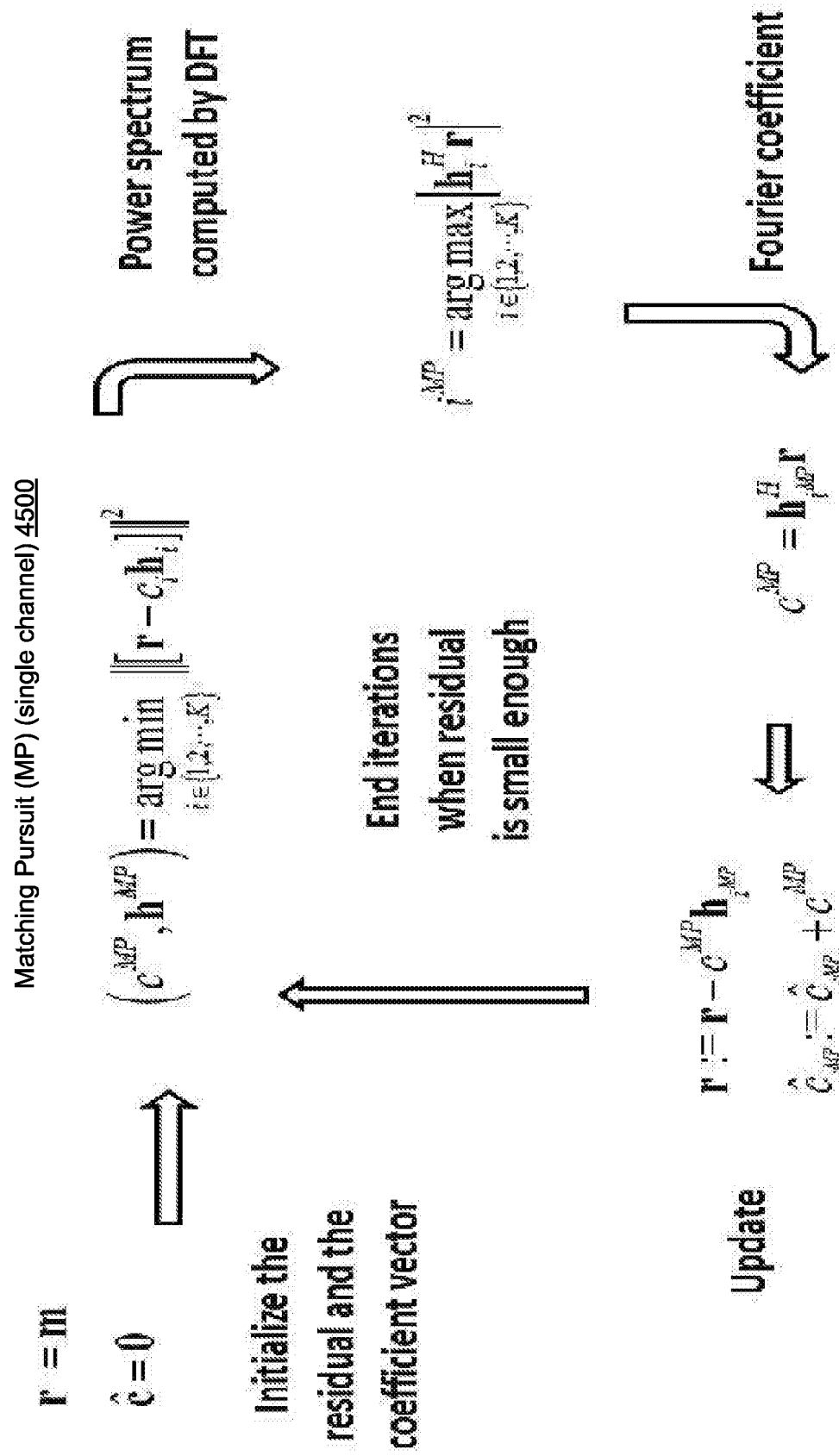
FIG. 45 illustrates an example of a matching pursuit (MP) method for a single channel.

FIG. 45 illustrates an example of a matching pursuit (MP) method 4500 for a single channel.

FIG. 46 illustrates pseudo-code of an example of a method 4600 and an example of a cost equation 4610.

FIG. 47 illustrates pseudo-code of an example of a method 4700 that includes MP iterations and IAA iterations.

FIG. 48 illustrates an example plot of cost functions 4810 and examples of plots 4820 and 4830 of cost functions. In the plot 4810, cost functions values are plotted versus wavenumber. In the plot 4810, a first iteration of the cost function of MP is the extended smooth line while the first iteration of the IAA-MP approach includes two peaks, which bound the true line spectrum. In the plots 4820 and 4830, the first iteration of the cost function of MP shows greater variation than the first iteration of the cost function of the IAA-MP, which exhibits results closer to the lines that represent the true line spectrum. In the plot 4820, a left arrow shows the wavenumber selected by MP while the right arrow shows the wavenumber selected by IAA-MP. As such, the IAA-MP can select a different wavenumber than the MP approach where the IAA-MP selected wavenumber can be more accurate (see true lines). The plot 4830 shows information for a crossline survey where the survey can be represented in meters, for example, from approximately 0 m to approximately 375 m. In the example plot 4830, the real part of the interpolation results is shown where the reference and the IAA-MP result align while the MP result is of greater variation; noting that measured locations are shown using circles.

FIG. 49 illustrates examples of plots 4910, 4920, 4930 and 4940 of data. In FIG. 49, the plot 4910 shows superposed linear events sampled at 25 m while the plot 4920 shows a linear radon transform where aliasing effects are visible.

FIG. 50 illustrates examples of plots 5010, 5020, 5030 and 5040 of data. The plot 5010 shows a crossline gather of input data to GMP and IAA-GMP with crossline spacing of 150 m. The plot 5020 shows reconstructed total pressure using GMP. The plot 5030 shows reconstructed total pressure using IAA-GMP. The plot 5040 shows a comparison between the spectra of the measured pressure at an omitted cable where the arrows as to the plots 5010, 5020 and 5030 indicate reconstructed pressure using GMP and IAA-GMP.

Figure 51:
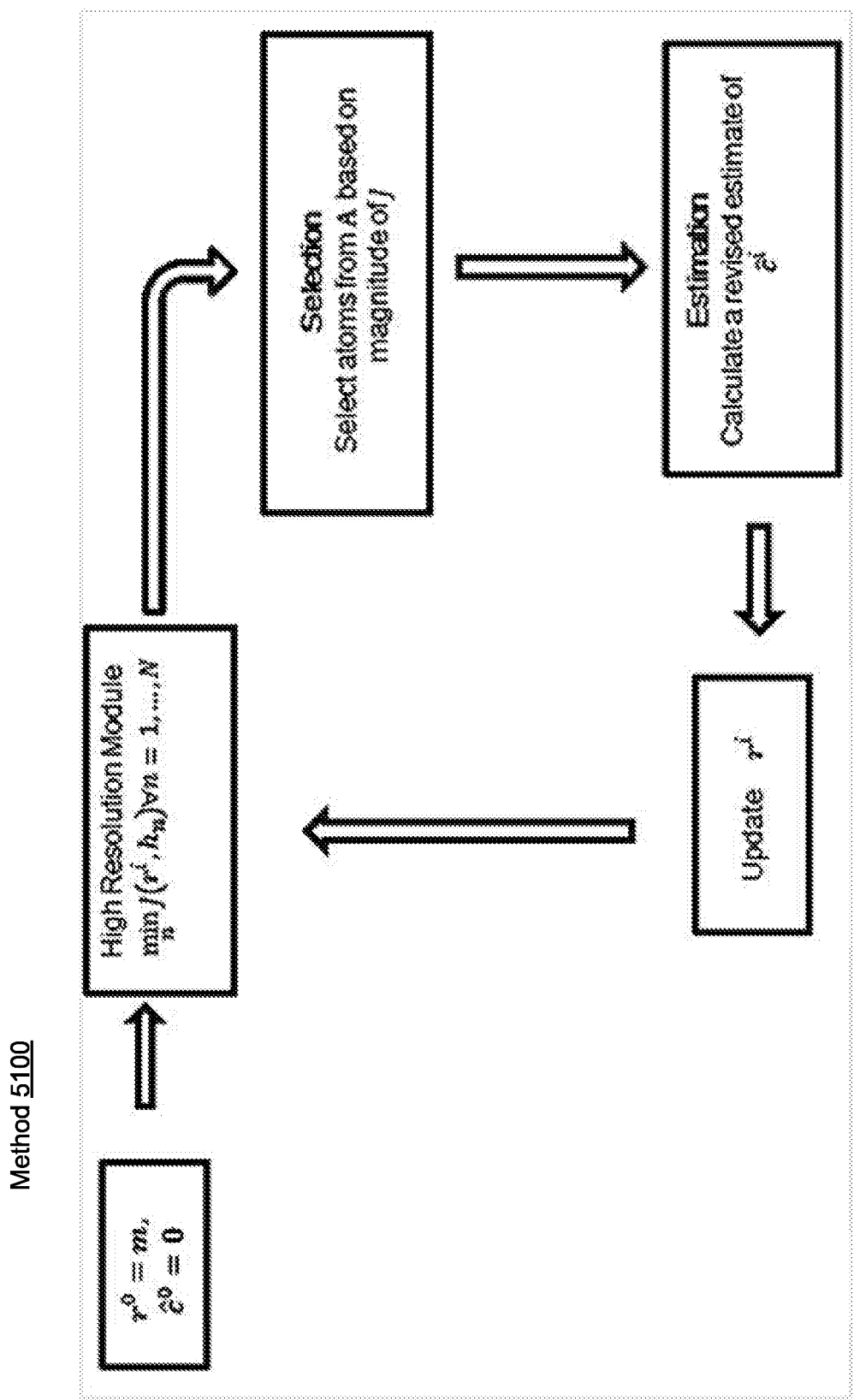
FIG. 51 illustrates an example of a method that includes a feature for high resolution processing of acquired data.

FIG. 51 illustrates an example of a method 5100 that includes a feature for high resolution processing of acquired data.

Figure 52:
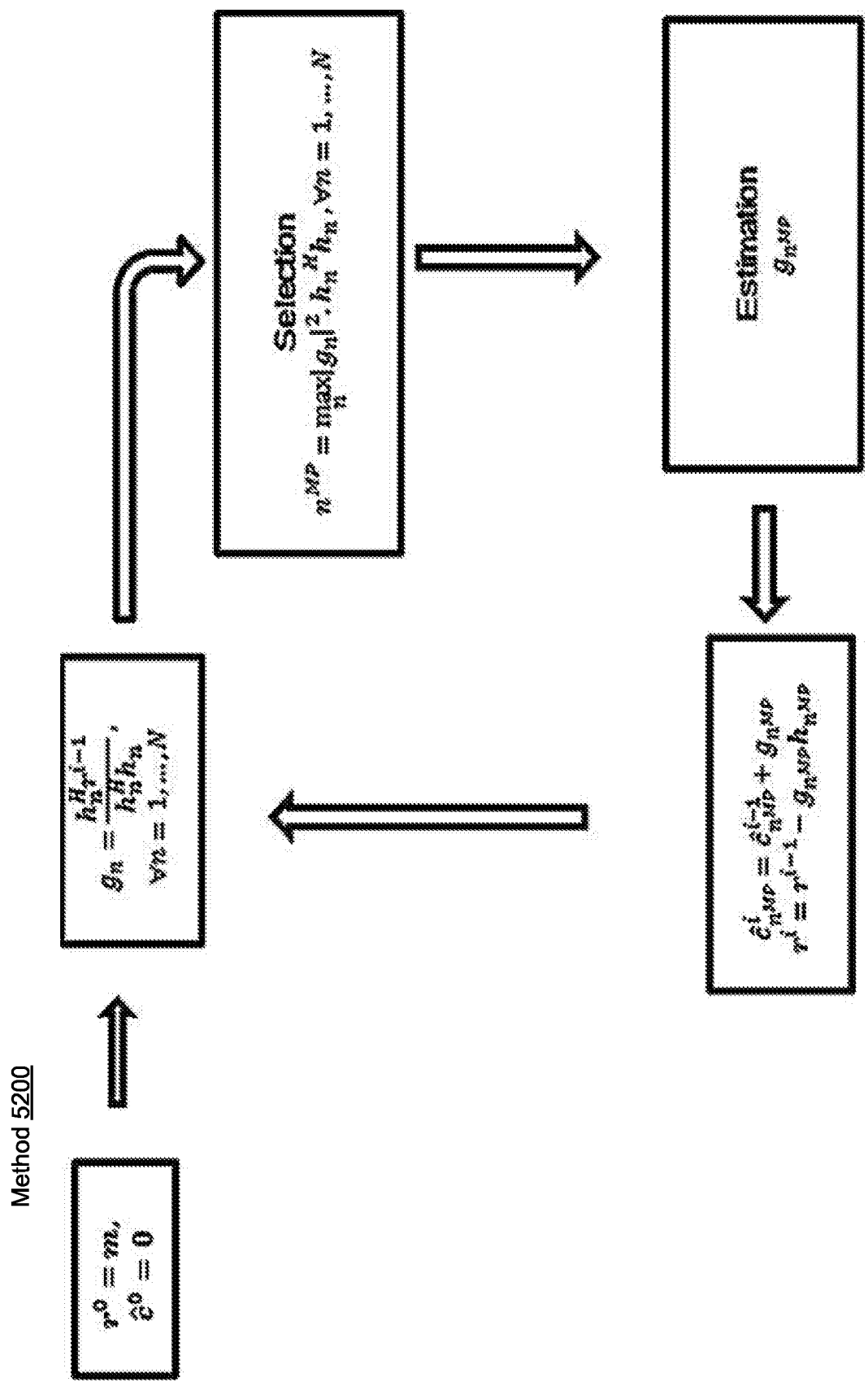
FIG. 52 illustrates an example of a method for matching pursuit (MP)

FIG. 52 illustrates an example of a method 5200 for matching pursuit (MP).

Figure 53:
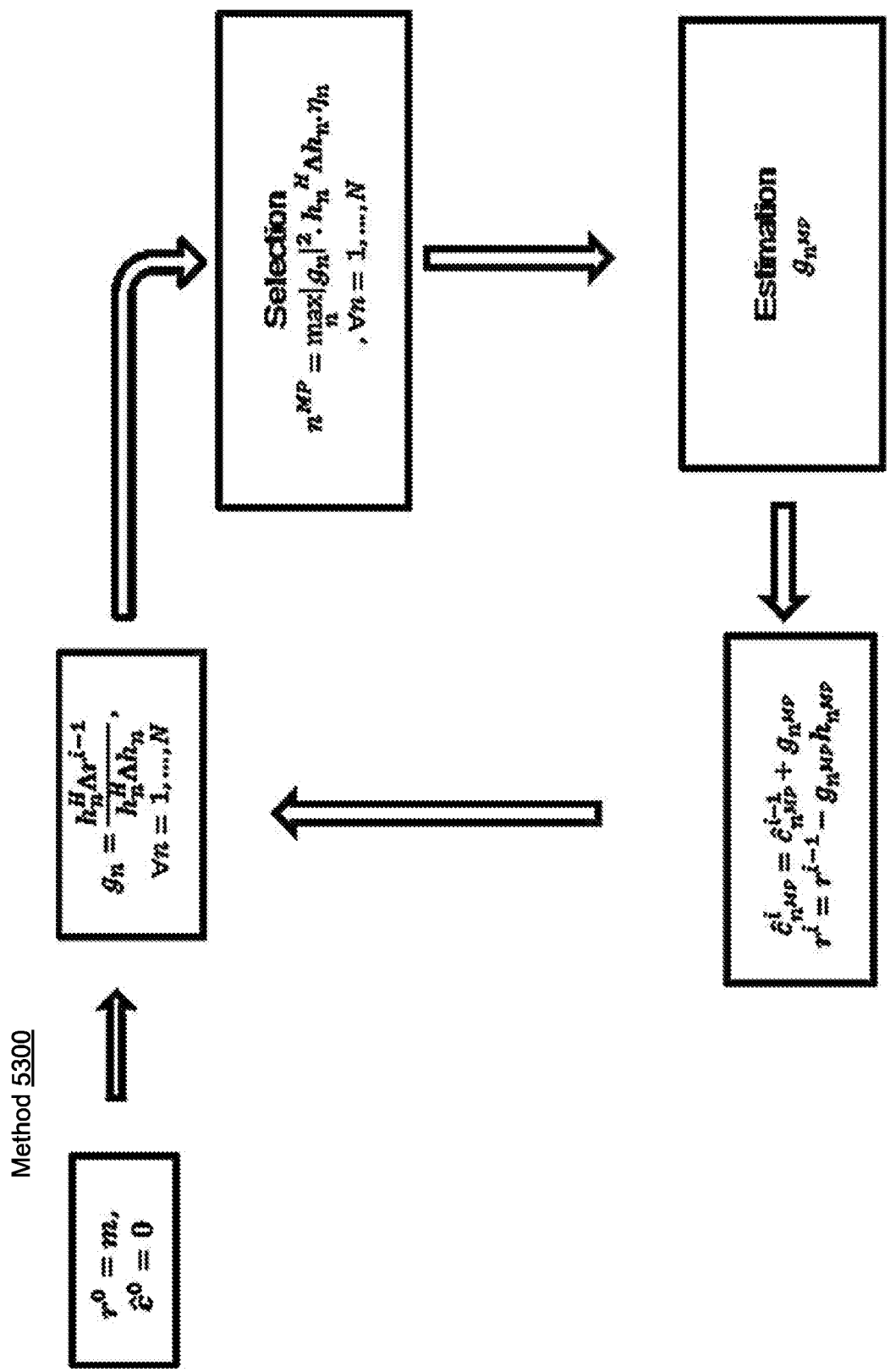
FIG. 53 illustrates an example of a method for matching pursuit (MP) including weights and prior information.

FIG. 53 illustrates an example of a method 5300 for matching pursuit (MP) including weights and prior information.

Figure 54:
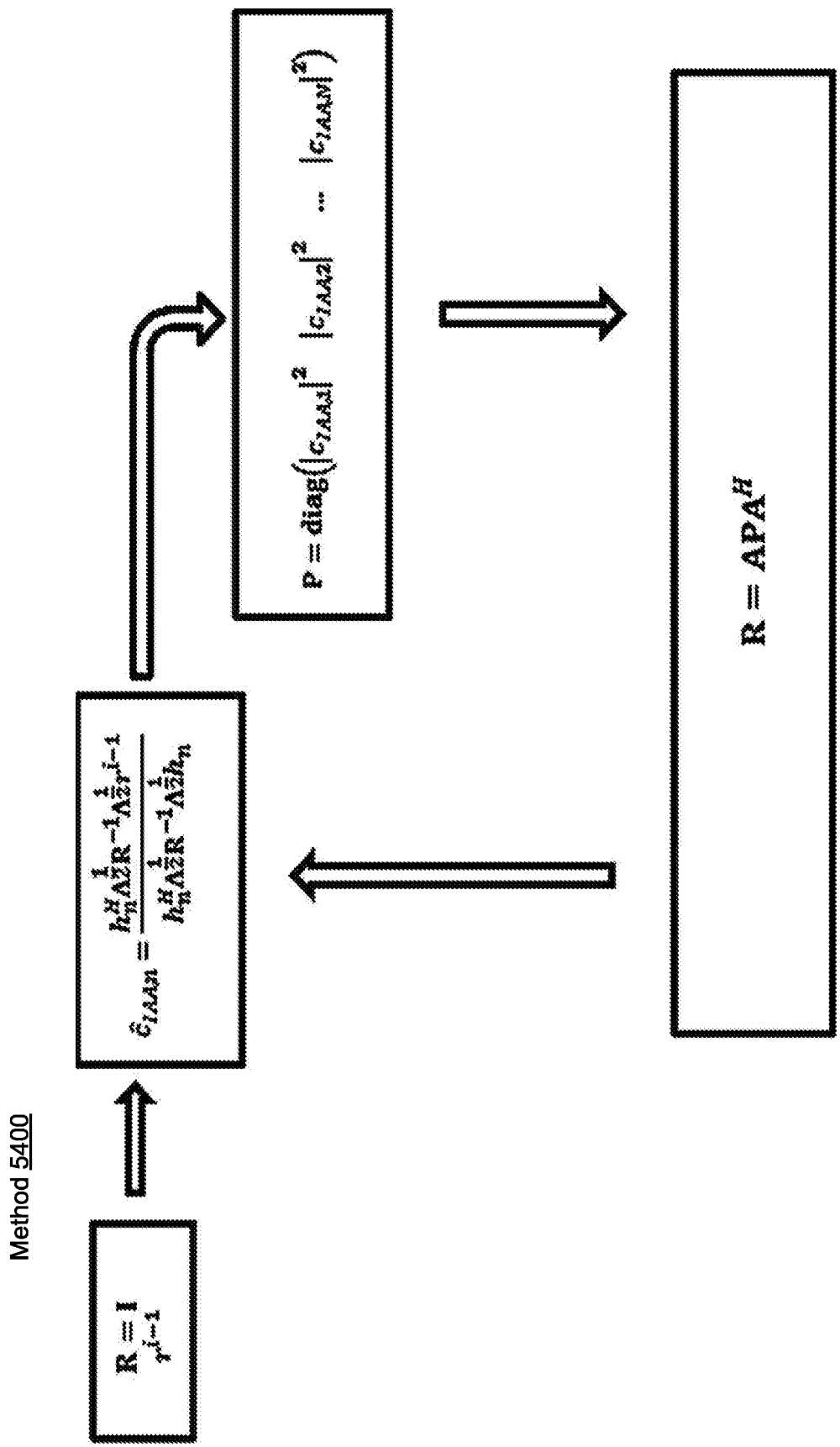
FIG. 54 illustrates an example of a method for an iterative adaptive approach (IAA)

FIG. 54 illustrates an example of a method 5400 for an iterative adaptive approach (IAA).

Figure 55:
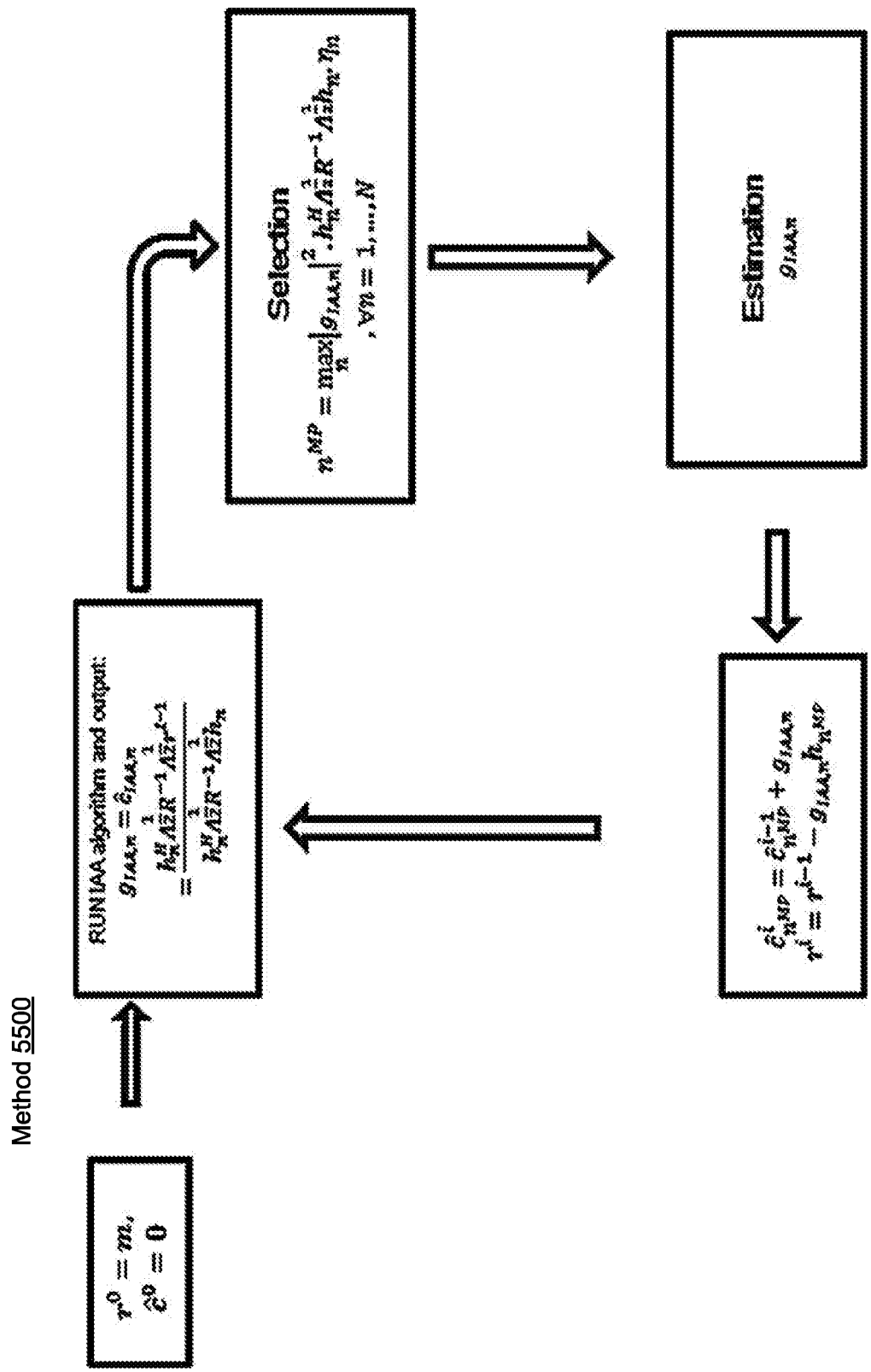
FIG. 55 illustrates an example of a method for an IAA-MP approach.

FIG. 55 illustrates an example of a method 5500 for an IAA-MP approach.

Figure 56:
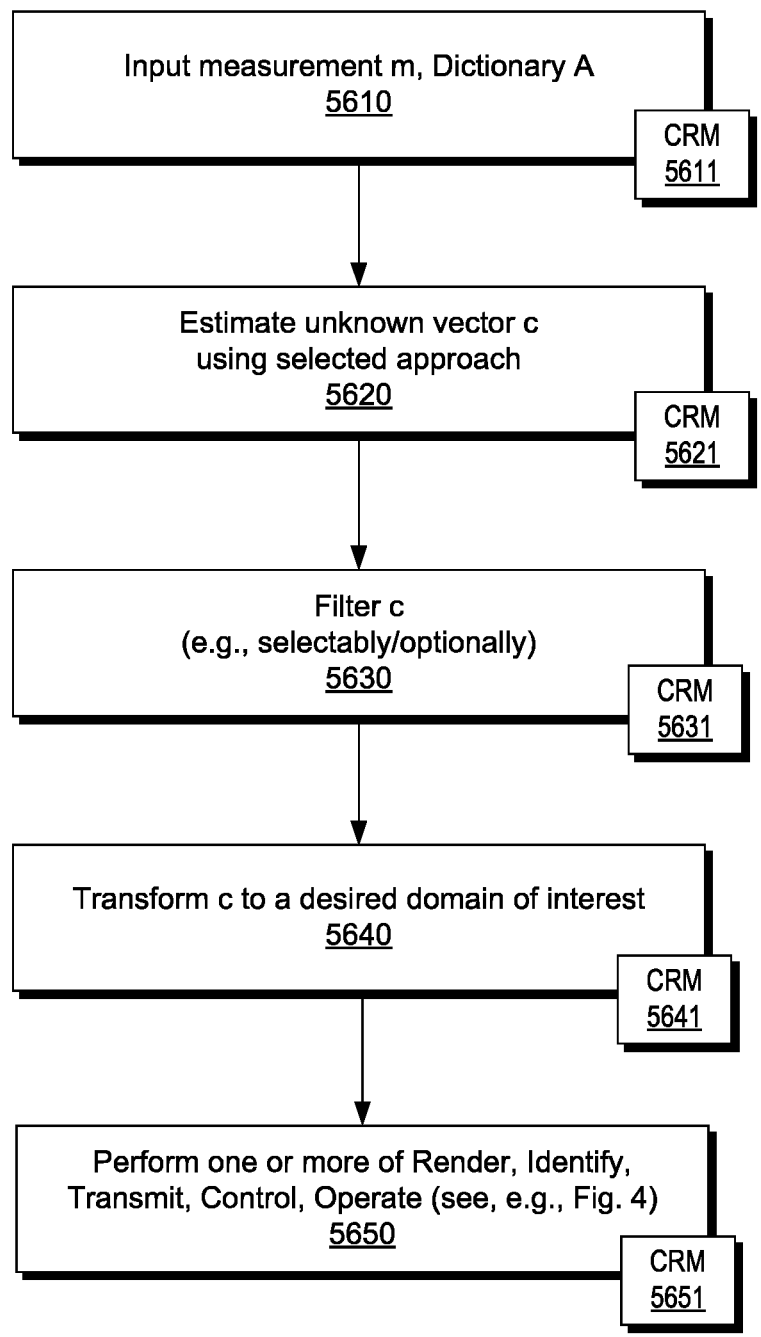
FIG. 56 illustrates an example of a method for analyzing input measurement(s)

FIG. 56 illustrates an example of a method 5600 for analyzing input measurement(s). As shown in FIG. 56, the method 5600 includes an input block 5610 for receipt of measurements m and a dictionary A (e.g., via an interface such as a network interface, a bus, a storage device interface, etc.), an estimation block 5620 for estimating values of unknowns in a vector c utilizing a selected approach (e.g., IAA-MP, etc.), a filter block 5630 for filtering the vector c (e.g., selectably and/or optionally), a transformation block 5640 for transforming the vector c (e.g., values of the vector c, as optionally filtered) to a desired domain of interest, and a performance block 5650 for performing one or more actions such as, for example, one or more of rendering information to a display via a computing device, identifying one or more structural features in a subterranean environment, transmitting one or more signals (e.g., commands, data, etc.), controlling one or more pieces of equipment in a field operation, operating equipment or another action. The method 400 of FIG. 4 includes various actions in the block 452, 462 and 472 that may be implemented based at least in part on the selected approach of the block 5620. As explained with respect to the method 400 of FIG. 4, an IAA-MP block 430 may be implemented, for example, for estimating values of unknowns, such as, for example, values of the vector c.

The method 5600 is shown in FIG. 56 in association with various computer-readable media (CRM) blocks 5611, 5621, 5631, 5641 and 5651. Such blocks generally include instructions suitable for execution by one or more processors (or cores) to instruct a computing device or system to perform one or more actions. While various blocks are shown, a single medium may be configured with instructions to allow for, at least in part, performance of various actions of the method 5600. As an example, a CRM block can be a computer-readable storage medium that is non-transitory, not a carrier wave and not a signal. As an example, such blocks can include instructions that can be stored in memory and can be executable by one or more of processors.

As an example, a method can include receiving data acquired via survey equipment disposed in an environment; analyzing at least a portion of the data via an iterative adaptive approach that implements matching pursuit to generate analysis results; and identifying at least one feature in the environment based at least in part on a portion of the analysis results. As an example, a system can include a processor; memory accessible by the processor; one or more computer-readable storage media that include processor-executable instructions to instruct the system to: receive data acquired via survey equipment disposed in an environment; analyze at least a portion of the data via an iterative adaptive approach that implements matching pursuit to generate analysis results; and identify at least one feature in the environment based at least in part on a portion of the analysis results. As an example, one or more computer-readable storage media can include processor-executable instructions to instruct a computing system to: receive data acquired via survey equipment disposed in an environment; analyze at least a portion of the data via an iterative adaptive approach that implements matching pursuit to generate analysis results; and identify at least one feature in the environment based at least in part on a portion of the analysis results.

As an example, a method can include receiving data acquired via survey equipment disposed in an environment; analyzing at least a portion of the data via an iterative adaptive approach that implements matching pursuit to generate analysis results; and identifying at least one feature in the environment based at least in part on a portion of the analysis results where such a method also include acquiring the data.

As an example, a method can include constructing at least a portion of a well in an environment based at least in part on identifying at least one feature in the environment based at least in part on a portion of analysis results of data acquired via a survey of the environment.

As an example, analyzing can be performed in part by at least one processor. A method may utilize a device or a system, which may be a distributed computing system with a plurality of processors.

As an example, analysis results can include at least a portion of a wavefield where the wavefield includes information as to features of an environment (e.g., structural features, fluid features, etc.).

As an example, survey equipment can include marine survey equipment. For example, consider equipment that includes at least one streamer that can include, for example, at least one geophone and/or at least one hydrophone.

As an example, analyzing can include de-correlating, which may provide for pre-whitening. As an example, analyzing can include reducing error with respect to a cost function. As an example, analyzing can include preconditioning with a term that de-correlates a residual, which may provide for pre-whitening. In such an example, preconditioning can sharpen a spectrum.

As an example, analyzing can include solving a nonlinear weighted-least squares formulation to output a multichannel basis vector. In such an example, solving can include computing an amplitude spectrum of a signal. As an example, analyzing can include implementing a Lomb spectrum.

As an example, analyzing can include determining a covariance matrix of a signal.

As an example, analyzing can include performing iterations of an iterative adaptive approach within iterations of matching pursuit. For example, the iterations of the iterative adaptive approach can include a convergence criterion, the iterations of the matching pursuit can include a convergence criterion and analyzing can output an optimal coefficient vector.

A system may include one or more computer-readable storage media that include processor-executable instructions, which may be executable to instruct a system to analyze data, control a process, perform a task, perform a workstep, perform a workflow, etc.

Figure 57:
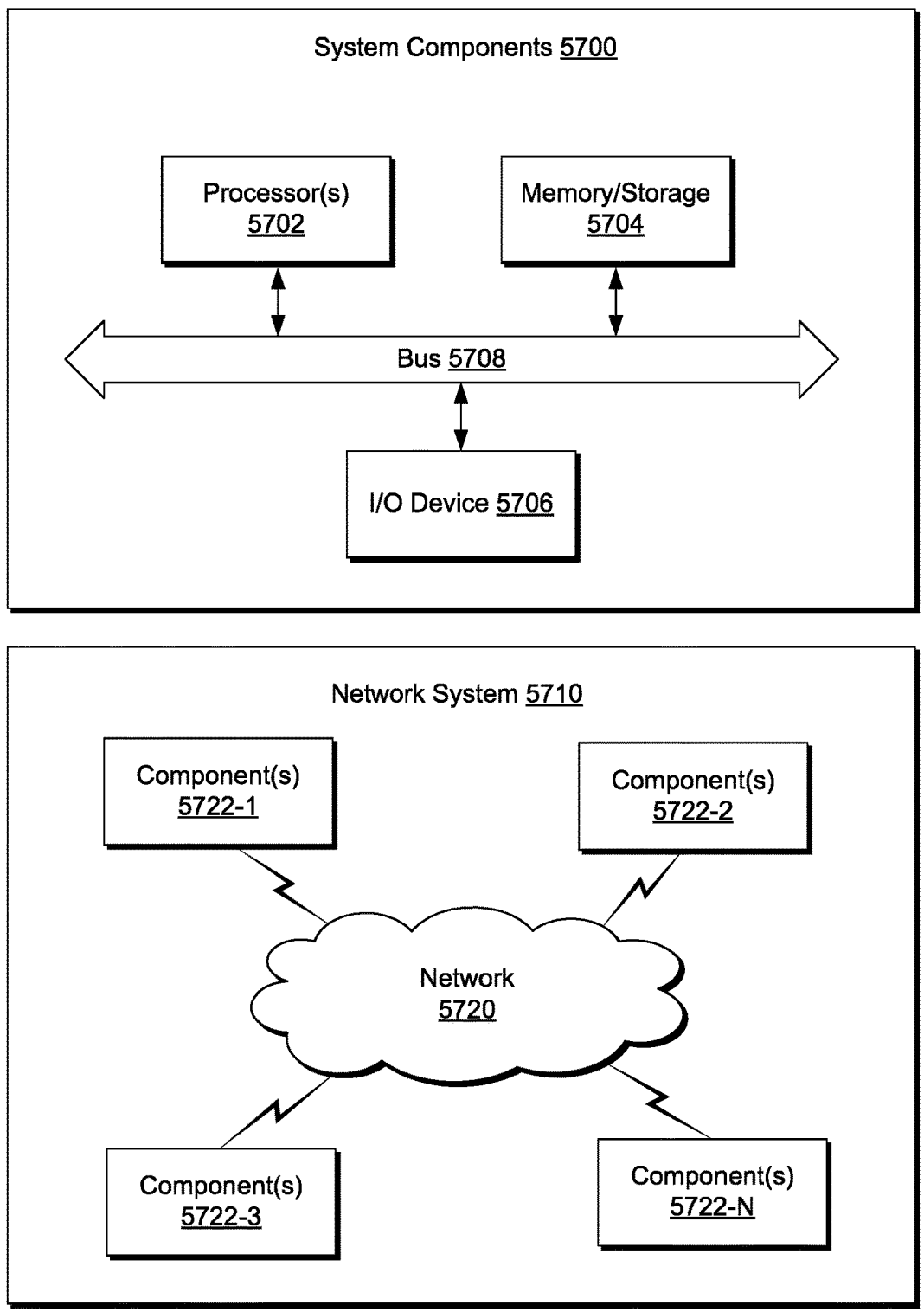
FIG. 57 illustrates an example of a system that includes at least one processor and an example of a network system.

FIG. 57 shows components of a computing system 5700 and a networked system 5710. The system 5700 includes one or more processors 5702, memory and/or storage components 5704, one or more input and/or output devices 5706 and a bus 5708. Instructions may be stored in one or more computer-readable media (memory/storage components 5704). Such instructions may be read by one or more processors (see the processor(s) 5702) via a communication bus (see the bus 5708), which may be wired or wireless. The one or more processors may execute such instructions to implement (wholly or in part) one or more attributes (as part of a method). A user may view output from and interact with a process via an I/O device (see the device 5706). A computer-readable medium may be a storage component such as a physical memory storage device such as a chip, a chip on a package, a memory card, etc. (a computer-readable storage medium).

Components may be distributed, such as in the network system 5710. The network system 5710 includes components 5722-1, 5722-2, 5722-3, . . . 5722-N. The components 5722-1 may include the processor(s) 5702 while the component(s) 5722-3 may include memory accessible by the processor(s) 5702. Further, the component(s) 5722-2 may include an I/O device for display and optionally interaction with a method. The network may be or include the Internet, an intranet, a cellular network, a satellite network, etc.

A device may be a mobile device that includes one or more network interfaces for communication of information. A mobile device may include a wireless network interface (operable via IEEE 802.11, ETSI GSM, BLUETOOTH®, satellite, etc.). A mobile device may include components such as a main processor, memory, a display, display graphics circuitry (optionally including touch and gesture circuitry), a SIM slot, audio/video circuitry, motion processing circuitry (accelerometer, gyroscope), wireless LAN circuitry, smart card circuitry, transmitter circuitry, GPS circuitry, and a battery. A mobile device may be configured as a cell phone, a tablet, etc. A method may be implemented (wholly or in part) using a mobile device. A system may include one or more mobile devices.

A system may be a distributed environment such as a so-called "cloud" environment where various devices, components, etc. interact for purposes of data storage, communications, computing, etc. A device or a system may include one or more components for communication of information via one or more of the Internet (where communication occurs via one or more Internet protocols), a cellular network, a satellite network, etc. A method may be implemented in a distributed environment (wholly or in part as a cloud-based service).

Information may be input from a display (consider a touchscreen), output to a display or both. Information may be output to a projector, a laser device, a printer, etc. such that the information may be viewed. Information may be output stereographically or holographically. As to a printer, consider a 2D or a 3D printer. A 3D printer may include one or more substances that can be output to construct a 3D object. Data may be provided to a 3D printer to construct a 3D representation of a subterranean formation. Layers may be constructed in 3D (horizons, etc.), geobodies constructed in 3D, etc. Holes, fractures, etc., may be constructed in 3D (as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function. The following documents are incorporated by reference herein.

A. Papoulis, "Generalized sampling expansion," IEEE Trans. Circ. Syst., vol. 24, pp. 652-654, November 1977.

J. Li and P. Stoica, "An adaptive filtering approach to spectral estimation and SAR imaging," IEEE Transactions on Signal Processing, vol. 44, pp. 1469-1484, June 1996.

T. Yardibi, J. Li, P. Stoica, M. Xue and A. B. Baggeroer, "Source localization and sensing: a nonparametric iterative adaptive approach based on weighted least squares," IEEE Transactions on Aerospace and Electronic Systems," vol. 46, pp. 425-443, January 2010.

A. Özbek, M. Vassallo, D. F. Halliday, J.-F. Hopperstad and R. Laws, "Wavefield reconstruction by extended generalized matching pursuit and finite differences," IS14.8498, 25.04.2014.

Candés, E. J., J. K. Romberg, and T. Tao, 2006, Stable signal recovery from incomplete and inaccurate measurements, Communications on Pure and Applied Mathematics, 59, 1207-1223.

Chen, S., and D. Donoho, 1994, Basis pursuit: Conference Record of the Twenty-Eighth Asilomar Conference on Signals, Systems and Computers, IEEE, 41-44.

Donoho, D. L., 2006, Compressed sensing: IEEE Transactions on Information Theory, 52, 1289-1306.

Mallat, S. G., and Z. Zhang, 1993, Matching pursuits with time-frequency dictionaries: IEEE Transactions on Signal Processing, 41, 3397-3415.

Özbek, A., M. Vassallo, K. Özdemir, D.-J. van Manen, and K. Eggenberger, 2010, Crossline wavefield reconstruction from multicomponent streamer data: Part 2—Joint interpolation and 3D up/down separation by generalized matching pursuit: Geophysics, 75, WB69-WB85.

Özbek, A., M. Vassallo, K. Özdemir, D.-J. van Manen, K. Eggenberger, and J. O. A. Robertsson, 2011, Parametric Matching Pursuit Methods to Reconstruct Seismic Data Acquired with Multichannel Sampling: 73rd EAGE Conference and Exhibition, Extended Abstracts, A042.

Vassallo, M., A. Özbek, K. Özdemir, and K. Eggenberger, K., 2010, Crossline wavefield reconstruction from multicomponent streamer data: Part 1—Interpolation by matching pursuit using pressure and its crossline gradient: Geophysics, 75, WB53-WB67.

Blumensath, and T., Davies, M., 2007, On the difference between orthogonal matching pursuit and orthogonal least squares. No. 0, pp. 1-3.

Capon, J., 1969, High resolution frequency-wavenumber spectrum analysis, Proceedings of the IEEE, 57, 1408-1418.

Chen, S. S., Donoho, D. L. and Saunders, M. A., 1998, Atomic decomposition by basis pursuit, SIAM Journal of Scientific Computing, 20, 33-61.

Chen, Y., Ma J., and Fomel, S., 2016, Double-sparsity dictionary for seismic noise attenuation: Geophysics, 81, no. 2, V17-V30.

DeVore R. A., and Temlyakov V. N., 1996, Some remarks on greedy algorithms, Advances in Computational Mathematics, 173-187.

Herrmann, P., Mojesky, T., Magesan, M., and Hugonnet, P., 2000, De-aliased, high-resolution Radon transforms: 70th Annual International Meeting, SEG, Expanded Abstracts, 1953-1956.

Hogbom J., 1974, Aperture synthesis with a non-regular distribution of interferometer baselines, Astrophysical Journal Supplement Series, 417-426.

Kamil, Y. I., Loganathan, P. Vassallo, M., Cowman, M., and Raskopin, A., 2015, Optimizing the Use of Gradient Measurements in Wavefield Reconstruction: a Bayesian Noise Tracking Approach, 77th EAGE Conference and Exhibition.

Krstulovic S, and Gribonval R., 2006, MPTK: Matching Pursuit made Tractable, Proceedings of the International Conference on Acoustics, Speech and Signal Processing, 3, 496-499.

Li, J., and Stoica, P., 1996, An adaptive filtering approach to spectral estimation and SAR imaging, IEEE Trans. Signal Processing, 44, 1469-1484.

Mallat, S. G., and Z. Zhang, 1993, Matching pursuits with time-frequency dictionaries: IEEE Transactions on Signal Processing, 41, 3397-3415.

Miller A., 2002, Subset selection in regression, Chapman and Hall.

Murray J. F., and Kreutz-Delgado, K., 2001, An improved FOCUSS-based learning algorithm for solving sparse linear inverse problems, in Conf. Record of the Thirty-Fifth Asilomar Conf. on Signals, Systems and Computers, 347-351.

Özbek, A., Özdemir, K. and Vassallo, M., 2009, Interpolation by matching pursuit, SEG Technical Program Expanded Abstracts, 3254-3257.

Özbek, A., Vassallo, M., Özdemir, K., van-Manen D. J. and Eggenberger, K., 2010, Crossline wavefield reconstruction from multicomponent streamer data: Part 2—Joint interpolation and 3-D up/down separation by generalized matching pursuit. Geophysics, 57, WB69-WB85.

Pati, Y., 1993, Orthogonal matching pursuit: Recursive function approximation with applications to wavelet decomposition. Signals, Systems and Computer, 40-44.

Rao, B. D., and Kreutz-Delgado, K., 1999, An affine scaling methodology for best basis selection, IEEE Trans. Sig-nal Processing, 47, 187-200.

Rebollo-Neira, L., and Lowe, D., 2002, Optimized orthogonal matching pursuit approach, IEEE Signal Processing Letters, 9, 137-140.

Schmidt, R. O., 1986, Multiple emitter location and signal parameter estimation, IEEE Transactions on Antennas and Propagation, 3, 276-280.

Schonewille, M., A. Klaedtke, A. Vigner, J. Brittan, and T. Martin, 2009, Seismic data regularization with the anti-alias anti-leakage Fourier transform, First Break, 27, 85-93.1.

Stanton, A., and M. D. Sacchi, 2013, All roads lead to Rome: Predictability, sparsity, rank and pre-stack seismic data reconstruction: CSEG Recorder, 38.

Stoica, P., Zachariah, D., and Li, J., 2014, Weighted SPICE: A unifying approach for hyperparameter-free sparse estimation, Digital Signal Processing: A Review Journal, 33, 1-12.

Vassallo, M., Özbek, A., Özdemir, K. and Eggenberger, K., 2010, Crossline wavefield reconstruction from multicomponent streamer data: Part 1—Interpolation by matching pursuit using pressure and its crossline gradient. Geophysics, 75, WB53-WB67.

Vassallo, M., Eggenberger, K., Özbek, A., and Curtis, T., 2011, Mitigation of streamer noise impact in multicomponent streamer wavefield reconstruction, SEG Annual International Meeting, 1273-1277.

Wang, Y., 2010, Multichannel matching pursuit for seismic trace decomposition: Geophysics, 75, no. 4, V61-V66.

Yardibi, Y., Li, J., Stoica, P., Xue, M., and Baggeroer, A. B., 2010, Source localization and sensing: A nonparametric iterative adaptive approach based on weighted least squares, IEEE Trans. Aerosp. Electron. Syst., 46, 425-443.

What is claimed is:

1. A method comprising:
receiving data acquired via survey equipment disposed in an environment, wherein the survey equipment comprises at least one geophone;
analyzing at least a portion of the data via an iterative adaptive approach that implements matching pursuit to generate analysis results, wherein the matching pursuit determines an optimal matching pursuit basis vector and its optimal complex amplitude for a plurality of wavenumbers via a nonlinear optimization using a covariance matrix of the data, wherein the iterative adaptive approach determines the covariance matrix of the data for each iteration of the matching pursuit via computation of complex amplitude at each wavenumber; and
identifying at least one feature in the environment based at least in part on a portion of the analysis results.

2. The method of claim 1 comprising acquiring the data.

3. The method of claim 1 comprising constructing at least a portion of a well in the environment based at least in part on the identifying.

4. The method of claim 1 wherein the analyzing is performed in part by at least one processor.

5. The method of claim 1 wherein the analysis results comprise at least a portion of a wavefield.

6. The method of claim 1 wherein the survey equipment comprises marine survey equipment.

7. The method of claim 6 wherein the marine survey equipment comprises at least one streamer that comprises the at least one geophone and at least one hydrophone.

8. The method of claim 1 wherein the analyzing comprises de-correlating.

9. The method of claim 1 wherein the analyzing comprises pre-whitening.

10. The method of claim 1 wherein the analyzing comprises reducing error with respect to a cost function.

11. The method of claim 1 wherein the analyzing comprises preconditioning with a term that de-correlates a residual.

12. The method of claim 11 wherein the preconditioning sharpens a spectrum.

13. The method of claim 1 wherein the analyzing comprises solving a nonlinear weighted-least squares formulation to output a multichannel basis vector as the optimal marching pursuit basis vector.

14. The method of claim 13 wherein the solving comprises computing an amplitude spectrum of a signal.

15. The method of claim 1 wherein the analyzing comprises implementing a Lomb spectrum.

16. A system comprising:
a processor;
memory accessible by the processor;
one or more computer-readable storage media that comprise processor-executable instructions to instruct the system to:
receive data acquired via survey equipment disposed in an environment wherein the survey equipment comprises at least one geophone;
analyze at least a portion of the data via an iterative adaptive approach that implements matching pursuit to generate analysis results, wherein the matching pursuit determines an optimal matching pursuit basis vector and its optimal complex amplitude for a plurality of wavenumbers via a nonlinear optimization using a covariance matrix of the data, wherein the iterative adaptive approach determines the covariance matrix of the data for each iteration of the matching pursuit via computation of complex amplitude at each wavenumber; and
identify at least one feature in the environment based at least in part on a portion of the analysis results.

17. One or more computer-readable storage media that comprise processor-executable instructions to instruct a computing system to:
receive data acquired via survey equipment disposed in an environment wherein the survey equipment comprises at least one geophone;
analyze at least a portion of the data via an iterative adaptive approach that implements matching pursuit to generate analysis results, wherein the matching pursuit determines an optimal matching pursuit basis vector and its optimal complex amplitude for a plurality of wavenumbers via a nonlinear optimization using a covariance matrix of the data, wherein the iterative adaptive approach determines the covariance matrix of the data for each iteration of the matching pursuit via computation of complex amplitude at each wavenumber; and
identify at least one feature in the environment based at least in part on a portion of the analysis results.

18. The method of claim 1, comprising generating a model that characterizes at least a portion of the environment based at least in part on the identifying the at least one feature.

19. The method of claim 1, wherein the identifying comprises generating a model that characterizes at least a portion of the environment based at least in part on a portion of the analysis results.

* * * * *